United States Patent [19]
Moezzi et al.

[11] Patent Number: 5,850,352
[45] Date of Patent: Dec. 15, 1998

[54] IMMERSIVE VIDEO, INCLUDING VIDEO HYPERMOSAICING TO GENERATE FROM MULTIPLE VIDEO VIEWS OF A SCENE A THREE-DIMENSIONAL VIDEO MOSAIC FROM WHICH DIVERSE VIRTUAL VIDEO SCENE IMAGES ARE SYNTHESIZED, INCLUDING PANORAMIC, SCENE INTERACTIVE AND STEREOSCOPIC IMAGES

[75] Inventors: Saied Moezzi, San Diego; Arun Katkere, La Jolla; Ramesh Jain, San Diego, all of Calif.

[73] Assignee: The Regents of the University of California, Alameda, Calif.

[21] Appl. No.: 554,848

[22] Filed: Nov. 6, 1995

Related U.S. Application Data

[63] Continuation-in-part of Ser. No. 414,437, Mar. 31, 1995.
[51] Int. Cl.⁶ ...................................... H04N 9/79
[52] U.S. Cl. .......................... 364/514 A; 348/13; 395/119
[58] Field of Search .................................. 364/514 A, 410; 348/13, 19, 42, 51, 48; 273/433, 441; 395/119, 125, 155, 129, 162

[56] References Cited

U.S. PATENT DOCUMENTS 5,490,239 2/1996 Myers ...................................... 395/129
5,495,576 2/1996 Ritchey ................................... 395/125

Primary Examiner—Emanuel T. Voeltz
Assistant Examiner—Thomas Peeso
Attorney, Agent, or Firm—Fuess & Davidenas

[57] ABSTRACT

Immersive video, or television, images of a real-world scene are synthesized, including on demand and/or in real time, as are linked to any of a particular perspective on the scene, or an object or event in the scene. Synthesis is in accordance with user-specified parameters of presentation, including presentations that are any of panoramic, magnified, stereoscopic, or possessed of motional parallax. The image synthesis is based on computerized video processing—called "hypermosaicing"—of multiple video perspectives on the scene. In hypermosaicing a knowledge database contains information about the scene; for example scene geometry, shapes and behaviors of objects in the scene, and/or internal and/or external camera calibration models. Multiple video cameras each at a different spatial location produce multiple two-dimensional video images of the scene. A viewer/user specifies viewing criterion (ia) at a viewer interface. A computer, typically one or more engineering work station class computers or better, includes in software and/or hardware (i) a video data analyzer for detecting and for tracking scene objects and their locations, (ii) an environmental model builder combining multiple scene images to build a 3D dynamic model recording scene objects and their instant spatial locations, (iii) a viewer criterion interpreter, and (iv) a visualizer for generating from the 3D model in accordance with the viewing criterion one or more selectively synthesized 2D video image(s) of the scene.

46 Claims, 27 Drawing Sheets

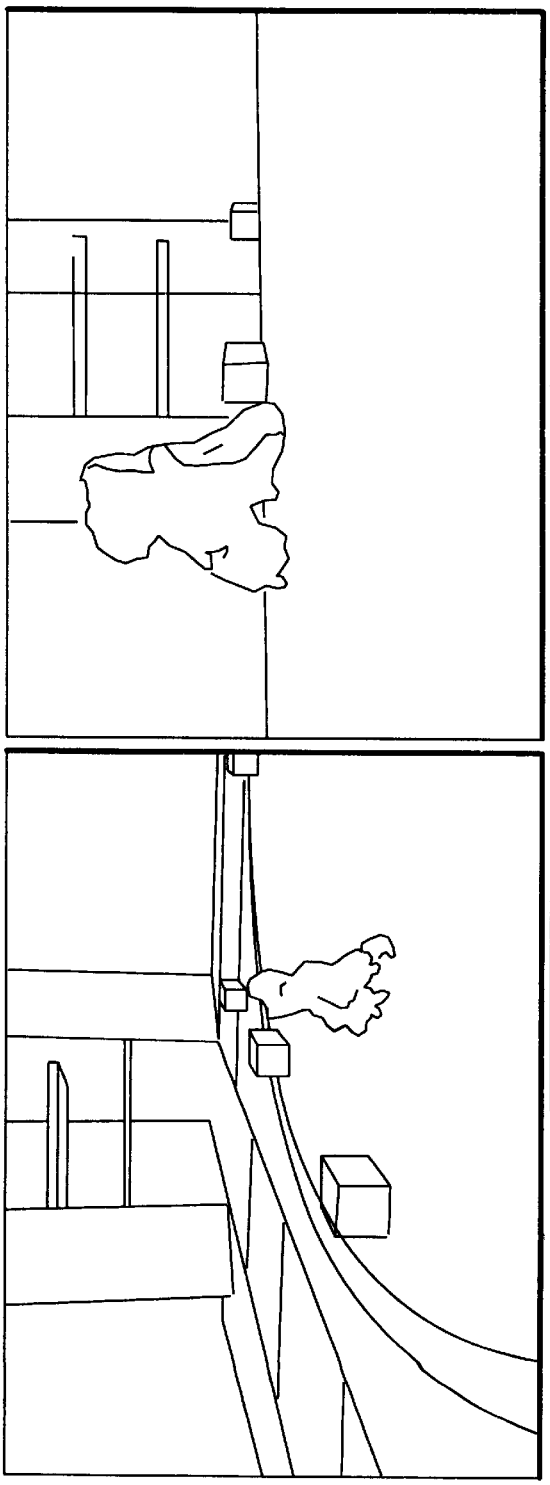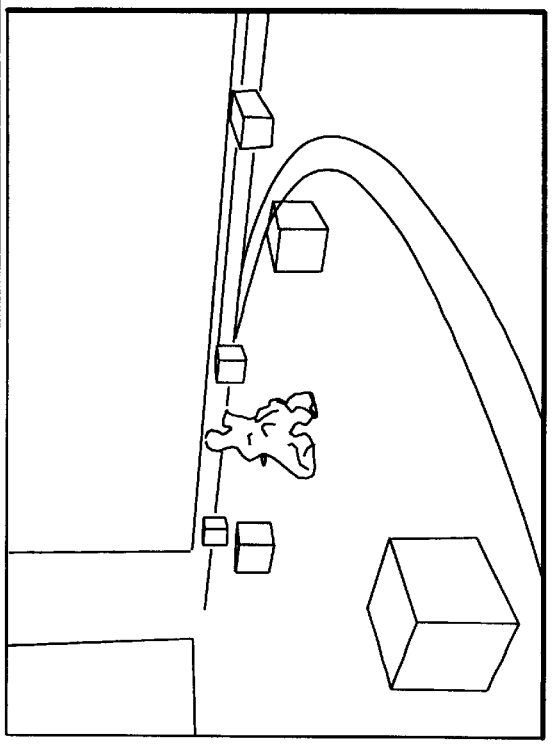
FIG. 9c

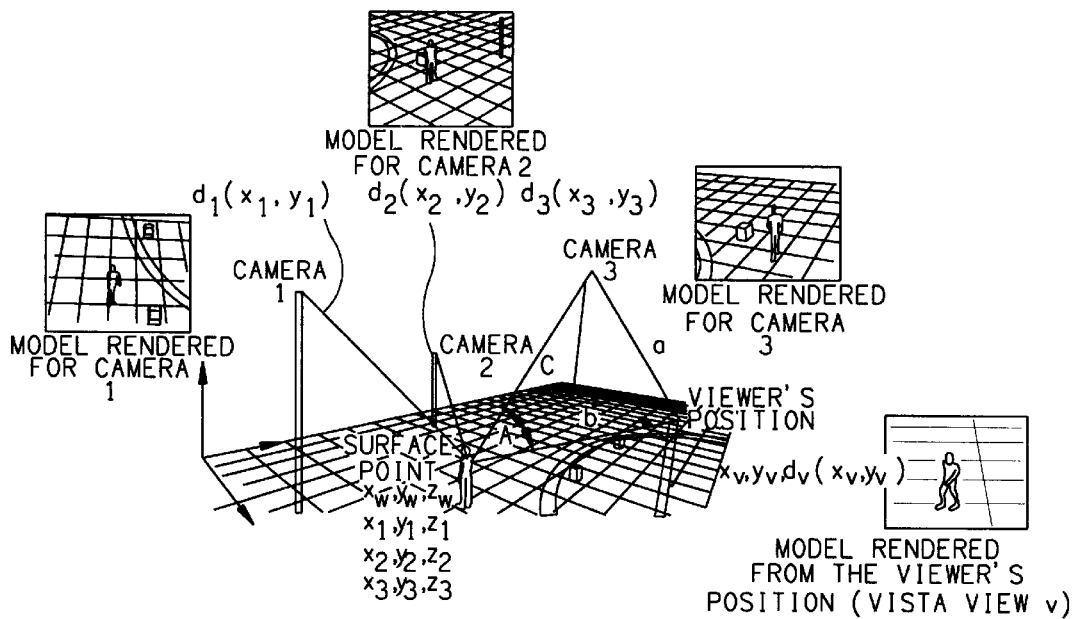

```
FOR EACH REAL CAMERA VIEW c do
  RENDER ENVIRONMENT MODEL FROM VIEW c;
  READ BACK DEPTH VALUES de(x,y)
END
FOR EACH VISTA VIEW v TO BE CREATED DO
  RENDER ENVIRONMENT MODEL FROM VISTA VIEW v;
  READ BACK DEPTH VALUES de(x,y)
  // CREATE VISTA VIEW BY FINDING INTENSITIES OF EACH PIXEL
    FOR EACH PIXEL (xv,yv) DO
      PROJECT (xv,yv,dv(xv,yv)) → WORLD COORDINATES (xw,yw,zw)
      FOR EACH REAL CAMERA VIEW c do
        PROJECT (xw,yw,zw) → CAMERA VIEW COORDINATES (xc,yc,zc);
        // OCCLUSION TEST
        COMPARE dc(xc,yc) AND zc
        IF THEY ARE CLOSE ENOUGH THEN SIGNAL c AS A CANDIDATE VIEW_fi
      END
      FOR EACH CANDIDATE VIEW cv DO
```

COMPUTE EVALUATION CRITERION $c_{cv} = f(\arccos \frac{\sqrt{b^2+c^2-a^2}}{2bc}, \beta \cdot b_c(x_c,y_c))$ WHERE a, b, c ARE AS SHOWN IN THE FIGURE 2, $\beta$ IS A WEIGHTING CONSTANT.

```
      END
      INTENSITY Fv(xv,zv)(t) = Fw(xbv,ybv)(t)
        WHERE bv = ARG MINcv(cv)
    END
END
```

FIG. 11

```
// CALCULATE VIEWING REGIONS CORRESPONDING TO A VOXEL FOR EACH CAMERA
FOR EACH VOXEL (X,Y,Z) DO
    COMPUTE 8 BOUNDING BOX POINTS FOR VOXEL (X,Y,Z)
    PROJECT EACH ONTO THE IMAGE PLANE OF EACH CAMERA VIEW
    DETERMINE MINy, MAXy, MINx, MAXx VIEWING REGIONS FOR EACH CAMERA
END
// DETERMINE IF VIEWING REGION CONTAINS MOVING OBJECTS
FOR EACH VOXEL (x,y,z) DO
    FOR EACH REAL CAMERA VIEW c DO
        // DETERMINE IF VIEWING REGION CONTAINS MOVING OBJECTS
        FOR ROW=MINy TO MAXy DO
            FOR COLLUMN=MENx TO MAXx DO
                COMPUTE IF PIXELc(COLUMN, ROW) CONTAINS MOVING OBJECTS
                IF MOVING OBJECTS EXIST THEN INCREMENT VOXEL(x,y,z).VALUE F1
            END
        END
    END
END
// VISUALIZE VOXELS
FOR EACH VOXEL(x,y,z) DO
    IF VOXEL(x,y,z).VALUE > THRESHOLD THEN VISUALIZE VOXEL(x,y,z) F1
END
```

FIG. 12

IMMERSIVE VIDEO, INCLUDING VIDEO HYPERMOSAICING TO GENERATE FROM MULTIPLE VIDEO VIEWS OF A SCENE A THREE-DIMENSIONAL VIDEO MOSAIC FROM WHICH DIVERSE VIRTUAL VIDEO SCENE IMAGES ARE SYNTHESIZED, INCLUDING PANORAMIC, SCENE INTERACTIVE AND STEREOSCOPIC IMAGES

REFERENCE TO A RELATED PATENT APPLICATION

The present patent application is a continuation-in-part of U.S. patent application Ser. No. 08/414,437 filed on Mar. 31, 1995 to inventors Ramesh Jain and Koji Wakimoto for MACHINE DYNAMIC SELECTION OF ONE VIDEO CAMERA/IMAGE OF A SCENE FROM MULTIPLE VIDEO CAMERAS/IMAGES OF THE SCENE IN ACCORDANCE WITH A PARTICULAR PERSPECTIVE ON THE SCENE, AN OBJECT IN THE SCENE, OR AN EVENT IN THE SCENE. The contents of the related predecessor patent application are incorporated herein by reference.

BACKGROUND OF THE INVENTION

1. Field of the Invention

The present invention generally concerns (i) multimedia, (ii) video, including video-on-demand and interactive video, and (iii) television, including television-on-demand and interactive television.

The present invention particularly concerns synthesizing diverse spatially and temporally coherent and consistent virtual video cameras, and a virtual video images, from multiple real video images that are obtained by multiple real video cameras.

The present invention still further concerns the creation of three-dimensional video image models, and the location and dynamical tracking of video images of selected objects depicted in the models for, among other purposes, the selection of a real camera or image, or the synthesis of a virtual camera or image, best showing the object selected.

The present invention still further concerns (i) interactive synthesis of video, or television, images of a real-world scene on demand, (ii) the synthesis of virtual video images of a real-world scene in real time, or virtual television, (iii) the synthesis of virtual video images/virtual television pictures of a real-world scene which video images/virtual television are linked to any of a particular perspective on the video/television scene, an object in the video/television scene, or an event in the video/television scene, (iv) the synthesis of virtual video images/virtual television pictures of a real-world scene wherein the pictures are so synthesized to user-specified parameters of presentation, e.g. panoramic, or at magnified scale if so desired by the user, and (v) the synthesis of 3D stereoscopic virtual video images/virtual television.

2. Description of the Prior Art

2.1 Limitations in the Viewing of Video and Television Dealt with by the Predecessor MPI Video System and Method, and the Relationship of the Present Invention The traditional model of television and video is based on a single video stream transmitted to a passive viewer. A viewer has the option to watch the particular video stream, and to rewatch should the video be recorded, but little else. Due to the emergence of the information highways and other related information infrastructure circa 1995, there has been considerable interest in concepts like video-on-demand, interactive movies, interactive TV, and virtual presence. Some of these concepts are exciting, and suggest many dramatic changes in society due to the continuing dawning of the information age.

The related predecessor patent applications teaches that a novel form of video, and television, is possible—and has, indeed, already been reduced to operative practice—where a viewer of video, or television, may select a particular perspective from which perspective a real-world scene will henceforth be presented. The viewer may alternatively select a particular object—which may be a dynamically moving object—or even an event in the real world scene that is of particular interest. As the scene develops its presentation to the viewer will prominently feature the selected object or the selected event (if occurring).

Accordingly, video presentation of a real-world scene in accordance with the related predecessor inventions is interactive with both (i) a viewer of the scene and, in the case of a selected dynamically moving object, or an event, in the scene, (ii) the scene itself. True interactive video or television is thus presented to a viewer. The image presented to the viewer may be a full virtual image that is not mandated to correspond to any real camera nor to any real camera image. A viewer may thus view a video or television of a real-world scene from a vantage point (i.e., a perspective on the video scene), and/or dynamically in response to objects moving in the scene and/or events transpiring in the scene, in manner that is not possible in reality. The viewer may, for example, view the scene from a point in the air above the scene, or from the vantage point of an object in the scene, where no real camera exists or even, in some cases, can exist.

The predecessor video system, and approach, is called Multiple Perspective Interactive ("MPI") video. MPI video is the basis, and the core, of the "immersive video" (non-real-time and "immersive telecresence" or "Visualized Reality (VisR) (real-time), systems of the present invention. The MPI Video system itself overcomes several limitations of the conventional video. See, for example, 1) Wendy E. Mackay and Glorianna Davenport; "Virtual video editing in interactive multimedia applications" appearing in *Communications of the ACM*, 32(7): 802–810, July 1989; 2) Eitetsu Oomoto and Katsumi Tanaka; "Ovid: Design and implementation of a video-object database system" submitted in Spring 1995 to *IEEE Transactions on Knowledge and Data Engineering*; 3) Glorianna Davenport, Thomas Aguirre Smith, and Natalio Pincever; "Cinematic primitives for multimedia" appearing in *IEEE Computer Graphics & Applications*, pages 67–74, July 1991; and 4) Anderson H. Gary; *Video Editing and Post Production: A Professional Guide*, Knowledge Industry Publications, 1988.

MPI video supports the editing of, and viewer interaction with, video and television in a manner that is useful in viewing activities ranging from education to entertainment. In particular, in conventional video, viewers are substantially passive; all they can do is to control the flow of video by pressing buttons such as play, pause, fast forward or fast reverse. These controls essentially provide the viewer only one choice for a particular segment of video: the viewer can either see the video (albeit at a controllable rate), or skip it.

In the case of live television broadcast, viewers have essentially no control at all. A viewer must either see exactly what a broadcaster chooses to show, or else change away from that broadcaster and station. Even in sports and other broadcast events where multiple cameras are used, a viewer has no choice except the obvious one of either viewing the image presented or else using a remote control so as to "surf" multiple channels.

Interactive video and television systems such as MPI video make good use of the availability of increased video bandwidth due to new satellite and fiber optic video links, and due to advances in several areas of video technology. Author George Gilder argues that because the viewers really have no choice in the current form of television, it is destined to be replaced by a more viewer-driven system or device. See George Gilder; *Life After Television: The coming transformation of Media and American Life*, W. W. Norton & Co., 1994.

The related invention of MPI video makes considerable progress—even by use of currently existing technology—towards "liberating" video and TV from the traditional single-source, broadcast, model, and towards placing each viewer in his or her own "director's seat".

A three-dimensional (3D) video model, or database, is used in MPI video. The immersive video and immersive telepresence systems of the present invention preserve, expand, and build upon this 3D model. This three-dimensional model, and the functions that it performs, are well and completely understood, and will be completely taught within this specification. However, the considerable computational power required if a full custom virtual video image for each viewer is to be synthesized in real time and on demand requires that the model should be constructed and maintained in consideration of (1) powerful organizing principles, (ii) efficient algorithms, and (iii) effective and judicious simplifying assumptions. This then, and more, is what the present invention will be seen to concern.

2.2 Related MPI-Video

For the sake of completeness, the purposes of the Multiple Perspective Interactive Video, or MPI-video, that is the subject of the related predecessor application are recapitulated in this application.

MPI video presents requirements that re both daunting and expensive, but realizable in terms of the communications and computer hardware available circa 1995. About $10^3$ more video data than is within a modern television channel may usefully be transmitted to each viewer. Each viewer may usefully benefit from the computational power equivalent to several powerful engineering work station computers (circa 1995). Once this is done, however, then the "bounds of earth" are shed, and a viewer may interact with any three-dimensional real-world scene much as if he/she were an omnipotent, prescient, being whose vantage point on the scene is unfettered save only that it must be through a two-dimensional video "window" of the viewer's choice.

These functions performed by MPI video prospectively serve to make MPI video a revolutionary new media. Even rudimentary, presently realized, embodiments of MPI video do many useful things. For example, in the particular context of the video (and television) presentation of American football (in which environment the model is exercised), some few football players, and the football itself, will be seen to be susceptible of being automatically "tracked" during play in order that a video image presented to a viewer by the system may be selectively "keyed" to the action of the game.

A "next step" in MPI video beyond this rudimentary implementation is as a non-real-time pre-processed "game video". Such a "game video" may be recorded on the now-emerging new-format Video CD. Some twenty-three different "tracks", for example, may be recorded to profile each player on the field from both teams, and also the football.

A "next step" in MPI video beyond even this will be to send the same information on twenty-three channels live, and in real time, on game day. Subscriber/viewer voting may permit a limited interaction. For example, the "fans" around a particular television might select a camera, or synthesis of a virtual camera, profiling the "defensive backs".

Finally, and what will undoubtedly transpire only after the lapse of some years from the present time (1995), it should be possible for each fan to be his or her own "game director", and to watch in real time substantially exactly what he or she wants.

Accordingly, to exercise even the MPI video system at its maximum capability, some advancement of technology will be useful, and is confidently expected, in the fields of computer vision, multimedia database and human interface.

See, for example, Swanberg: 1) Deborah Swanberg, Terry Weymouth, and Ramesh Jain, "Domain information model: an extended data model for insertions and query", appearing in *Proceedings of the Multimedia Information Systems*, pages 39–51, Intelligent Information Systems Laboratory, Arizona State University, Feb. 1, 1992; and 2) Deborah Swanberg, Chiao-Fe Shu, and Ramesh Jain, "Architecture of a multimedia information system for content-based retrieval", appearing in Audio Video Workshop, San Diego, Calif., November 1992.

See also, for example, Hampapur: 1) Arun Hampapur, Ramesh Jain, and Terry Weymouth, "Digital video segmentation", appearing in *Proceedings of the ACM conference on MultiMedia*, Association of Computing Machinery, October 1994; and 2) Arun Hampapur, Ramesh Jain, and Terry Weymouth, "Digital video indexing in multimedia systems", appearing in *Proceedings of the Workshop on Indexing and Reuse in Multimedia Systems*, American Association of Artificial Intelligence, August 1994.

See further, for example, Zhang: 1) H. J. Zhang, A. Kankanhalli, and S. W. Smoliar, "Automatic partitioning of video", appearing in *Multimedia Systems*, 1(1):10–28, 1993; and 2) Hong Jiang Zhang, Yihong Gong, Stephen W. Smoliar, and Shuang Yeo Tan, "Automatic parsing of news video", appearing in *Proceedings of the IEEE Conference on Multimedia Computing Systems*, May 1994.

See also, for example, 1) Akio Nagasaka and Yuzuru Tanaka, "Automatic video indexing and full-video search for object appearances", appearing in 2*nd Working Conference on Visual Database Systems*, pages 119–133, Budapest, Hungary, October 1991, 2) Farshid Arman, Arding Hsu, and Ming-Yee Chiu, "Image processing on compressed data for large video databases", appearing in *Proceedings of the ACM MultiMedia*, pages 267–272, California, USA, June 1993, Association of Computing Machinery, 3) Glorianna Davenport, Thomas Aguirre Smith, and Natalio Pincever; op cit; 4) Eitetsu Oomoto and Katsumi Tanaka, op cit.; and 5) Akihito Akutsu, Yoshinobu Tonomura, Hideo Hashimoto, and Yuji Ohba, "Video indexing using motion vectors", appearing in Proceedings of SPIE: *Visual Communications and Image Processing* 92, November 1992.

When considering these references, it should be recalled that MPI video is already operative. Actual results obtained in the immersive video and visual telepresence expansions and applications of MPI video system will be presented in this specification.

2.3 Previous Scene-Interactive Video and Television

Scene-interactive video and television is nothing so grandiose as permitting a user/viewer to interact with the objects and/or events of a scene—as will be seen to be the subject of the present and related inventions. Rather, the interaction with the scene is simply that of a machine—a computer—that must recognize, classify and, normally, adapt its responses to what it "sees" in the scene. Scene-interactive video and television is thus simply an extension of machine vision so as to permit a computer to make decisions, sound alarms, etc., based on what it detects in, and detects to be transpiring in, a video scene. Two classic problems in this area (which problems are not commensurate in difficulty) are (i) security cameras, which must detect contraband, and (ii) an autonomous computer-guided automated battlefield tank, which must sense and respond to its environment.

U.S. Pat. No. 5,109,425 to Lawton for a METHOD AND APPARATUS FOR PREDICTING THE DIRECTION OF MOVEMENT IN MACHINE VISION concerns the detection of motion in and by a computer-simulated cortical network, particularly for the motion of a mobile rover. Interestingly, a subsystem of the present invention will be seen to capture the image of a moving mobile rover within a scene, and to classify the image captured to the rover and to its movement. However, the video and television systems of the present invention, and their MPI-video subsystem, will be seen to function quite differently than the method and apparatus of Lawton in the detection of motion. An MPI video system avails itself of multiple two-dimensional video images from each of multiple stationary cameras as are assembled into a three-dimensional video Image model, or database. Once these multiple images of the MPI video system are available for object, and for object track (i.e., motion), correlation(s), then it proves a somewhat simpler matter to detect motion in the MPI video system than in prior art single-perspective systems such as that of Lawton.

U.S. Pat. No. 5,170,440 to Cox for PERCEPTUAL GROUPING BY MULTIPLE HYPOTHESIS PROBABILISTIC DATA ASSOCIATION is a concept of a computer vision algorithm. Again, the video and television systems of the present invention are privileged to start with much more information than any single-point machine vision system. Recall that an MPI video system avails itself of multiple two-dimensional video images from each of multiple stationary cameras, and that these multiple two-dimensional images are, moreover, assembled into a three-dimensional video image model, or database.

The general concepts, and voluminous prior art, concerning "machine vision", "(target) classification", and "(target) tracking" are all relevant to the present invention. However, the video and television systems of the present invention—while doing very, very well in each of viewing, classifying and tracking, will be seen to come to these problems from a very different perspective than does the prior art. Namely, the prior art considers platforms—whether they are rovers or warships—that are "located in the world", and that must make sense of their view thereof from essentially but a single perspective centered on present location.

The present invention functions oppositely. It "defines the world", or at least so much of the world is "on stage" and in view to (each of) multiple video cameras. The video and television systems of the present invention have at their command a plethora of correlatable and correlated, simultaneous, positional information. Once it is known where each of multiple cameras are, and are pointing, it is a straightforward matter for computer processes to fix, and to track, items in the scene.

The systems, including the MPI-video subsystem, of the present invention will be seen to perform co-ordinate transformation of (video) image data (i.e., pixels), and to do this during a generation of two- and three-dimensional image models, or databases. U.S. Pat. No. 5,259,037 to Plunk for AUTOMATED VIDEO IMAGERY DATABASE GENERATION USING PHOTOGRAMMETRY discusses the conversion of forward-looking video or motion picture imagery into a database particularly to support image generation of a "top down" view. The present invention does not require any method so sophisticated as that of Plunk, who uses a Kalman filter to compensate for the roll, pitch and yaw of the airborne imaging platform: an airplane. In general the necessary image transformations of the present invention will be seen not to be plagued by dynamic considerations (other than camera pan and zoom)—the multiple cameras remaining fixed in position imaging the scene (in which scene the objects, however, may be dynamic).

Finally, U.S. Pat. No. 5,237,648 to Cohen for an APPARATUS AND METHOD FOR EDITING A VIDEO RECORDING BY SELECTING AND DISPLAYING VIDEO CLIPS shows and discusses some of the concerns, and desired displays, presented to a human video editor. In the systems of the present invention much of this function will be seen to be assumed by hardware.

The system of present invention will be seen to, in its rudimentary embodiment, perform a spatial positional calibration of each of multiple video cameras from the images produced by such cameras because, quite simply, in the initial test data the spatial locations of the cameras were neither controlled by, nor even known to, the inventors. This is not normally the case, and the multi-perspective video or the present invention normally originates from multiple cameras for which (i) the positions, and (ii) the zoom in/zoom out parameters, are well known, and fully predetermined, to the system. However, and notably, prior Knowledge of camera position(s) may be "reverse engineered" by a system from a camera(s') image(s). Two prior art articles so discussing this process are "A Camera Calibration Technique using Three Sets of Parallel Lines", by Tomino Echigo appearing in *Machine Visions and Applications,* 3;139–167 (1990); and "A theory of Self-Calibration of a Moving Camera", by S. J. Maybank and O. D. Faugeras appearing in *International Journal of Computer Vision* 8:2;123–151 (1992).

In general, many computer processes performed in the present invention are no more sophisticated than are the computer processes of the prior art, but they are, in very many ways, often greatly more audacious. The present invention will be seen to manage a very great amount of video data. A three-dimensional video model, or database, is constructed. For any sizable duration of video (and a sizable length thereof may perhaps not have to be retained at all, or at least retained long), this model (this database) is huge. More problematical, it takes very considerable computer "horsepower" to construct this model—howsoever long its video data should be held and used.

However, the inventors have already taken a major multimedia laboratory at a major university and "rushed in where angels fear to tread" in developing MPI video—a form of video presentation that is believed to be wholly new. Having found the "ground" under their invention to be firmer, the expected problems more tractable, the results better, and the images of greater practical usefulness than might have been expected, the inventors continue with expansion and adaptation of the MPI video system to realize untrammeled video views—including stereoscopic views. In non-real-time applications this realization, and the special processes of so realizing, are called "immersive video&. In real-time applications the realization, and the processes, are "immersive telepresence", or "visual reality", or "VisR". In particular the inventors continue to find—a few strategic simplifications being made—that presently-available computer and computer systems resources can produce results of probable practical value. Such is the subject of the following specification sections.

2.4 Previous Composite Video and Television

The present invention of immersive video will be seen to involve the manipulation, processing and compositing of video data in order to synthesize video images. (Video compositing is the amalgamation of video data from separate video streams.) It is known to produce video images that—by virtue of view angle, size, magnification, etc.—are generally without exact correspondence to any single "real-world" video image. The previous process of so doing is called "video mosaicing".

The present general interest in, and techniques for, generating a video mosaic from an underlying video sequence are explained, inter alia, by M. Hansen, P. Anandan, K. Dana, G. Van der Wal and P. Burt in Real-time scene stabilization and mosaic construction, appearing in ARPA *Image Understanding Workshop*, Monterey, Calif., Nov. 13–16, 1994; and also by H. Sawhney, S. Ayer, and M. Gorkani in Model-based 2D and 3D dominant motion estimation for mosaicing and video representation, appearing in *Technical Report*, IBM Almaden Research Center, 1994.

Video mosaicing has numerous applications including (1) data compression and (2) video enhancement. See M. Irani and S. Peleg, Motion Analysis for image enhancement: resolution, occlusion, and transparency, appearing in *Journal of Visual Communication and Image Representation*, 4(4):324–35, December 1993. Another application of video mosaicing is (3) the generation of panoramic views. See R. Szeliski, Image mosaicing for tele-reality applications, appearing in Proceedings of Workshop on Applications of Computer Vision, pages 44–53, Sarasota, Fla., December 1994, IEEE, IEEE Computer Society Press; L. McMillan, Acquiring immersive virtual environments with an uncalibrated camera, *Technical Report TR*95-006, Computer Science Department, University of North Carolina, Chapel Hill, N.C., April 1995; and S. Mann and R. W. Picard, Virtual Bellows: constructing high quality stills from video, *Technical Report TR*#259, Media Lab, MIT, Cambridge, Mass., November 1994. Still further applications of video mosaicing are (4) high-definition television and (5) video libraries.

The underlaying task in video mosaicing is to create larger images from frames obtained from one or more single cameras, typically one single camera producing a panning video stream. To generate seamless video mosaics, registration and alignment of the frames from a sequence are critical issues.

Simple, yet robust, techniques have been advanced to solve the registration and alignment challenges. See, for example, the multi-resolution area-based scheme described in M. Hansen, P. Anandan, K. Dana, G. Van der Wal and P. Burt, op cit. For scenes containing dynamic objects, parallax has been used to extract dominant 2D and 3D motions, which were then used to register the frames and generate the mosaic. See H. Sawhney, Motion video annotation and analysis: An overview, appearing in *Proceedings 27 Asilomar Conference on Signals, Systems and Computers*, pages 85–89, IEEE, November 1993.

For multiple dynamic objects in a scene, "motion layers" have been introduced. In these layers each dynamic object is assumed to more in a plane parallel to the camera. This permits segmentation of the video into different components each containing a dynamic object, which can then be interpreted or re-synthesized as a video stream. See J. Wang and E. Adelson, Representing Moving Images with Layers, *IEEE Transactions on Image Processing*, 3(4):625–38, September. 1994.

In general, previous activities in video mosaicing might be characterized as piecewise, and "from the bottom up" in developing new techniques. In contrast, the perspective of the present invention might be characterized as "top down". The immersive video system of the present invention will be seen to assimilate, and manipulate, a relatively large amount of video data. In particular, multiple independent streams of video data of the same scene at the same time will be seen to be input to the system. Because the system of the present invention has a plethora of information, it may well be relatively more straightforward for it to accomplish things like recognizing and classifying moving objects in a scene, or even to do exotic things like displaying stereoscopic scene images, than it is for previous systems handling less information. Video data from the real-world may well be a lot simpler for a machine (a computer) to interact with when, as derived from multiple perspectives, it is so abundant so as permit that objects and occurrences in the video scene should be interpretable without substantial ambiguity.

Notably, this concept is outside normal human ken: although we see with two eyes, we do not see things from all directions at the same time. Humans have, or course, highly evolved brains, and perception. However, at least one situation of limited analogy exists. At the IBM "people mover" pavilion at the 1957 World's Fair a multi-media, multi-screen presentation of the then-existing processes for the manufacturing of computers was shown to an audience inside an egg-shaped theater. A single process was shown in a lively way from as many as a dozen different views with abundant, choreographed, changes in perspective, magnification, relationship, etc, etc, between each and all simultaneous views. The audience retention, and comprehension, of the relatively new, and complex, information presented was considered exceptional when measured, thus showing that humans as well as, the inventors would argue, computers can benefit by having a "good look".

Next, the immersive video system of the present invention will be seen to use its several streams of 2D video data to build and maintain a 3D video model, or database. The utility of such 3D model, or database, in the synthesis of virtual video images seems clear. For example, an arbitrary planar view of the scene will contain the data of 2D planar slice "through" the 3D model.

The limitation on such a scheme of a information-intensive representation, and manipulation, of the video data of a real-world scene is that a purely "brute force" approach is impossible with presently available technology. The "trade-off" in handling a lot of video data is that (i) certain scene (or at least scene video) constraints must be imposed, (ii) certain simplifying assumptions must be made (regarding the content of the video information, (iii) certain expediencies must be embraced (regarding the manipulations of the video data), and/or (iv) certain limitations must be put on what images can, or cannot, be synthesized from such data. (The present invention will be seen to involve essentially no (iv) limitations on presentation.) Insofar as the necessary choices and trade-offs are astutely made, then it may well be possible to synthesize useful and aesthetically pleasing video, and even television, images by the use of tractable numbers of affordable computers and other equipments running software programs of reasonable size.

The immersive video system of the present invention will so show that—(i) certain scene constraints being made, (ii) certain simplifying assumptions being made regarding scene objects and object dynamical motions being made, and (iii) certain computational efficiencies in the manipulations of video data being embraced—it is indeed possible, and even practical, to so synthesize useful and aesthetically pleasing video, and even television, images.

SUMMARY OF THE INVENTION

The present invention contemplates telepresence and immersive video, being the non-real-time creation of a synthesized, virtual, camera/video image of a real-world scene, typically in accordance with one or more viewing criteria that are chosen by a viewer of the scene. The creation of the virtual image is based on a computerized video processing—in a process called hypermosaicing—of multiple video views of the scene, each from a different spatial perspective on the scene.

When the synthesis and the presentation of the virtual image transpires as the viewer desires—and particularly as the viewer indicates his or her viewing desires simply by action of moving and/or orienting any of his or her body, head and eyes—then the process is called "immersive telepresence", or simply "telepresence". Alternatively, the process is sometimes called "visual reality", or simply "VisR".

(The proliferation of descriptive terms has more to do with the apparent reality(ies) of the synthesized views drawn from the real-world scene than it does with the system and processes of the present invention for synthesizing such views. For example, a quite reasonable ground level view of a football quarterback as is may be synthesized by the system and method of the present invention may appear to a viewer to have been derived from a hand-held television camera, although in fact no such camera exists and the view was not so derived. These views of common experience are preliminarily called "telepresence". Contrast a magnified, eye-to-eye, view with an ant. This magnified view is also of the real-world, although it is clearly a view that is neither directly visible to the naked eye, nor of common experience. Although derived by entirely the same processes, views of this latter type of synthesized view of the real world is preliminarily called "visual reality", or "VisR", by juxtaposition of such views the similar sensory effects engendered by "virtual reality", or "VR".)

1. Telepresence, Both Immersive and Interactive

In one of its aspects, the present invention is embodied in a method of telepresence, being a video representation of being at real-world scene that is other than the instant scene of the viewer. The method includes (i) capturing video of a real-world scene from each of a multiplicity of different spatial perspectives on the scene, (ii) creating from the captured video a full three-dimensional model of the scene, and (iii) producing, or synthesizing, from the three-dimensional model a video representation on the scene that is in accordance with the desired perspective on the scene of a viewer of the scene.

This method is thus called "immersive telepresence" because the viewer can view the scene as if immersed therein, and as if present at the scene, all in accordance with his or her desires. Namely, it appears to the viewer that, since the scene is presented as the viewer desires, the viewer is immersed in the scene. Notably, the viewer-desired perspective on the scene, and the video representation synthesized in accordance with this viewer-desired perspective, need not be in accordance with any of the video captured from any scene perspective.

The video representation can be in accordance with the position and direction of the viewer's eyes and head, and can exhibit "motional parallax". "Motional parallax" is normally and conventionally defined as a three-dimensional effect where different views on the scene are produced as the viewer moves position, making the viewer's brain to comprehend that the viewed scene is three-dimensional. Motional parallax is observable even if the viewer has but one eye.

Still further, and additionally, the video representation can be stereoscopic. "Stereoscopy" is normally and conventionally defined as a three-dimensional effect where each of the viewer's two eyes sees a slightly different view on the scene, thus making the viewer's brain to comprehend that the viewed scene is three-dimensional. Stereoscopy is detectable even should the viewer not move his or her head or eyes in spatial position, as is required for motional parallax.

In another of its aspects, the present invention is embodied in a method of telepresence where, again, video of a real-world scene is obtained from a multiplicity of different spatial perspectives on the scene. Again, a full three-dimensional model of the scene is created the from the captured video. From this three-dimensional model a video representation on the scene that is in accordance with a predetermined criterion—selected from among criteria including a perspective on the scene, an object in the scene and an event in the scene—is produced, or synthesized.

This embodiment of the invention is thus called "interactive telepresence" because the presentation to the viewer is interactive in accordance with the criterion. Again, the synthesized video presentation of the scene in accordance with the criterion need not be, and normally is not, equivalent to any of the video captured from any scene perspective.

In this method of viewer-interactive telepresence the video representation can be in accordance with a criterion selected by the viewer, thus viewer-interactive telepresence. Furthermore, the presentation can be in accordance with the position and direction of the viewer's eyes and head, and will thus exhibit motional parallax; and/or the presentation can exhibit stereoscopy.

2. A System for Generating Immersive Video

A huge range of heretofore unobtainable, and quite remarkable, video views may be synthesized in accordance with the present invention. Nonetheless that an early consideration of exemplary video views of diverse types would likely provide significant motivation to understanding the construction, and the operation, of the immersive video system described in this section 2, discussion of these views is delayed until the next section 3. This is so that the reader, having gained some appreciation and understanding in this section 2 of the immersive video system, and process, by which the video views are synthesized, may later better place these diverse views in context.

An immersive video, or telepresence, system serves to synthesize and to present diverse video images of a real-world scene in accordance with a predetermined criterion or criteria. The criterion or criteria of presentation is (are) normally specified by, and may be changed at times and from time to time by, a viewer/user of the system. Because the criterion (criteria) is (are) changeable, the system is viewer/user-interactive, presenting (primarily) -hose particular video images (of a real-world scene) that the viewer/user desires to see.

The immersive video system includes a knowledge database containing information about the scene. Existence of this "knowledge database" immediately means that the something about the scene is both (i) fixed and (ii) known;

for example that the scene is of "a football stadium", or of "a stage", or even, despite the considerable randomness of waves, of "a surface of an ocean that lies generally in a level plane". For many reasons—including the reason that a knowledge database is required—the antithesis of a real-world scene upon which the immersive video system of the present invention may successfully operate is a scene of windswept foliage in a deep jungle.

The knowledge database may contain, for example, data regarding any of (i) the geometry of the real-world scene, (ii) potential shapes of objects in the real-world scene, (iii) dynamic behaviors of objects in the real-world scene, (iv) an internal camera calibration model, and/or (v) an external camera calibration model. For example, the knowledge base of an American football game would be something to the effect that (i) the game is played essentially in a thick plane lying flat upon the surface of the earth, this plane being marked with both (yard) lines and hash marks; (hi) humans appear in the scene, substantially at ground level; (iii) a football moves in the thick plane both in association with e.g., running plays and detached from (e.g., passing and kicking plays) the humans; and (iv) the locations of each of several video cameras on the football game are a priori known, or are determined by geometrical analysis of the video view received from each.

The system further includes multiple video cameras each at a different spatial location. Each of these multiple video cameras serves to produce a two-dimensional video image of the real-world scene at a different spatial perspective. Each of these multiple cameras can typically change the direction from which it observes the scene, and can typically pan and zoom, but, at least in the more rudimentary versions of the immersive video system, remains fixed in location. A classic example of multiple stationary video cameras on a real-world scene are the cameras at a sporting event, for example at an American football game.

The system also includes a viewer/user interface. A prospective viewer/user of the scene uses this interface to specify a criterion, or several criteria, relative to which he or she wishes to view the scene. This viewer/user interface may commonly be anything from head gear mounted to a boom to a computer joy stick to a simple keyboard. In ultimate applications of the immersive video system of the present invention, the viewer/user who establishes (and re-establishes) the criterion (criteria) by which an image on the scene is synthesized is the final consumer of the video images so synthesized and presented by the system. However, for more rudimentary present versions of the immersive video system, the control input(s) arising at the viewer/user interface typically arise from a human video sports director (in the case of an athletic event), from a human stage director (in the case of a stage play), or even from a computer (performing the function of a sports director or stage director). In other words, the viewing desires of the ultimate viewer/user may sometimes be translated to the immersive video system through an intermediary agent that may be either animate or inanimate.

The immersive video system includes a computer running a software program. This computer receives the multiple two-dimensional video images of the scene from the multiple video cameras, and also the viewer-specified criterion (criteria) from the viewer interface. At the present time, circa 1995, the typical computer functioning in an immersive video system is fairly powerful. It is typically an engineering work station class computer, or several such computers that are linked together if video must be processed in real time—i.e., as television. Especially if the immersive video is real time—i.e., as television—then some or all of the computers normally incorporate hardware graphics accelerators, a well-known but expensive part for this class of computer. Accordingly, the computer(s) and other hardware elements of an immersive video system are both general purpose and conventional but are, at the present time (circa 1995) typically "state-of-the-art", and of considerable cost ranging to tens, and even hundreds, of thousands of American dollars.

The system computer includes (in software and/or in hardware) (i) a video data analyzer for detecting and for tracking objects of potential interest and their locations in the scene, (ii) an environmental model builder for combining multiple individual video images of the scene to build a three-dimensional dynamic model of the environment of the scene within which three-dimensional dynamic environmental model potential objects of interest in the scene are recorded along with their instant spatial locations, (iii) a viewer criterion interpreter for correlating the viewer-specified criterion with the objects of interest in the scene, and with the spatial locations of these objects, as recorded in the dynamic environmental model in order to produce parameters of perspective on the scene, and (iv) a visualizer for generating, from the three-dimensional dynamic environmental model in accordance with the parameters of perspective, a particular two-dimensional video image of the scene.

The computer Function (i)—The video data analyzer—is a machine vision function. The function can presently be performed quite well and quickly, especially if (i) specialized video digitalizing hardware is used, and/or (ii) simplifying assumptions about the scene objects are made. Primarily because of the scene model builder next discussed, abundant simplifying assumptions are both well and easily made in the immersive video system of the present invention. For example, it is assumed that, in a video scene of an American football game, the players remain essentially in and upon the thick plane of the football field, and do not "fly" into the airspace above the field.

The views provided by an immersive video system in accordance with the present invention not yet having been discussed, it is somewhat premature to explain how a scene object that is not in accordance with the model may suffer degradation in presentation. More particularly, the scene model is not overly particular as to what appears within the scene, but it is particular as to where within (the volume of) the scene an object to be modeled appears. Consider, for example, that the immersive video system can fully handle a scene-intrusive object that is not in accordance with prior simplifications—for example, a spectator or many spectators or a dog or even an elephant walking onto a football field during or after a football game—and can process these unexpected objects, and object movements quite as well as any other. However, if is necessary that the modeled object should appear within a volume of the real-world scene whereat the scene model is operational—basically that volume portion of the scene where the field of view of multiple cameras overlap. For example, a parachutist parachuting into a football stadium may not be "well-modeled" by the system when he/she is high above the field, and outside the thick plane, but will be modeled quite well when finally near, or on, ground level. By modeling "quite well", it is meant that, while the immersive video system will readily permit a viewer to examine, for example, the dentation of the quarterback if he or she is interested in staring the quarterback "in the teeth", it is very difficult for the system (especially initially, and in real time as television), to process through a discordant scene occurrence, such as the stadium parachutist, so well so as to permit the examination of his or her teeth also when the parachutist is still many meters above the field.

The computer function (ii)—the environmental model builder—is likely the "backbone" of the present invention. It incorporates important assumptions that, while scene specific, are generally of a common nature throughout all scenes that are of interest for viewing with the present invention.

In the first place, the environmental model is (i) three-dimensional (3D), having both (i) static and (ii) dynamic components. The scene environmental model is not the scene image, nor is it the scene images rendered three-dimensionally. The current scene image, such as of the play action on a football field, may be, and typically is, considerably smaller than the scene environmental model which may be, for example, the entire football stadium and the objects and actors expected to be present therein. Within this three-dimensional dynamic environmental model both (i) the scene and (ii) all potential objects of interest in the scene are dynamically recorded as associated with, or "in", their proper instant spatial locations. (It should be remembered that the computer memory in which this 3D model is recorded as actually one-dimensional (1D), being but memory locations each of which is addressed by but a single one-dimensional (1D) address.) Understanding that the scene environmental model, and the representation of scene video information, in the present invention is full 3D will much simplify understanding of how the remarkable views discussed in the next section are derived.

At present there is not enough computer "horsepower" to process a completely amorphous unstructured video scene—the windy jungle—into 3D, especially in real time (i.e., as television). It is, however, eminently possible to process many scenes of great practical interest and importance into 3D if and when appropriate simplifying assumptions are made. In accordance with the present invention, these necessary simplifying assumptions are very effective, making that production of the three-dimensional video model (in accordance with the 3D environmental model) is very efficient.

First, the static "underlayment" or "background" of any scene is pre-processed into the three-dimensional video model. For example, the video model of an (empty) sports stadium—the field, filed markings, goal posts, stands, etc.— is pre-processed (as the environmental model) into the three-dimensional video model. From this point on only the dynamic elements in the scene—i.e., the players, the officials, the football and the like—need be, and are, dealt with. The typically greater portion of any scene that is (at any one time) static is neither processed nor re-processed from moment to moment, and from frame to frame. It need not be so processed or re-processed because nothing has changed, nor is changing. (In some embodiments of the immersive video system, the static background is not inflexible, and may be a "rolling" static background based on the past history of elements within the video scene.)

Meanwhile, dynamical objects in the scene—which objects typically appear only in a minority of the scene (e.g. the football players) but which may appear in the entire scene (e.g., the crowd)—are preferably processed in one of two ways. If the computer recognition and classification algorithm can recognize—in consideration of a priori model knowledge of objects appearing in the scene (such as the football, and the football players) and where such objects will appear (in the "thick plane" of the football field)—an item in the scene, than Shag item will be isolated, and will be processed/re-processed into the three-dimensional video model as a multiple voxel representation. (A voxel is a three-dimensional pixel.)

Other dynamic elements of the scene that—primarily for lack of suitably different, and suitably numerous, view perspectives from multiple cameras—cannot be classified or isolated into the three-dimensional environmental model are swept up into the three-dimensional model mostly in their raw, two-dimensional, video data form. Such a dynamic, but un-isolated, video element could be, for example, the movement of a crowd doing a "wave" motion at a sports stadium, or the surface of the sea.

As will be seen, those recognized and classified objects in the three-dimensional video model—such as, for example, a football or a football player—can later be viewed (to the limits of being obscured in all two-dimensional video data streams from which the three-dimensional video scene is composed) from any desired perspective. But it is not possible to view those unclassified and un-isolated dynamic elements of the scene that are stored in the 3D video model in their 2D video data from any random perspective. The 2D dynamic objects can indeed be dynamically viewed, but it is impossible for the system to, for example, go "behind" the moving crowd, or "under" the undulating surface of the sea.

The system and method does not truly know, of course, whether it is inserting, or warping, into the instant three-dimensional video model (that is based upon the scene environmental model) an instant video image of a football quarterback taking a drink, an instant video image of a football San taking the same drink, or an instant video image of an elephant taking a drink. Moreover, dynamic objects can both enter (e.g. as in coming onto the imaged field of play) and exit (e.g. as in leaving the imaged field of play) the scene.

The system and method of the present invention for constructing a 3D video scene deals only with (i) the scene environmental model, and (ii) the mathematics of the pixel dynamics. What must be recognized is that, in so doing, the system and method serve to discriminate between and among raw video image data in processing such image data into the three-dimensional video model.

These assumptions that the real-world scene contains both static and dynamic elements (indeed, preferably two kinds of dynamic elements), this organization, and these expediencies of video data processing are very important. They are collectively estimated to reduce the computational requirements for the maintenance of a 3D video model a typical real-world scene of genuine interest by a factor of from fifty to one hundred times (×50 to ×100).

However, these simplifications have a price; thankfully normally one that is so small so as to be all but unnoticeable. Portions of the scene "where the action is, or has been" are entered into the three-dimensional video model quite splendidly. Viewers normally associate such "actions areas" with the center of their video or television presentation. When action spontaneously erupts at the periphery of a scene, it takes even our human brains—whose attention has been focused elsewhere (i.e., at the scene center)—several hundred milliseconds or so to recognize what has happened. So also, but in a different sense, it is possible to "sandbag" the system and method of the present invention by a spontaneous eruption of action, or dynamism, in an insufficiently multiply viewed (and thus previously unclassified) scene area. The system and method of the present invention finds it hard to discriminate, and hard to process for entrance into the three-dimensional model, a three-dimensional scene object (or actor) outside of the boundaries where it expects scene objects (or actors). Without a priori knowledge in the scene environmental model that a spectator may throw a bottle in a high arc into a sporting arena, it is hard for the system of the present invention to classify and to process either portions of the throw or the thrower—both of which images outside the volume where image classification and 3D modeling transpires and both poorly covered by multiple video cameras—into the three-dimensional model so completely that the facial features of the thrower and/or the label on the bottle may—either upon an "instant replay" of the scene focusing on the area of the perpetrator or for that rare viewer who had been focusing his view to watch the crowd instead of the athletes all along—immediately be recognized. (If the original raw video data streams still exist, then it is always possible to process them better.)

It will further be understood when the synthesized scene images are finally discussed and viewed, that the 3D modeling cannot successfully transpire even on expected objects (e.g., football players) in expected volumes (e.g., on the football field) if the necessary views are obscured. For example, the immersive video system in accordance with the present invention does not make it possible to see to the bottom of a pile of tacklers (where no camera image exists, let alone do multiple camera images exist). The immersive video system in accordance with the present invention will, however, certainly permit observation of the same pile from the vantage point of a referee in order to assess, for example, an occurrence of a "piling on" penalty.

Finally, the algorithms themselves that are used to produce the three-dimensional video model are efficient.

Lastly, the system includes a video display that receives the particular two-dimensional video image of the scene from the computer, and that displays this particular two-dimensional video image of the real-world scene to the viewer/user as that particular view of the scene which is in satisfaction of the viewer/user-specified criterion (criteria).

3. Scene Views Obtainable With Immersive Video

To immediately note that a viewer/user of an immersive video system in accordance with the present invention may view the scene from any static or dynamic viewpoint— regardless that a real camera/video does not exist at the chosen viewpoint—only but starts to describe the experience of immersive video.

Literally any video image(s) can be generated. The immersive video image(s) that is (are) actually displayed to the viewer/user are ultimately, in one sense, a function of the display devices, or the arrayed display devices—i.e., the television(s) or monitor(s)—that are available for the viewer/user to view. Because, at present (circa 1995), the most ubiquitous form of these display devices—televisions and monitors—have substantially rectangular screens, most of the following explanations of the various experiences of immersive video will be couched in terms of the planar presentations of these devices. However, when in the future new display devices such as volumetric three-dimensional televisions are built—see, for example, U.S. Pat. Nos. 5,268,862 and 5,325,324 each for a THREE-DIMENSIONAL OPTICAL MEMORY—then the system of the present invention will stand ready to provide the information displayed by these devices.

3.1 Planar Video Views on a Scene

First, consider the generation of one-dimensional, planar and curved surface, video views on a scene.

Any "planar" view on the scene may be derived as the information which is present on any (straight or curved) plane (or other closed surface, such as a saddle) that is "cut" through the three-dimensional model of the scene. This "planar" surface may, or course, be positioned anywhere within the three-dimensional volume of the scene model. Literally any interior or exterior virtual video view on the scene may be derived and displayed. Video views may be presented in any aspect ratio, and in any geometric form that is supported by the particular video display, or arrayed video displays (e.g., televisions, and video projectors), by which the video imagery is presented to the viewer/user.

Next, recall that a plane is but the surface of a sphere or cylinder of infinite radius. In accordance with the present invention, a cylindrical, hemispherical, or spherical panoramic view of a video scene may be generated from any point inside or outside the cylinder, hemisphere, or sphere. For example, successive views on the scene may appear as the scene is circumnavigated from a position outside the scene. An observer at the video horizon of the scene will look into the scene as if though a window, with the scene in plan view, or, if foreshortened, as if viewing the interior surface of a cylinder or a sphere from a peephole in the surface of the cylinder or sphere. In the example of an American football game, the viewer/user could view the game in progress as if he or she "walked" at ground level, or even as if he or she "flew at low altitude", around or across the field, or throughout the volume of the entire stadium.

A much more unusual panoramic cylindrical, or spherical "surround" view of the scene may be generated from a point inside the scene. The views presented greatly surpass the crude, but commonly experienced, example of "you are there" home video where the viewer sees a real-world scene unfold as a walking video cameraman shoots video of only a limited angular, and solid angular, perspective on the scene. Instead, the scene can be made to appear—especially when the display presentation is made so as to surround the user as do the four walls of a room or as does the dome of a planetarium—to completely encompass the viewer. In the example of an American football game, the viewer/user could view the game in progress as if he or she was a player "inside" the game, even to the extent of looking "outward" at the stadium spectators.

It should be understood that where the immersive video system has no information—normally because view is obscured to the several cameras—than no Image can be presented of such a scene portion, which portion normally shows black upon presentation. This is usually not objectionable; the viewer/user does not really expect to be able to see "under" the pile of football players, or from a camera view "within" the earth. Note, however, that when the 3D video model does contain more than just surface imagery such as, for example, the complete 3D human physiology (the "visible man"), then "navigation" "inside" solid objects, into areas that have never been "seen" by eye or by camera, and at non-normal scales of view is totally permissible.)

Notably, previous forms of displaying multi-perspective, and/or surround, video presently (circa 1995) suffer from distortion. Insofar as the view caught at the focal plane of the camera, or each camera (whether film or video) is not identical to the view recreated for the viewer, the (often composite) views suffer from distortion, and to that extent a composite view lacks "reality"—even to the point of being disconcerting. However—and considering again that each and all views presented by an immersive video system in accordance with the present invention are drawn from the volume of a three-dimensional model—there is absolutely no reason that each and every view produced by an immersive video system should not be of absolute fidelity and correct spatial relationship to all other views.

For example, consider first the well known, but complex, pincushion correction circuitry of a common television. This circuitry serves to match the information modulation of the display-generating electron beam to the slightly non-planar, pincushion-like, surface of a common cathode ray tube. If the information extracted from a three-dimensional video model in accordance with the present invention is so extracted in the contour of a common pincushion, then no correction of the information is required in presenting it on an equivalent pincushion surface of a cathode ray tube.

Taking this analogy to the next level, if a scene is to be presented on some selected panels of a Liquid Crystal Digital (LCD) display, or walls of a room, then the pertinent video information as would constitute a perspective on the scene at each such panel or wall is simply withdrawn from the three-dimensional model. Because they are correctly spatially derived from a seamless 3D model, the video presentations on each panel or wall fit together seamlessly, and perfectly.

By now, this capability of the immersive video of the present invention should be modestly interesting. As well as commonly lacking stereoscopy, the attenuation effects of intervening atmosphere, true color fidelity, and other assorted shortcomings, two-dimensional screen views of three-dimensional real world scenes suffer in realism because of subtle systematic dimensional distortion. The surface of the two-dimensional display screen (e.g., a television) is seldom so (optically) flat as is the surface of the Charge Coupled Device (CCD) of a camera providing a scene image. The immersive video system of the present invention straightens all this out, exactly matching (in dedicated embodiments) the image presented to the particular screen upon which the image is so presented. This is, of course, a product of the 3D video model which was itself constructed from multiple video streams from multiple video cameras. It might thus be said that the immersive video system of the present invention is using the image of one (or more) cameras to "correct" the presentation (not the imaging, the presentation) of an image derived (actually synthesized in part) from another camera!

3.2 Interactive Video Views on a Scene

Second, consider that immersive video in accordance with the present invention permits machine dynamic generation of views on a scene. Images of a real-world scene may be linked at the discretion of the viewer to any of a particular perspective on the scene, an object in the scene, or an event in the scene.

For example, consider again the example of the real-world event of an American football game. A viewer/user may interactively close to view a field goal attempt from the location of the goalpost crossbars (a perspective on the scene), watching a successful place kick sail overhead. The viewer/user may chose to have the football (an object in the scene) centered in a field of view that is 90° to the field of play (i.e., a perfect "sideline seat") at all times. Finally, the viewer/user may chose to view the scene from the position of the left shoulder of the defensive center linebacker unless the football is launched airborne (as a pass) (an event in the scene) from the offensive quarterback, in which case presentation reverts to broad angle aerial coverage of the secondary defensive backs.

The present and related inventions serve to make each and any viewer of a video or a television depicting a real-world scene to be his or her own proactive editor of the scene. The viewer as "editor" has the ability to interactively dictate and select—in advance of the unfolding of the scene, and by high-level command—any reasonable parameter or perspective by which the scene will be depicted, as and when the scene unfolds.

3.3 Stereoscopic Video Views on a Scene

Third, consider that (i) presentations in consideration of motion parallax, and (ii) stereoscopy, are inherent in immersive video in accordance with the present invention.

Scene views are constantly generated by reference to the content of a dynamic three-dimensional model—which model is sort of a three-dimensional video memory without the storage requirement of a one-to-one correspondence between voxels (solid pixels) and memory storage addresses. Consider stereoscopy. It is "no effort at all" for an immersive video system to present, as a selected stream of video data containing a selected view, first scan time video data and second scan time video data that is displaced, each relative to the other, in accordance with the location of each object depicted along the line of view.

This is, of course, the basis of stereoscopy. When one video stream is presented in a one color, or, more commonly at present, at a one time or in a one polarization, while the other video stream is presented in a separate color, or at a separate time, or in an orthogonal polarization, and each stream is separately gated to the eye (at greater than the eye flicker fusion frequency=70 Hz) by action of colored glasses, or time-gated filters, or polarizing filters, then the image presented to the eyes will appear to be stereoscopic, and three-dimensional. The immersive video of the present invention, with its superior knowledge of the three-dimensional spatial positions of all objects in a scene, excels in such stereoscopic presentations (which stereoscopic presentations are, alas, impossible to show on he one-dimensional pages of the drawings).

Presentations in consideration of motion parallax require feedback to the immersive video system of the position and orientation of the viewer head and eyes. Once this is known, however, as from a helmet worn by the viewer, the system can easily synthesize and present the views appropriate to viewer eye position and orientation, even to the extent of exhibiting motion parallax.

3.4 A Combination of Visual Reality and Virtual Reality

Fourth, the immersive video presentations of the present invention are clearly susceptible of combination with the objects, characters and environments of artificial reality.

Computer models and techniques for the generation and presentation of artificial reality commonly involve three-dimensional organization and processing, even if only for tracing light rays for both perspective and illumination. The central, "cartoon", characters and objects are often "finely wrought", and commonly appear visually pleasing. Alas, equal attention cannot be paid to each and every element of a scene, and the scene background to the focus characters and objects is often either stark, or unrealistic, or both.

Immersive video in accordance with the present invention provides the vast, relatively inexpensive, "database" of the real world (at all scales, time compressions/expansions, etc.) as a suitable "field of operation" (or "playground") for the characters of virtual reality.

When it is considered that immersive video permits viewer/user interactive viewing of a scene, then it is straightforward to understand that a viewer/use may "move" in and though a scene in response to what he/she "sees" in a composite scene of both a real, and an artificial virtual, nature. It is therefore possible, for example, to interactively flee from a "dinosaur" (a virtual animal) appearing in the scene of a real world city. It is therefore possible, for example, to strike a virtual "baseball" (a virtual object) appearing in the scene of a real world baseball park. It is therefore possible, for example, to watch a "tiger", or a "human actor" (both real animal) appearing in the scene of a virtual landscape (which landscape has been laid out in consideration of the movements of the tiger or the actor).

Note that (i) visual reality and (ii) virtual reality can, in accordance with the present invention, be combined with (1) a synthesis of real/virtual video images/television pictures of a combination real-world/virtual scene wherein the synthesized pictures are to user-specified parameters of presentation, e.g. panoramic or at magnification if so desired by the user, and/or (2) the synthesis of said real/virtual video images/television pictures can be 3D stereoscopic.

4. The Method of the Present Invention, In Brief

In brief, the present invention assumes, and uses, a three-dimensional model of the (i) static, and (ii) dynamic, environment of a real-world scene—a three-dimensional, environmental, model.

Portions of each of multiple video streams showing a single scene, each from a different spatial perspective, that are identified to be (then, at the instant) static by a running comparison are "warped" onto the three-dimensional environmental model. This "warping" may be into 2D (static) representations within the 3D model—e.g., a football field as is permanently static or even a football bench as is only normally static—or, alternatively, as a reconstructed 3D (static) object—e.g., the goal posts.

The dynamic part of each video stream (that rises from a particular perspective) is likewise "warped" onto the three-dimensional environmental model. Normally the "warping" of dynamic objects is into a reconstructed three-dimensional (dynamic) objects—e.g., a football player. This is for the simple reason that dynamic objects in the scene are of primary interest, and it is they that will later likely be important in synthesized views of the scene. However, the "warping" of a dynamic object may also be into a two-dimensional representation—e.g., the stadium crowd producing a wave motion.

Simple changes in video data determine whether an object is (then) static or dynamic.

The environmental model itself determines whether any scene portion or scene object is to be warped onto itself as a two-dimensional representation or as a reconstructed three-dimensional object. The reason no attempt is made to reconstruct everything in three-dimensions are twofold. First, video data i slacking to model everything in and about the scene in three dimensions—e.g., the underside of the field or the back of the crowd are not within any video stream. Second, and more importantly, there is insufficient computational power to reconstruct a three-dimensional video representation of everything that s within a scene, especially in real time (i.e., as television).

Any desired scene view is then synthesized (alternatively, "extracted") from the representations and reconstituted objects that are (both) within the three-dimensional model, and is displayed to a viewer/user.

The synthesis/extraction may be in accordance with a viewer specified criterion, and may be dynamic in accordance with such criterion. For example, the viewer or a football game may request a consistent view from the "fifty yard line", or may alternatively ask to see all plays from the a stadium view at the line of scrimmage. The views presented may be dynamically selected in accordance with an object in the scene, or an event in the scene.

Any interior or exterior -perspectives on the scene may be presented. For example, the viewer may request a view looking into a football game from the sideline position of a coach, or may request a view looking out of the football game from at the coach from the then position of the quarterback on the football field. Any requested view may be panoramic, or at any aspect ratio, in presentation. Views may also be magnified, or reduced in size.

Finally, any and all views can be rendered stereoscopically, as desired.

The synthesized/extracted video views may be processed in real time, as television.

Any and all synthesized/extracted video views contain only as much information as is within any of the multiple video streams; no video view can contain information that is not within any video stream, and will simply show black (or white) in this area.

5. The System of the Present Invention, In Brief

In brief, the computer system of the present invention receives multiple video images of view on a real world scene, and serves to synthesize a video image of the scene which synthesized image is not identical to any of the multiple received video images.

The computer system includes an information base containing a geometry of the real-world scene, shapes and dynamic behaviors expected from moving objects in the scene, plus, additionally, internal and external camera calibration models on the scene.

A video data analyzer means detects and tracks objects of potential interest in the scene, and the locations of these objects.

A three-dimensional environmental model builder records the detected and tracked objects at their proper locations in a three-dimensional model of the scene. This recording is in consideration of the information base.

A viewer interface is responsive to a viewer of the scene to receive a viewer selection of a desired view on the scene. This selected and desired view need not be identical to any views that are within any of the multiple received video images.

Finally, a visualizer generates (alternatively, "synthesizes") (alternatively "extracts") from the three-dimensional model of the scene, and in accordance with the received desired view, a video image on the scene that so shows the scene from the desired view.

These and other aspects and attributes of the present invention will become increasingly clear upon reference to the following drawings and accompanying specification.

BRIEF DESCRIPTION OF THE DRAWINGS

FIG. 9c is another graphical rendition of the full 3D environment model generated by the environmental model builder of the immersive video system of the present invention, this time for an outdoor karate demonstration, this time the environmental model being further shown to be located in the static scene, particularly of an outdoor courtyard.

FIG. 11 is a listing of Algorithm 1, the Vista "Compositing" or "Hypermosaicing" Algorithm, in accompaniment to a diagrammatic representation of the terms of the algorithm, of the present invention where, at each time instant, multiple vistas are computed using the current dynamic model and video streams from multiple perspective; for stereoscopic presentations vistas are created from left and from right cameras.

FIG. 12 is a listing of Algorithm 2, the Voxel Construction and Visualization for Moving Objects Algorithm in accordance with the present invention.

DESCRIPTION OF THE PREFERRED EMBODIMENT

Figure 1A:
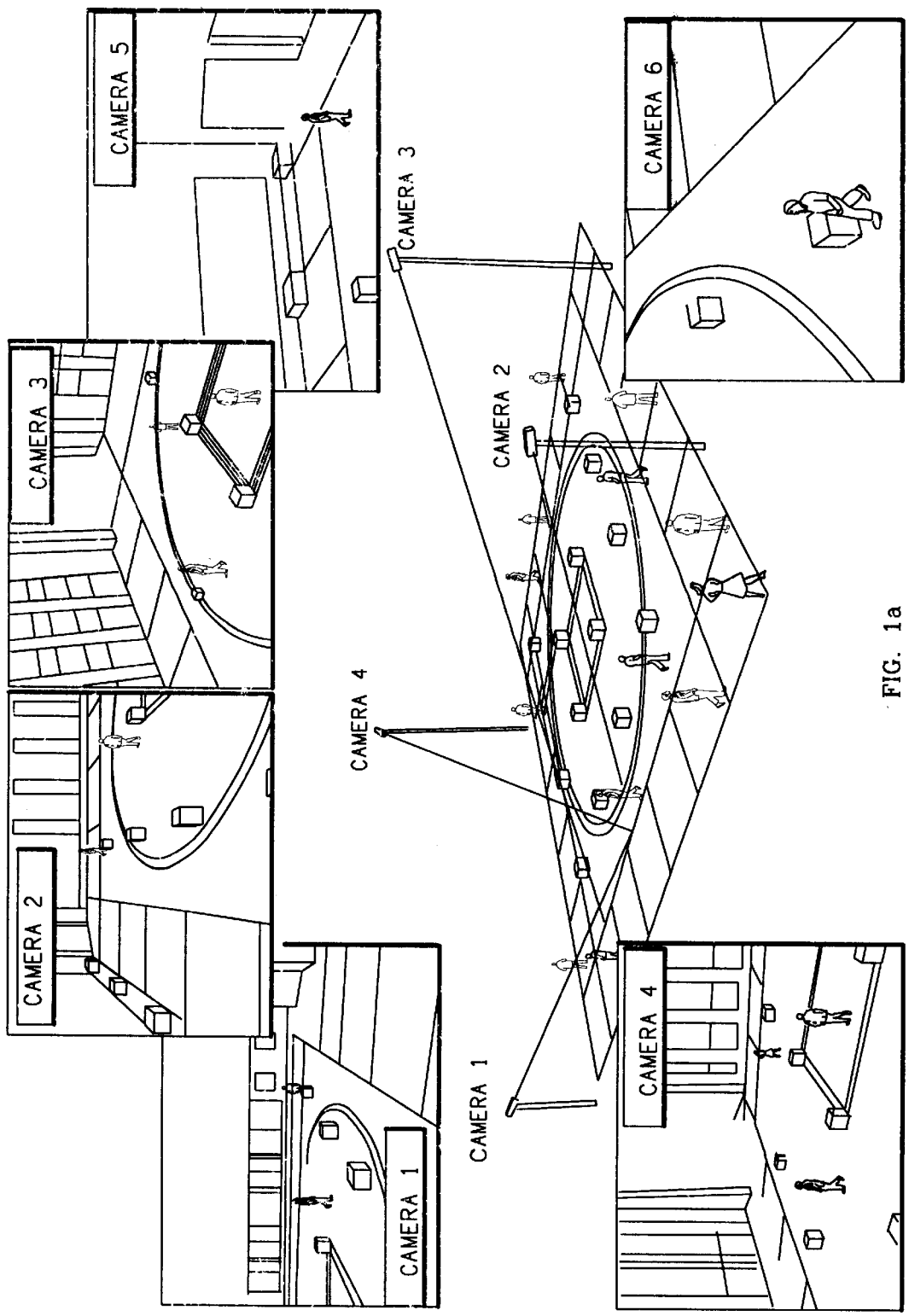
FIG. 1, consisting of FIGS. 1a through 1c, is a diagrammatic view showing how immersive video in accordance with the present invention uses video streams from multiple strategically-located cameras that monitor a real-world scene from different spatial perspectives.

Because it provides a comprehensive visual record of environment activity, video data is an attractive source of information for the creation of "virtual worlds" which, nonetheless to being virtual, incorporate some "real world" fidelity. The present invention concerns the use of multiple streams of video data for the creation of immersive, "visual reality", environments.

The immersive video system of the present invention for so synthesizing "visual reality" from multiple streams of video data is based on, and is a continuance of the inventors' previous work directed to Multiple Perspective Interactive Video (MPI-Video), which work is the subject of the related predecessor patent application. An immersive video system incorporates the MPI-Video architecture, which architecture provides the infrastructure for the processing and the analysis of multiple streams of video data.

The MPI-Video portion of the immersive video system (i) performs automated analysis of the raw video and (ii) constructs a model of the environment and object activity within the environment. This model, together with the raw video data, can be used to create immersive video environments. This is the most important, and most difficult, functional portion of the immersive video system. Accordingly, this MPI-Video portion of the immersive video system is first discussed, and actual results from an immersive "virtual" walk through as processed by the MPI-Video portion of the immersive video system are presented.

1. The Motivation for Immersive Video

As computer applications that model and interact with the real-world increase in numbers and types, the term "virtual world" is becoming a misnomer. These applications, which require accurate and real-time modeling of actions and events in the "real world" (e.g., gravity), interact with a world model either directly (e.g., "telepresence") or in a modified form (e.g., augmented reality). A variety of mechanisms can be employed to acquire data about the "real world" which is then used to construct a model of the world for use in a "virtual" representation.

Long established as a predominant medium in entertainment and sports, video is now emerging as a medium of great utility in science and engineering as well. It thus comes as little surprise that video should find application as a "sensor" in the area of "virtual worlds." Video is especially useful in cases where such "virtual worlds" might usefully incorporate a significant "real world" component. These cases turn out to be both abundant and important; basically because we all live in, and interact with, the real world, and not inside a computer video game. Therefore, those sensations and experiences that are most valuable, entertaining and pleasing to most people most of the time are sensations and experiences of the real world, or at least sensations and experiences that have a strong real-world component. Man cannot thrive on fantasy alone (which state is called insanity); a good measure of reality is required.

Figure 16A:
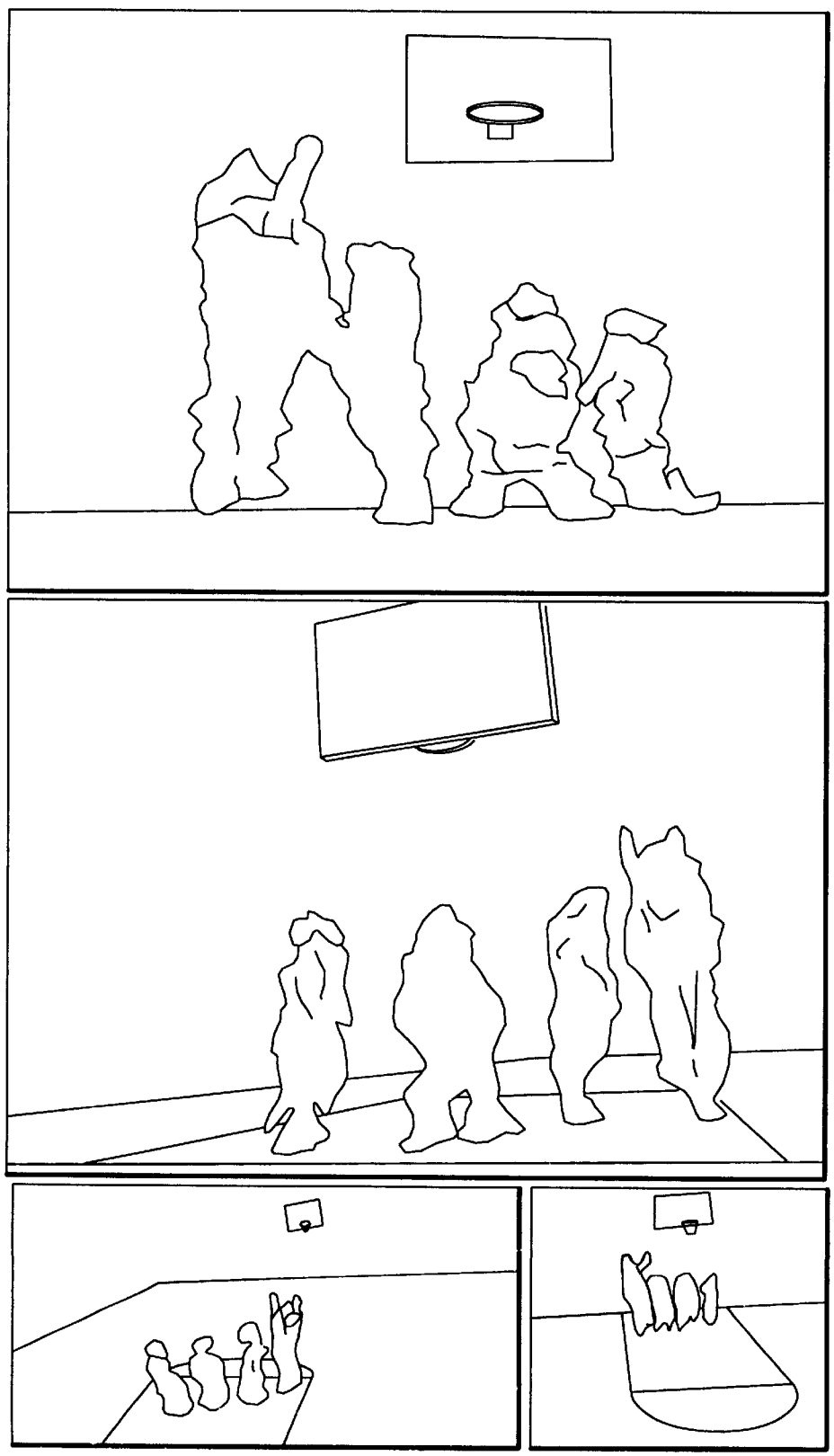
FIG. 16, consisting of FIGS. 15a through 16b, are synthetic video frames, similar to the frames of FIGS. 10 and 13, created by the immersive video system of the present invention at various user-specified viewpoints during an entire performance of a basketball game, the virtual views of the basketball game of FIG. 16 being rendered at a still higher resolution than were the virtual views of the outdoor karate exercise of FIG. 10 or the indoor karate exercise of FIG. 13.
Figure 16B:
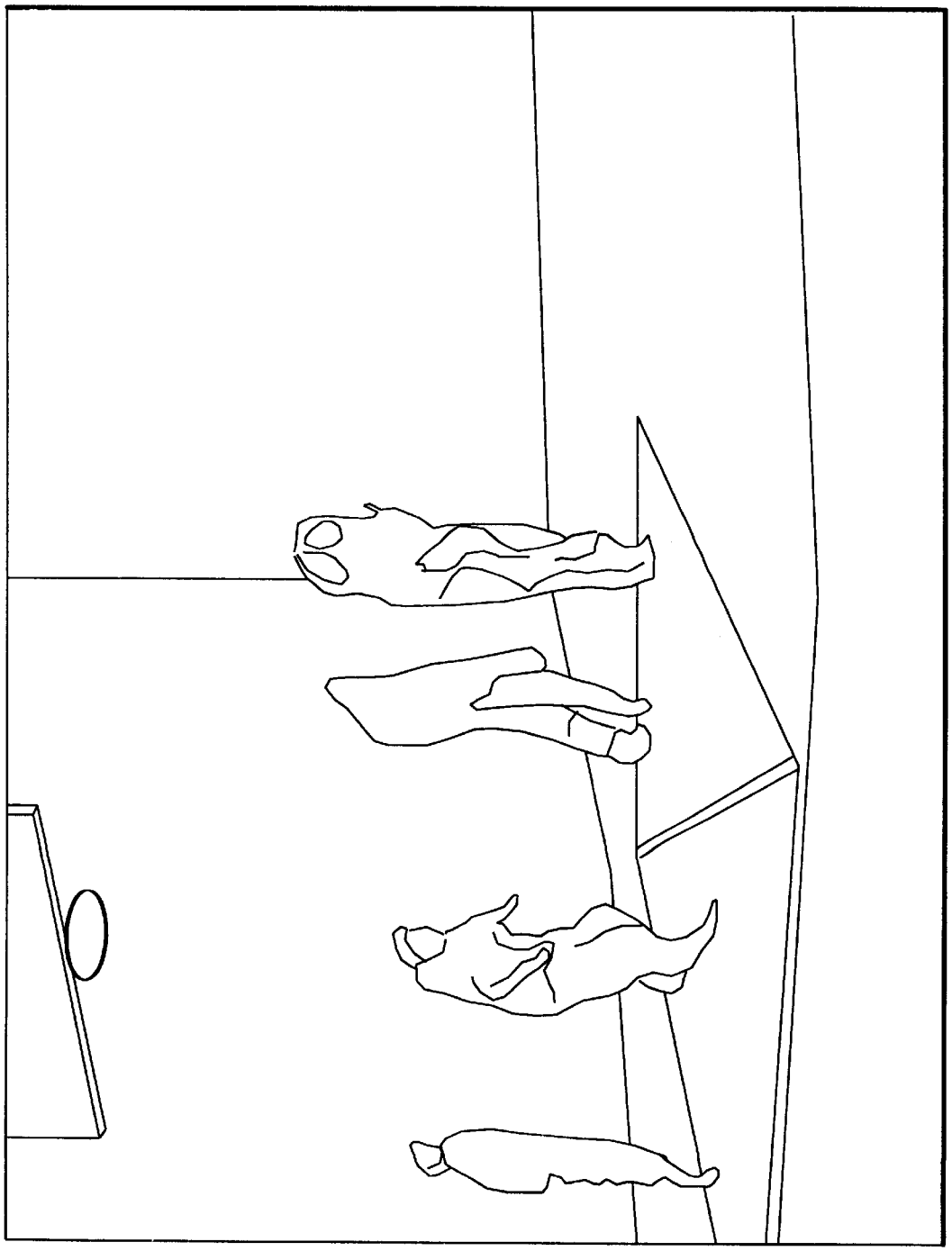

In one such use of video as a "sensor", multiple video cameras cover a dynamic, real-world, environment. These multiple video data streams are a useful source of information for building, first, accurate three-dimensional models of the events occurring in the real world, and, then, completely immersive environments. Note that the immersive environment does not, in accordance with the present invention, come straight from the real world environment. The present invention is not simply a linear, brute-force, processing of two-dimensional (video) data into a three-dimensional (video) model (and the subsequent uses thereof). Instead, in accordance with the present invention, the immersive environment comes to exist through a three-dimensional model, particularly a model of real-world dynamic events. This will later become clearer such as in, inter alia, the discussion of FIG. 16a.

In the immersive video system of the present invention, visual processing algorithms are used to extract information about object motion and activity (both of which are dynamic by definition) in the real world environment. This information—along with (i) the raw video data and (ii) a priori information about the geometry of the environment—is used to construct a coherent and complete visual representation of the environment. This representation can then be used to construct accurate immersive environments based on real world object behavior and events. Again, the rough concept, if not the particulars, is clear. The immersive environment comes to be only through a model, or representation, or the real world environment.

While video data proves powerful source medium for these tasks (leading to the model, and the immersive environment), the effective use of video requires sophisticated data management and processing capabilities. The manipulation of video data is a daunting task, as it typically entails staggering amounts of complex data. However, in restricted domains, using powerful visual analysis techniques, it is possible to accurately model the real world using video streams from multiple perspectives covering a dynamic environment. Such "real-world" models are necessary for "virtual world" development and analysis.

The MPI-Video portion of the immersive video system builds the infrastructure to capture, analyze and manage information about real-world events from multiple perspectives, and provides viewers (or persons interacting with the scene) interactive access to this information. The MPI-Video sub-system uses a variety of visual computing operations, modeling and visualization techniques, and multimedia database methodologies to (i) synthesize and (ii) manage a rich and dynamic representation of object behavior in real-world environments monitored by multiple cameras (see in FIG. 2)

An Environment Model (EM) is a hierarchical representation of (i) the structure of an environment and (ii) the actions that take place in this environment. The EM is used as a bridge between the process of analyzing and monitoring the environment and those processes that present information to the viewer and support the construction of "immersive visual reality" based on the video data input.

The following sections explain the use of multiple streams of video data to construct "immersive visual reality" environments. In addition, salient details are provided regarding support of the MPI-Video subsystem for other video analysis tasks.

A variety of design issues arise in realizing immersive environments, and in managing and processing of multiple streams of video data area. These issues include, for instance, how to select a "best" view from the multiple video streams, and how to recognize the frame(s) of a scene "event". Interactively presenting the information about the world to the viewer is another important aspect of "immersive visual reality". For many applications and many viewer/users, this includes presentation of a "best" view of the real-world environment at all times to the viewer/user. Of course, the concept of what is "best" is dependent on both the viewer and the current context. In following Section 3, the different ways of defining the "best" view, and how to compute the "best" view based on viewer preferences and available model information, is described.

In some applications, e.g., "telepresence" and "telecontrol", immersion of the viewer/user is vital. Selecting the "best" view among available video streams, which selection involves constant change of viewer perspective, may be detrimental towards creating immersion. Generalizing the "best" view concept to selecting a continuous sequence of views that best suit viewer/user requirements and create immersion overcomes this. When such arbitrary views are selected, then the world must somehow be visualized from that perspective for the viewer/user.

Traditionally, immersion has been realized by rendering three-dimensional models realistically, preferably in stereo. This is the approach of the common computer game, circa 1995, offering "graphics immersion". This approach, which uses a priori texture maps, suffers from some defects when the immersive experience to be created is that of a real-world environment. In real-world environments, the lighting conditions change constantly in ways that cannot be modeled precisely. Also, unknown dynamic objects can appear, and when they do it is not clear how and what to render.

When multiple video cameras covering an environment from multiple perspectives, as in the immersive video system of the present invention, than, in accordance with the invention, video can be used as a dynamic source of generating texture information. The complete immersive video system discussed in Section 4 uses comprehensive three dimensional model of the environment and the multiple video channels to create immersive, realistic renditions of real-world events from arbitrary perspective in both monocular and stereo presentations.

The further sections of this specification are organized as follows: Section 3 is a description of the construction of accurate three dimensional models of an environment from multi-perspective video streams in consideration of a priori knowledge of an environment. Specifically, section 3 discusses the creation of an Environment Model and also provide details on the preferred MPI-Video architecture.

Following this, section 4 describes how this model, along with the raw video data, can be used to build realistic "immersive visual reality" vistas, and how a viewer can interact with the model.

Details on the implementation of the MPI-Video portion of the immersive video system, outlining hardware details, etc., are given in section 5.

The possibilities of using video to construct immersive environments are limitless. Section 6 describe various applications of the immersive video system of the present invention.

2. Applications of Video-Based Immersive Environments

It is the contention of the inventors that video of real-world scenes will play an important role in automation and semi-automation of both (i) virtual and (ii) immersive visual reality environments. In telepresence applications, a virtual copy of the world is created at a remote site to produce immersion. See B. Chapin, *Telepresence Definitions*, a World Wide Web (WWW) document on the Internet at URL http://cdr.stanford.edu/html/telepresence/definition.html, 1995. Key features of telepresence applications are: 1) the entire application is real-time; 2) the virtual world is reasonably faithful to the real world being mimicked; 3) since real-time and real-world are cardinal, sensors should be used in acquiring the virtual world in a completely automated way; and 4) the virtual world must be visualized realistically from the viewer perspective.

Figure 10A:
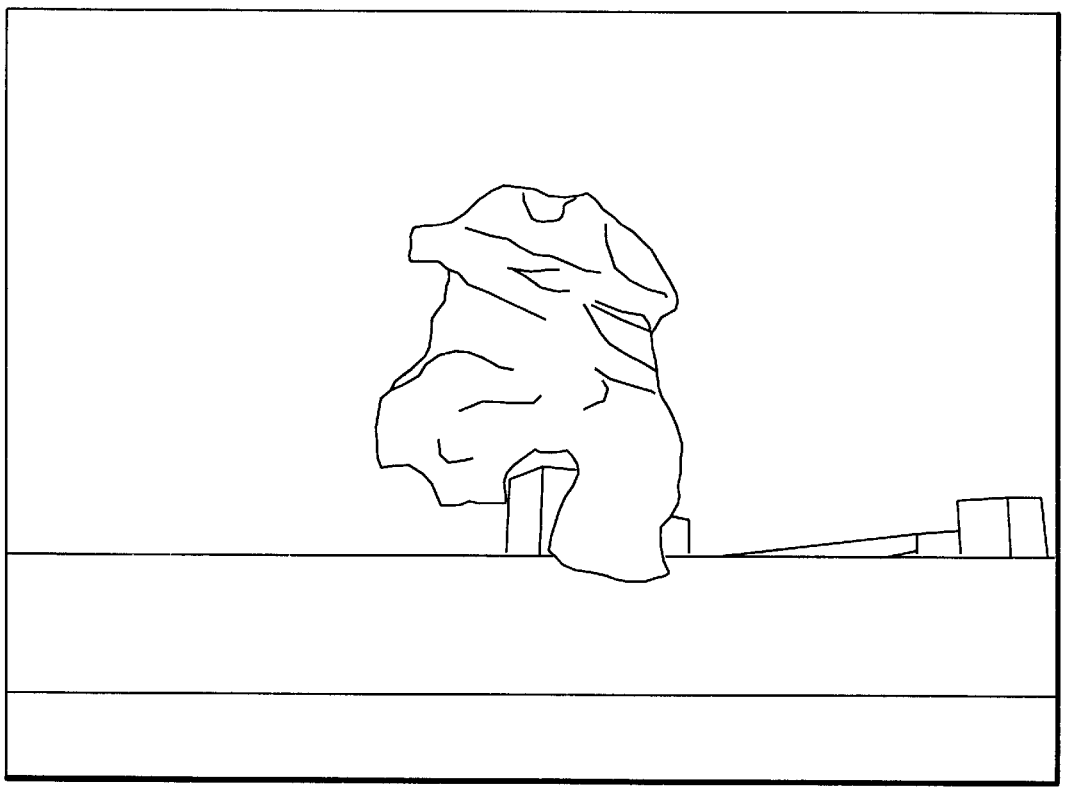
FIG. 10, consisting of FIG. 10a through 10h, are successive synthetic video frames created by the immersive video system of the present invention at various user-specified viewpoints during an entire performance of a outdoor karate exercise by an actor in the scene, the 3D environmental model of which outdoor karate exercise was previously seen in FIG. 9c.
Figure 10B:
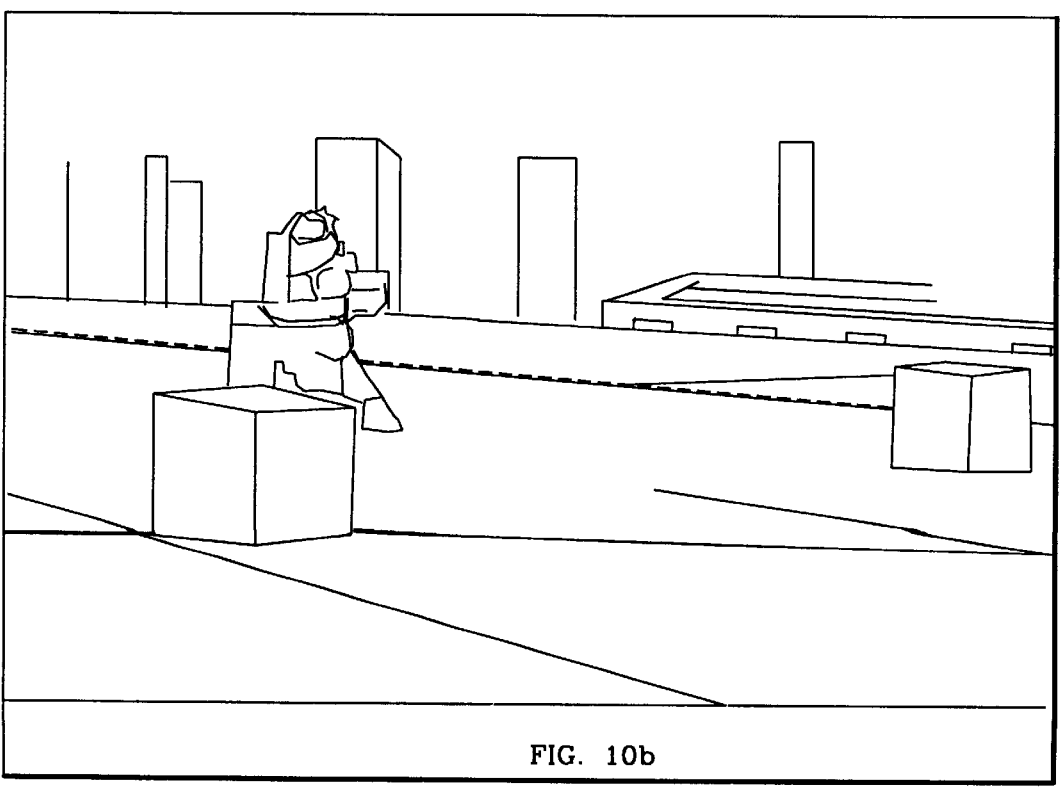
Figure 10C:
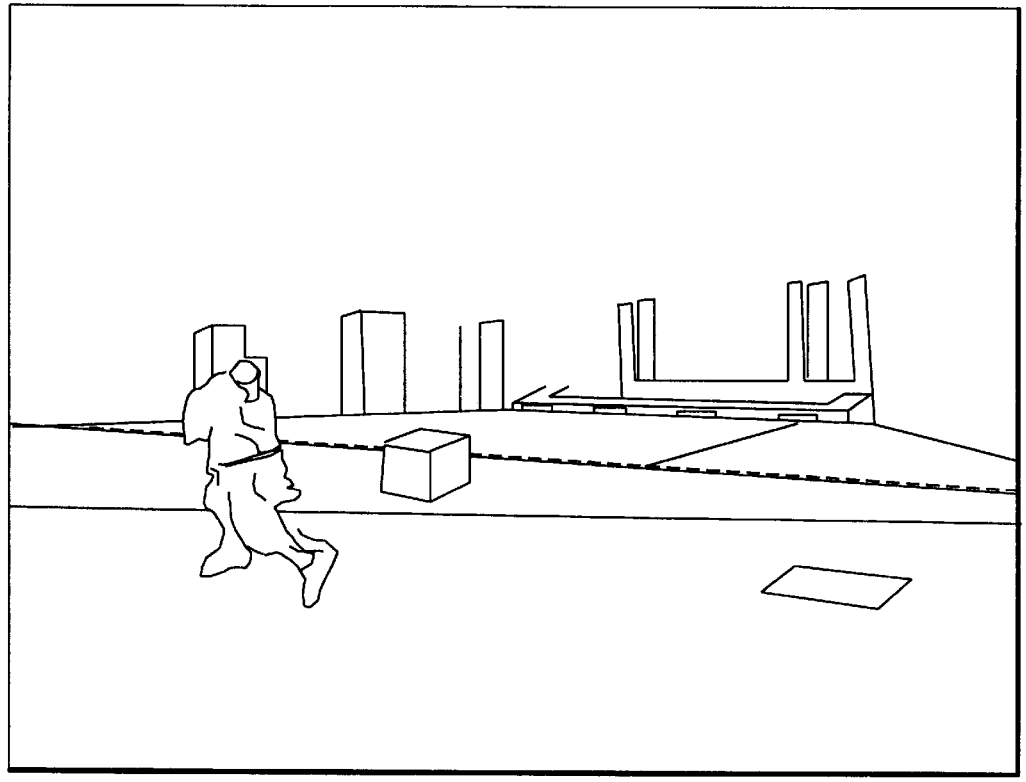
Figure 10D:
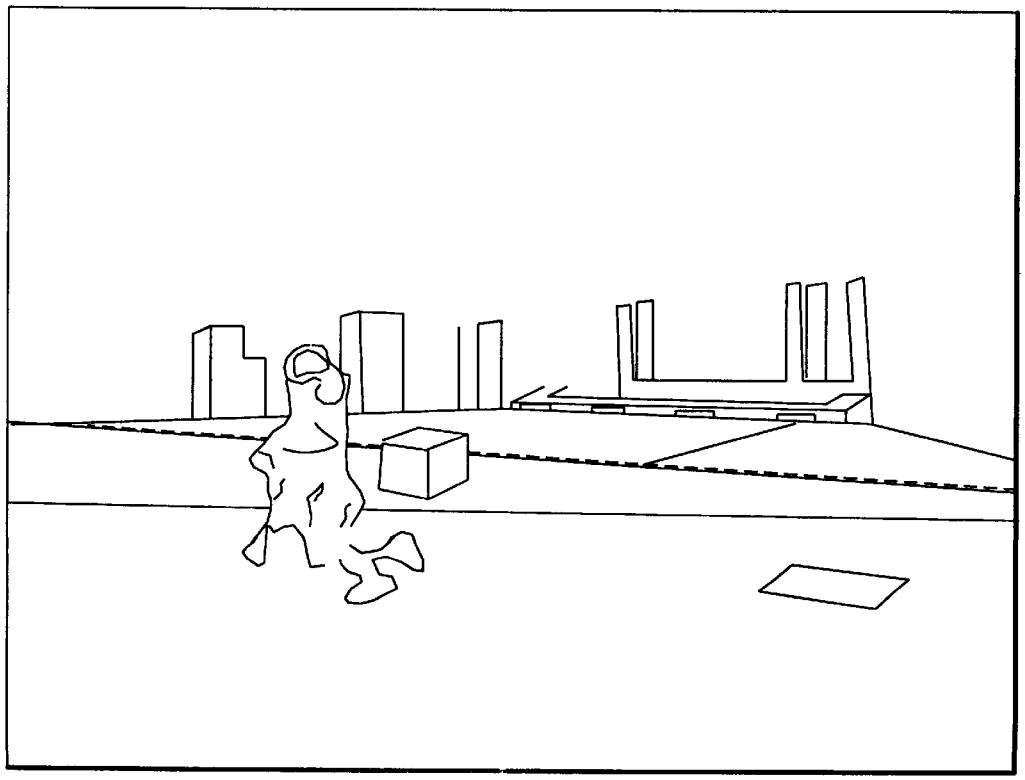
Figure 10E:
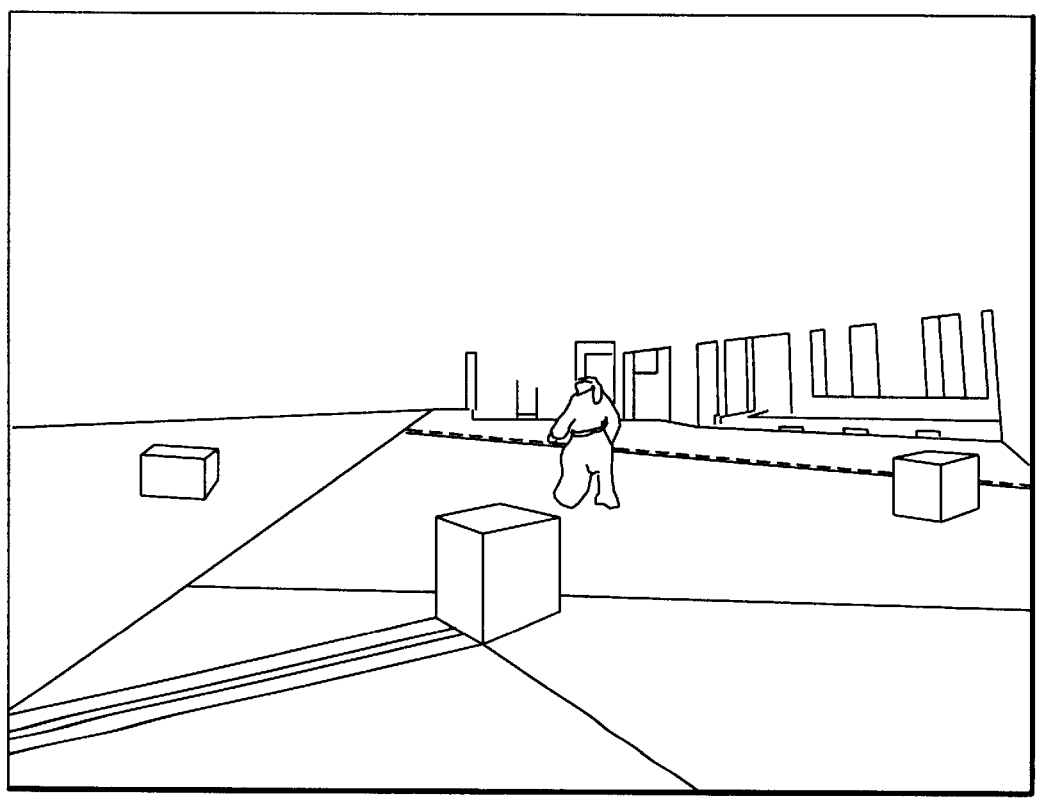
Figure 10F:
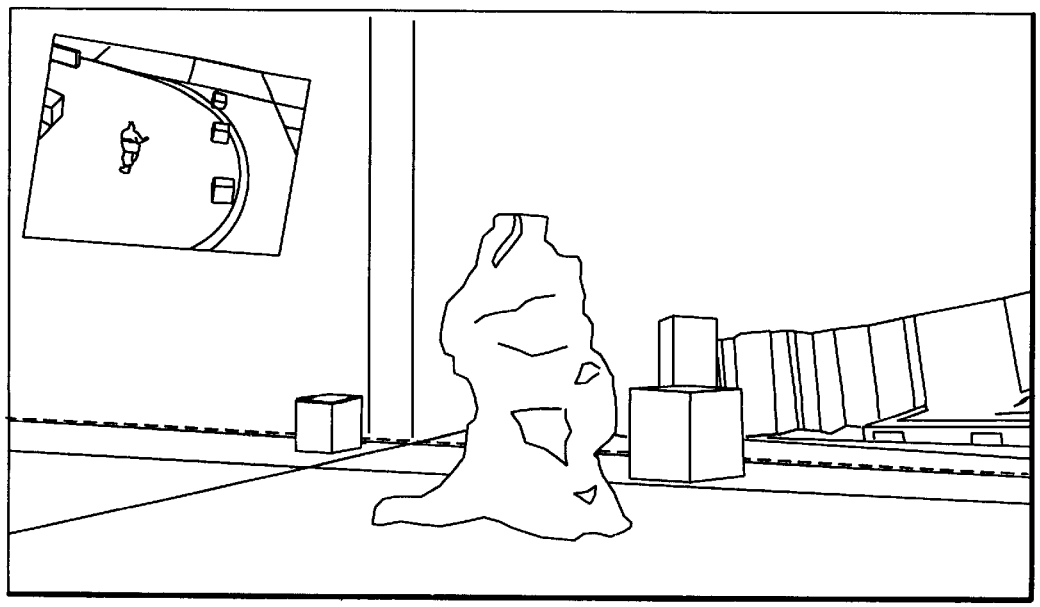
Figure 10G:
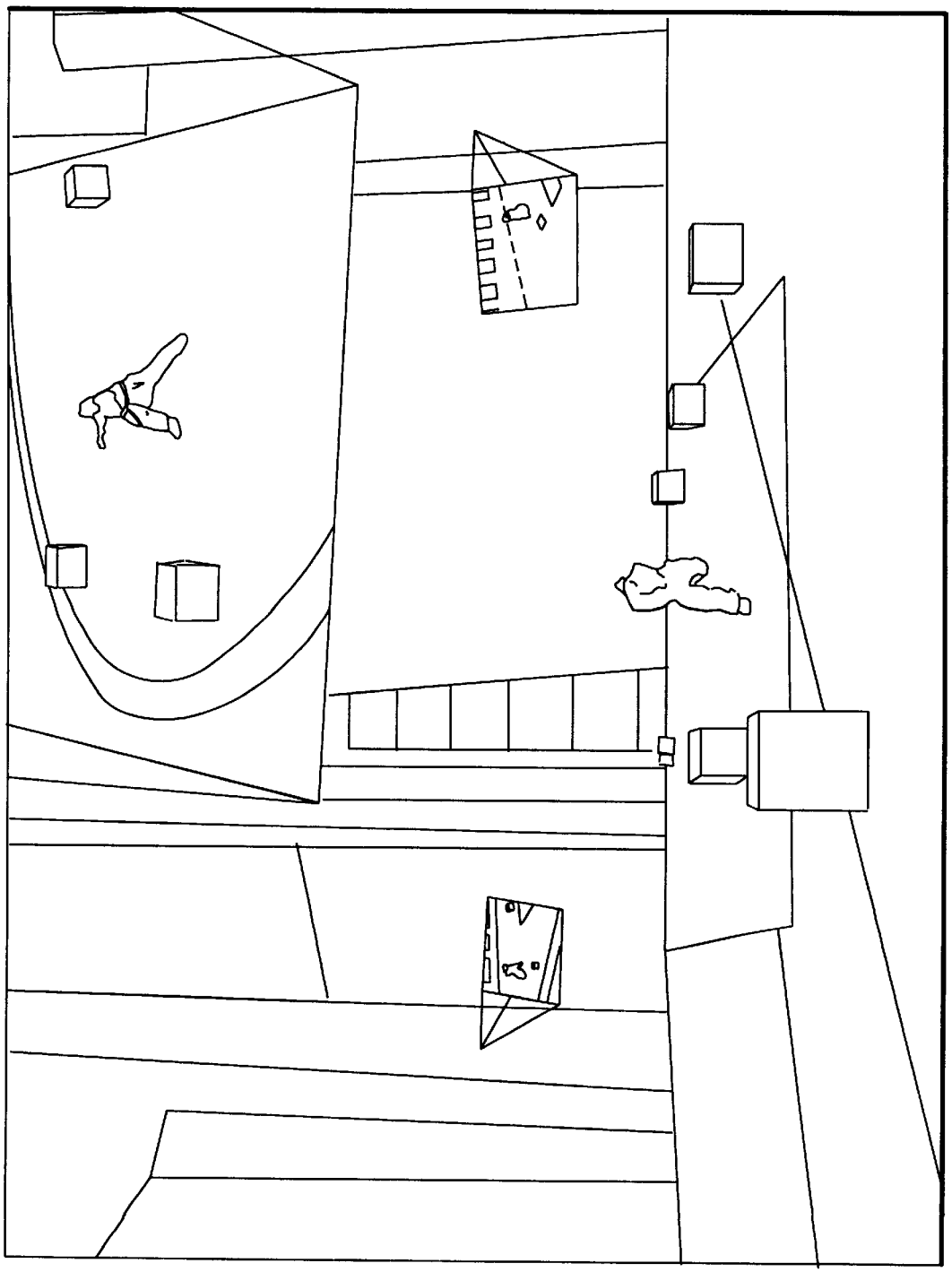
Figure 10H:
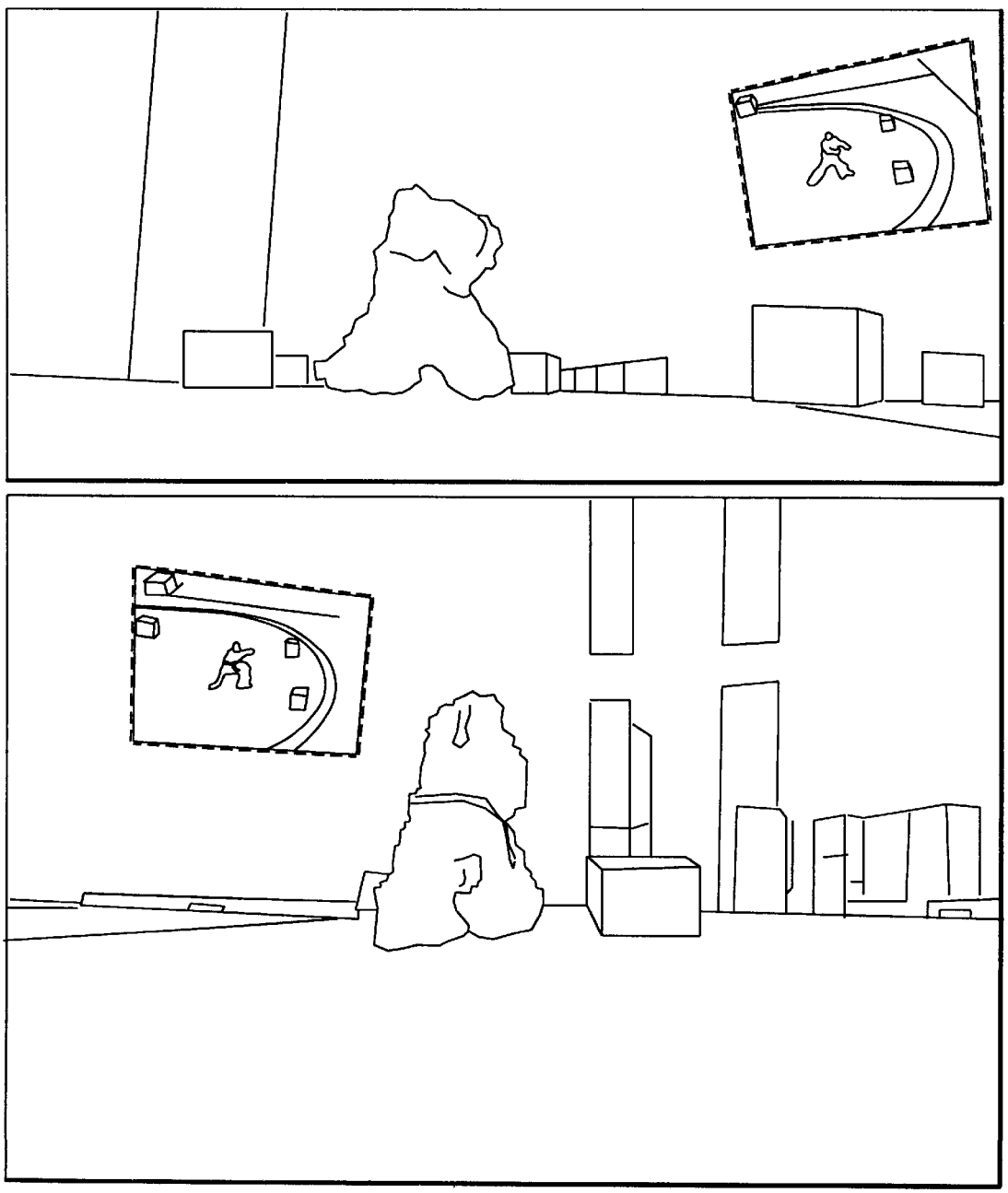
Figure 13A:
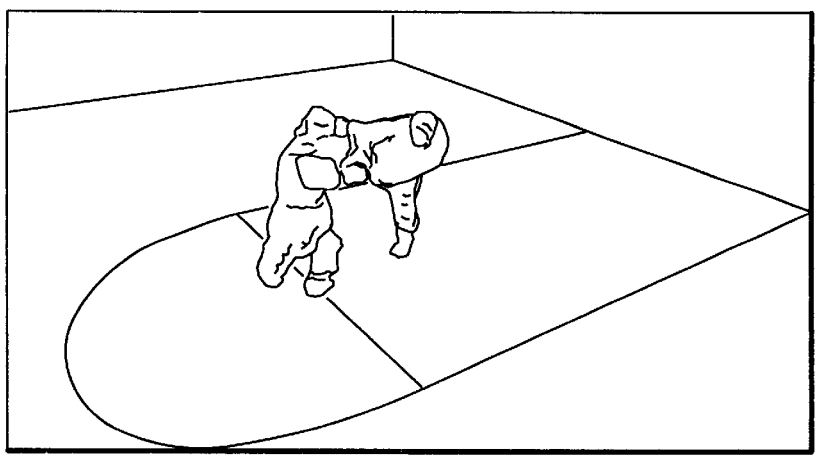
FIG. 13, consisting of FIGS. 13a through 13c, are successive synthetic video frames, similar to the frames of FIG. 10, created by the immersive video system of the present invention at various user-specified viewpoints during an entire performance of a indoor karate exercise by an actor in the scene, the virtual views of an indoor karate exercise of FIG. 13 being rendered at a higher resolution than were the virtual views of the outdoor karate exercise of FIG. 10.
Figure 13B:
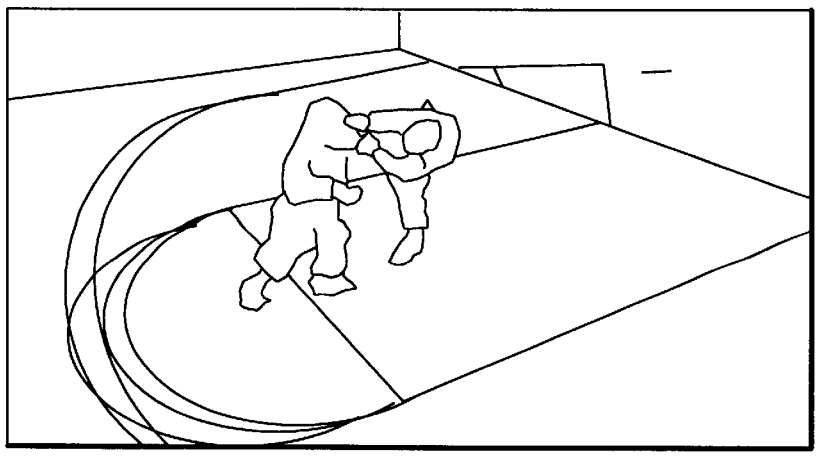
Figure 13C:
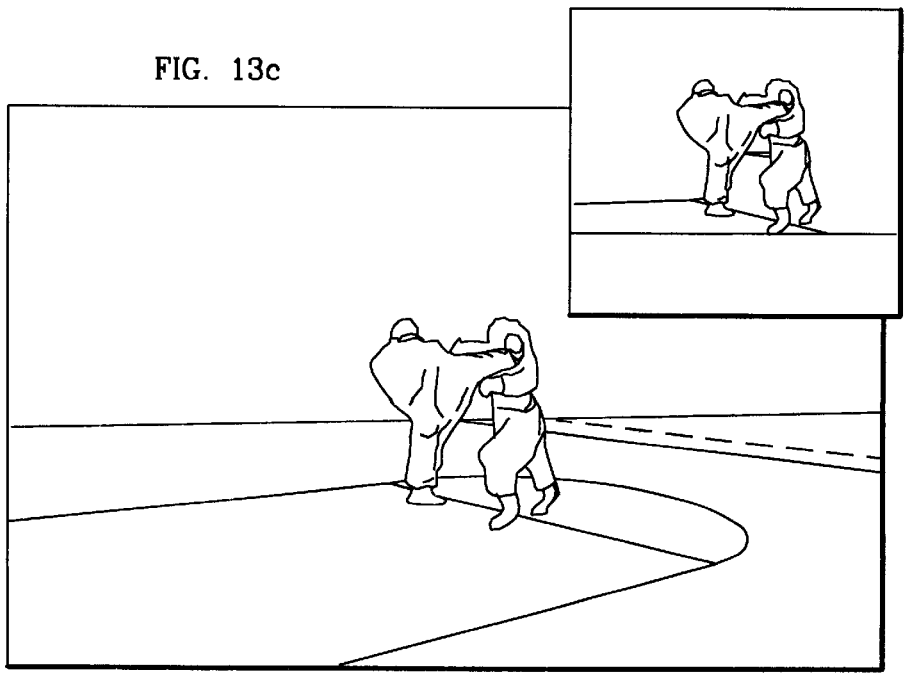

The MPI--Video modeling system described in Section 3 uses multiple video signals to faithfully reconstruct a model of the real-world actions and structure. A distributed implementation coupled with expectation-driven, need-based analysis (described in Section 5) ensures near real-time model construction. The preferred immersive video system, described in Section 4, reconstructs realistic monocular and stereo vistas from the viewer perspective (see, for example, FIG. 10*b*).

Even in non-real time applications, video-based systems, such as the one taught in this specification, can be very beneficial. Generally, it is very difficult and laborious to construct virtual environments be hand. In a semi-autonomous mode, however, a video-based system can assist the user by assuming the low level tasks like building the structural model based on the real-world, leaving only high level annotation to the user.

Video data can be used to collect a myriad of visual information about an environment. This information can be stored, analyzed and used to develop "virtual" models of the environment. These models, in turn can be analyzed to determine potential changes or modifications to an environment. For instance, MPI-Video might be employed at a particularly hazardous traffic configuration. Visual data of traffic would be recorded and analyzed to determine statistics about usage, accident characteristics, etc. Based on this analysis, changes to the environment could be designed and modeled, where input to the model again could come from the analysis performed on the real data. Similarly, architectural analysis could benefit by the consideration of current building structures using MPI-Video. This analysis could guide architects in the identification and modeling of building environments.

3. MPI-Video Architecture

To effectively create synthetic worlds which integrate real and virtual components, sophisticated data processing and data management mechanisms are required. This is especially true in the case where video is employed because high frame rates and large images result in daunting computational and storage demands. The present invention address such data processing and management issues through the concept of Multiple Perspective Interactive Video (MPI-Video).

MPI-Video is a framework for the management and interactive access to multiple streams of video data capturing different perspectives of the same or of related events. As applied to the creation of virtual environments, MPI-Video supports the collection, processing and maintenance of multiple streams of data which are integrated to represent an environment. Such representations can be based solely on the "real" world recorded by the video cameras, or can incorporate elements of a "virtual" world as well.

Figure 1B:
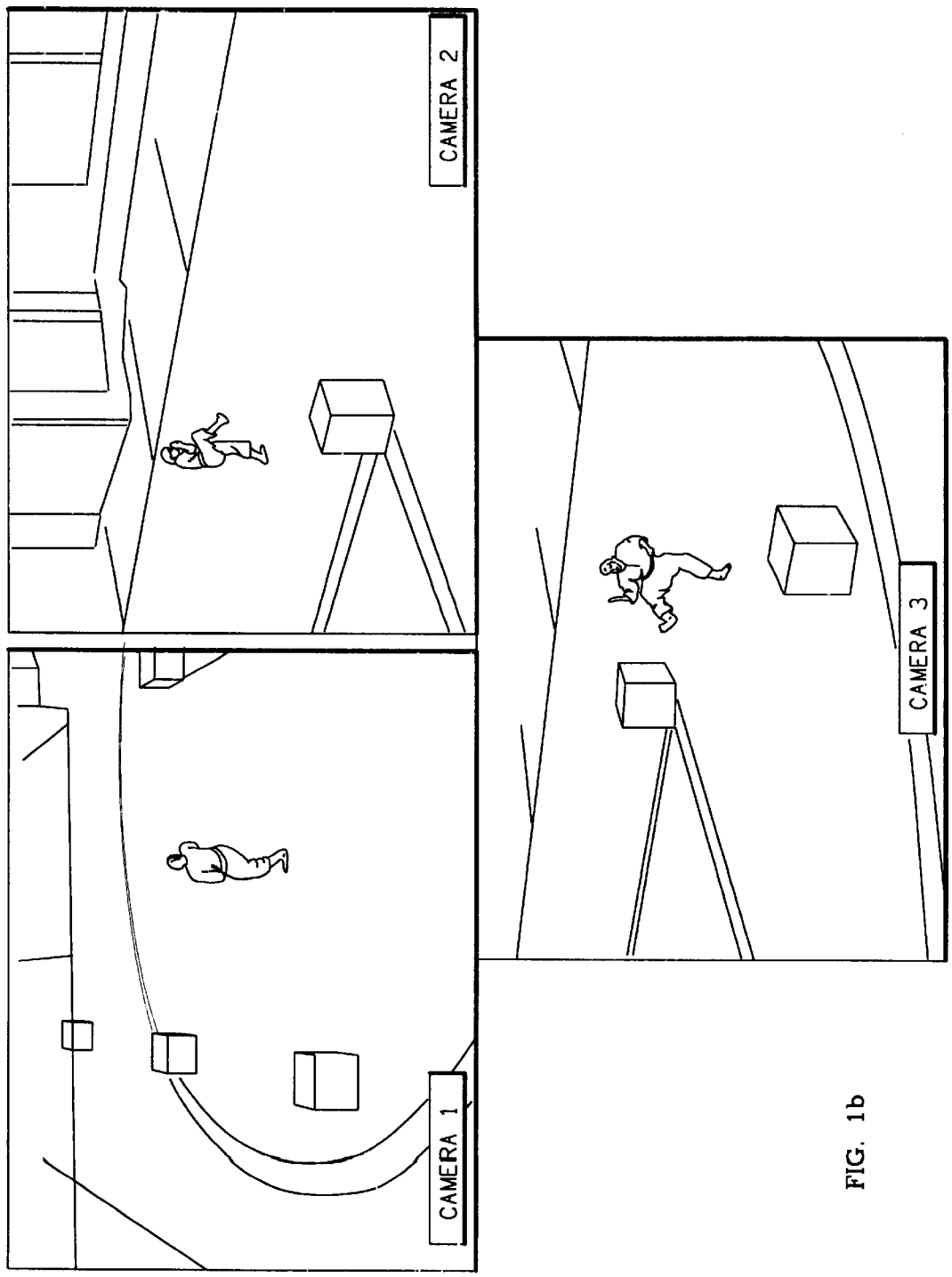
Figure 1C:
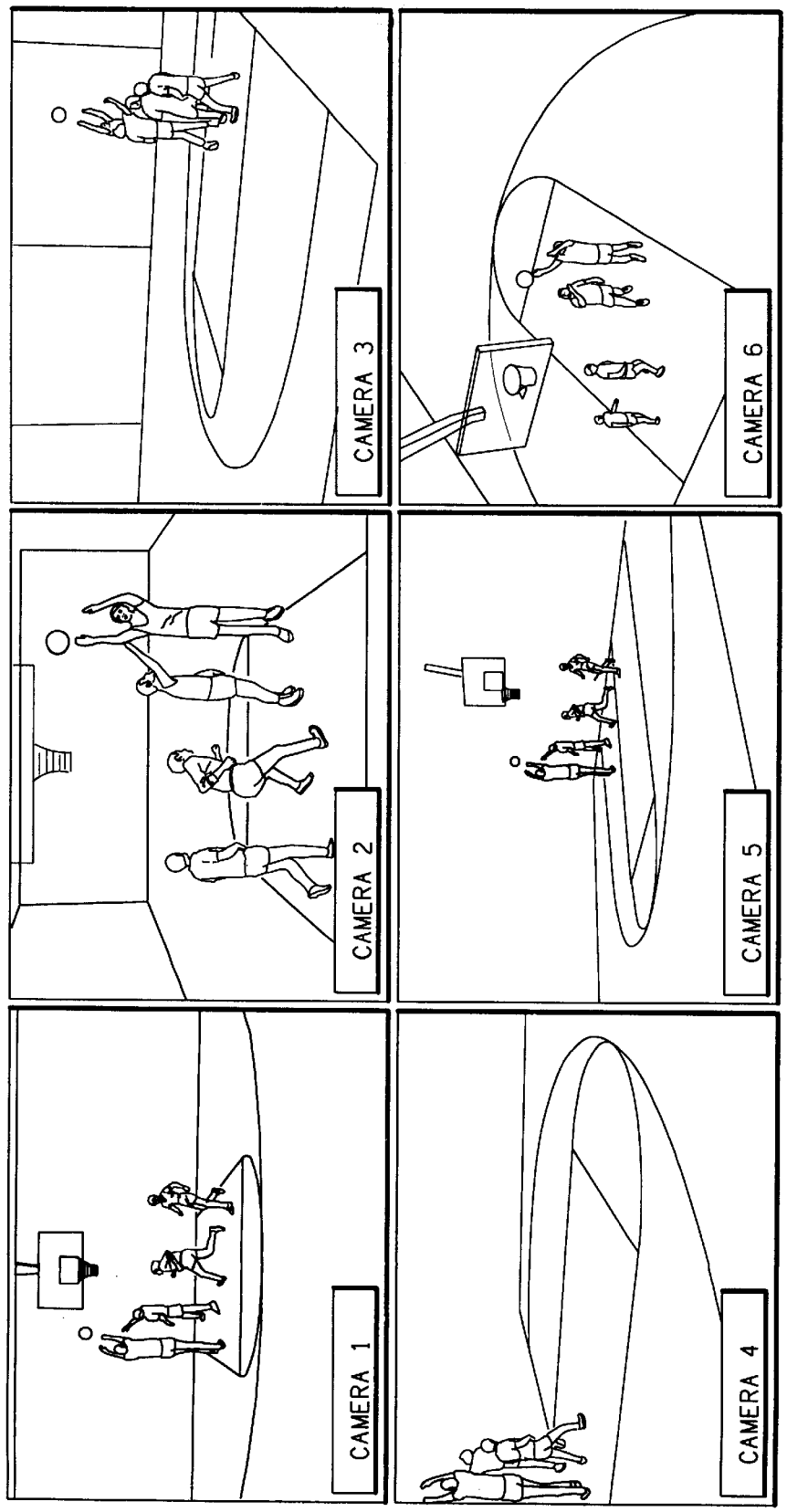

The preferred MPI-Video system supports a structured approach to the construction of "virtual worlds" using video data. In this section the MPI-Video architecture, shown in FIG. 1, is outlined. Those elements salient to the application of MPI-Video in the context of the processing and creation of "immersive visual reality" are highlighted.

In brief, MPI-Video architecture involves the following operations. During processing, multiple data streams are forwarded to the Video Data Analyzer. This unit evaluates each stream to (i) detect and track objects and (ii) identify events recorded in the data. Information derived in the Video Data Analyzer is sent to the Assimilator. Data from all input streams is integrated by the Assimilator and used to construct a comprehensive representation of events occurring in the scene over time (e.g. object movements and positions), The Assimilator thus models spatial-temporal activities of objects in the environment, building a so-called environment model. In addition, these tracking and modeling processes provide input to the model which maintains both the annotated raw video data as well as information about object behavior, histories and events. Information in the model can be queried by the user or by system processes for information about the events recorded by the video streams as well as being a data repository for analysis operations. A View Selector module—used to compute and select "best views" and further discussed below—interfaces with the model and a user interface subsystem to select appropriate views in response to user or system input.

A visualizer and virtual view builder uses the raw video data, along with information from the environment model to construct synthetic views of the environment.

Finally, a user interface provides a variety of features to support access, control and navigation of the data.

Figure 2:
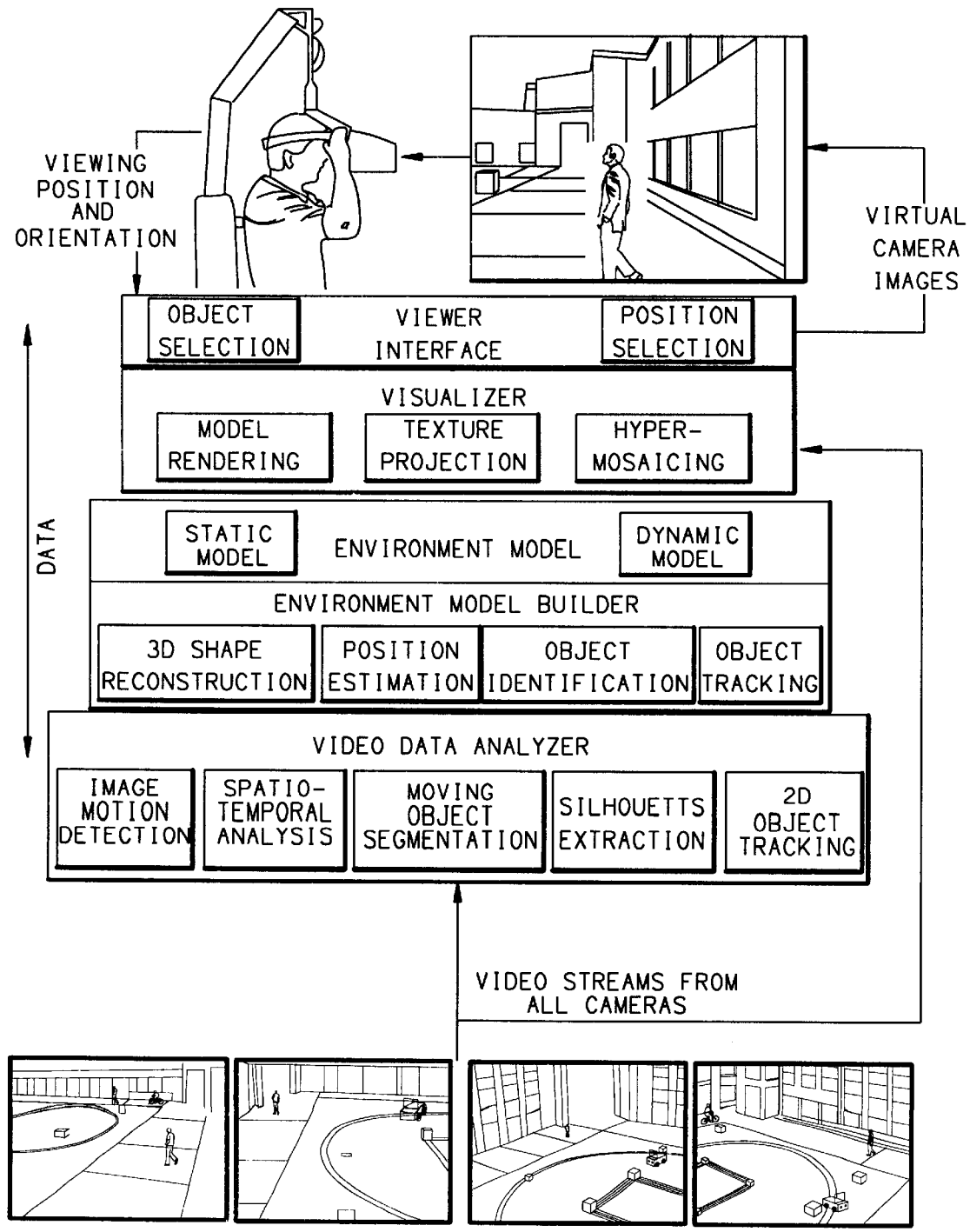
FIG. 2 is a schematic block diagram of the software architecture of the immersive video system in accordance with the present invention.
Figure 3:
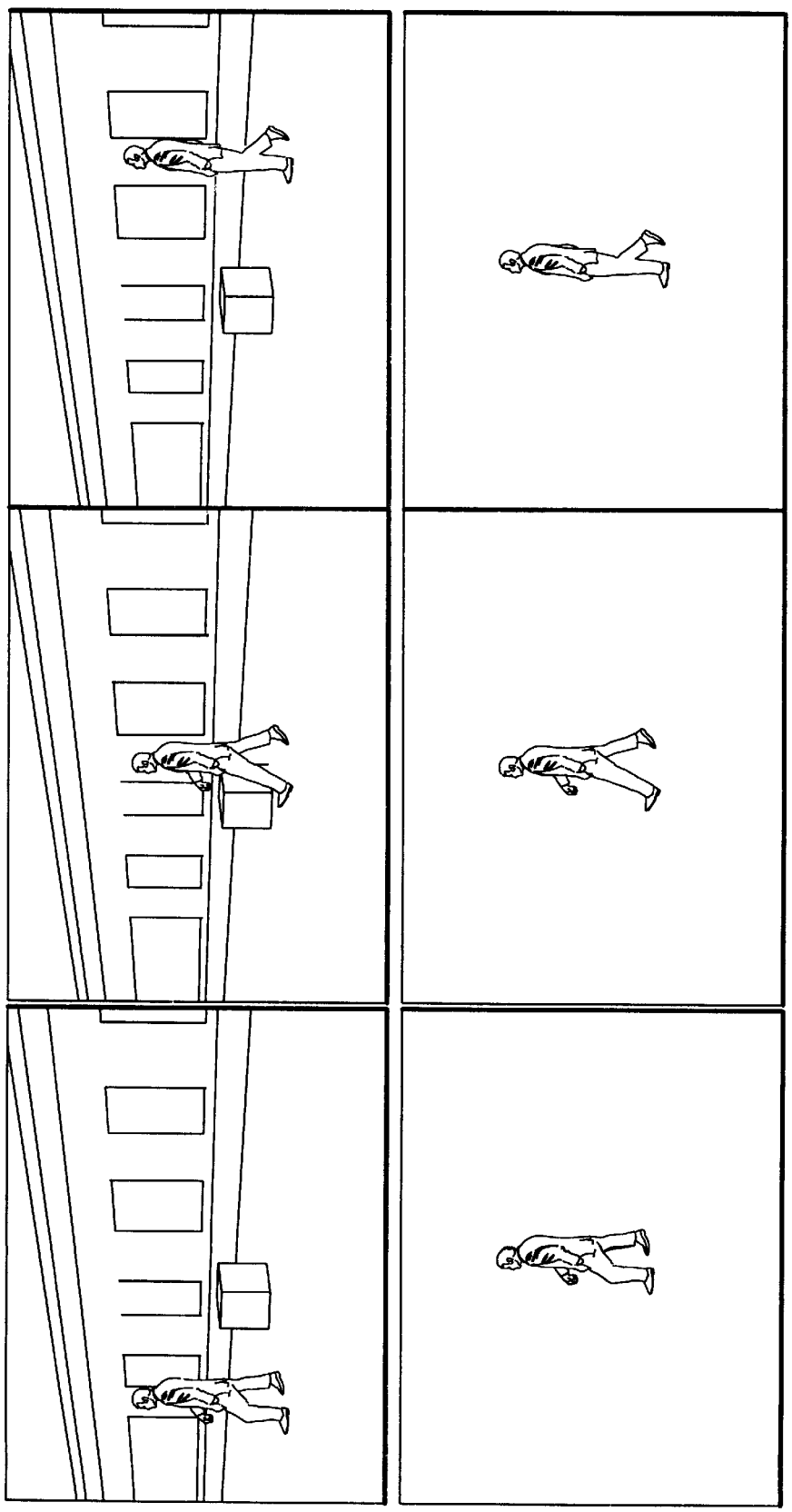
FIG. 3 is a pictorial view showing how the video data analyzer portion of the immersive video system of the present invention detects and tracks objects of potential interest and their locations in the scene.

To demonstrate and explore the ideas involved in MPI-Video, a prototype system was constructed. The prototype system uses data from a university courtyard environment. FIG. 2 shows a schematic of this courtyard environment, indicating the positions of the cameras. Synchronized frames from each of the four cameras are shown in FIG. 3.

3.1 Three-Dimensional Environmental Model

"Virtual worlds"—whether of an actual "real world" environment or a purely synthetic environment—depend on the creation and maintenance of an Environment Model (EM). The EM will be understood to be a comprehensive three-dimensional model containing both (i) the structural primitives of the static environment, e.g. surfaces, shapes, elevation, and (ii) characteristics of moving objects such as motion, position and shapes.

Formally, the preferred EM consists of a set of interdependent objects $O^i(t)$. This set in turn is comprised of a set of dynamic objects $D_{v,i}(t)$ and a set of static objects $S_{o,i}$. For instance, vehicles moving in a courtyard are dynamic objects pillars standing in the courtyard are static objects. The time variance of the set $O_i(t)$ is a result of the time variation of the dynamic objects.

Figure 4:
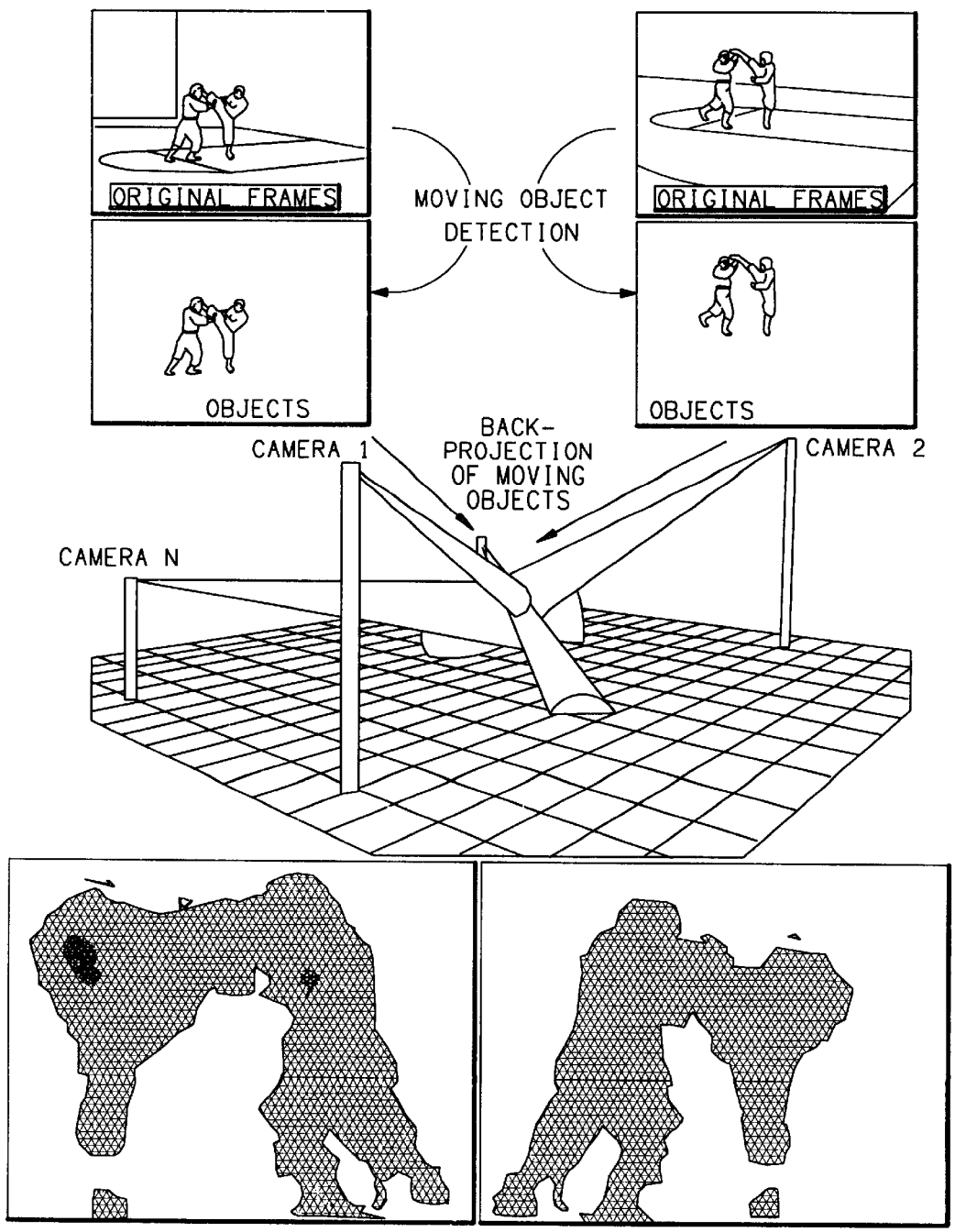
FIG. 4 is a diagrammatic view showing how, in an immersive video system in accordance with the present invention, the three-dimensional (3D) shapes of all moving objects are found by intersecting the viewing frustrums of objects found by the video data analyzer; two views of a full three-dimensional model generated by the environmental model builder of the immersive video system of the present invention for an indoor karate demonstration being particularly shown.

As befit their name, static objects do not vary with time. The set of values of these objects at any instant comprises the state of the system S(t). The preferred EM uses a layered model to represent objects at different levels of abstraction, such that there is a strong correlation between objects at different abstractions. FIG. 4 shows some of the possible layers of the environment modes, and how each layers communicates independently with other modules. Reference A. Katkere and R. Jain, A framework for information assimilation, in *Exploratory Vision* edited by M. Landy, et al., 1995.

To ensure consistency, any changes that occur in one level should be propagated to other levels (higher and lower), or at least tagged as an apparent inconsistency for future updating.

In general, propagation from higher to lower levels of abstractions is easier than vice versa. Accordingly, changes are attempted to be assimilated at as high level of abstraction as possible. Each dynamic object at the lowest level has a spatial extent of exactly one grid. Objects with higher extent are composed of these grid objects, and hence belong to higher levels. Direct information acquisition at higher levels must be followed by conversion of that information to the information at the densest level, so that information at all levels are consistent. It is important to come up with efficient access (and update) strategies at this level since this could potentially be the bottleneck of the entire representation and assimilation module.

Each dynamic object has several attributes, most basic being the confidence that it exists. Each of the above factors may contribute to either an increase or decrease in this confidence. These factors also affect the values of other object attributes. The value of an object $O_i(t)$, and hence, the state $S(t)$, may change due to the following factors: 1) New input information, i.e., new data regarding object position from the video data; 2) change in related model information; 3) advice from higher processes; and (4) decay (due to aging).

The preferred MPI-Video system provides facilities for managing dynamic and static objects, as is discussed further below in this section.

The EM, informed by the two-dimensional video data, provides a wealth of information not available from a single camera view. For instance, objects occluded in one camera view may be visible in another. In this case, comparison of objects in $D_{v,t}(t)$ at a particular time instant t with objects in $S_{o,i}$ can help anticipate and resolve such occlusions. The model, which takes inputs from both views, can continue to update the status of an object regardless of the occlusion in a particular camera plane. To maintain and manipulate information about position of static and dynamic objects in the environment, a representation must be chosen which facilitates maintenance of object positional information as well as supporting more sophisticated questions about object behavior. The preferred dynamic model relies on the following two components.

The first component is voxels. In this representation, the environment is divided up into a set of cubic volume elements, or voxels. Each voxel contains information such as which objects currently occupy this voxel, information about the history of objects in this voxel, an indication of which cameras can "see" this voxel. In this representation, objects can be described by the voxels they occupy. The voxel representation is discussed in greater detail in section 4.

The second component is (x,y,z) world coordinates. In this case, the environment and objects in the environment are represented using (x,y,z) world coordinates. Here objects can be described by a centroid in (x,y,z), by bounding boxes, etc.

Each of these representations provides different support for modeling and data manipulation activities. The preferred MPI-Video system utilizes both representations.

3.2 Video Data Analysis and Information Assimilation

The Video Data Analyzer uses image and visual processing techniques to perform object detection, recognition and tracking in each of the camera planes corresponding to the different perspectives. The currently employed technique is based on differences in spatial position to determine object motion in each of the camera views. The technique is as follows.

First, each input frame is smoothed to remove some noise.

Second, the difference image $d_{t-1,t}$ is computed as follows. Only pixels that are in the focus of attention windows and that are not masked are considered. (Here F(t) refers to the pixels in the focus of attention, i.e., a region of interest in the frame t.)

$$d_{t,t-1} = \text{Threshold } (Abs(F_{t-1}-F_t), \text{threshold\_value}_t) \quad (1)$$

To remove motion shadows, the following operation is done:

$$d_t^m = d_{t,t-1} \& d_{t,t+1} \quad (2)$$

Third, components on the thresholded binary difference image are computed based on a 4-neighborhood criterion. Components that are too small or too big are thrown away as they usually constitute noise. Also frames that contain a large number of components are discarded. Both centroid (from first moments), and orientation and elongation (from the second moments) are extracted for each component.

Fourth, any of several optional filters can be applied to the components obtained from the previous step. These filters include, merging of overlapping bounding boxes, hard limits of orientation and elongation, distance from expected features etc.

The list of components associated with each camera is sent from the Video Analysis unit to the Assimilator module which integrates data derived from the multiple streams into a comprehensive representation of the environment.

The Assimilator module maintains a record of all objects in the environment. When new data arrives from the Video Data Analysis module the Assimilator determines if the new data corresponds to an object whose identity it currently maintains. If so, it uses the new data to update the object information. Otherwise, it instantiates a new object with the received information. The follow-ng steps are employed to update objects.

First, the list of 2D object bounding boxes is further filtered based on global knowledge.

Second, the footprint of each bounding box is projected to the primary surface of motion by intersecting a ray drawn from the optic center of that particular camera through the foot of the bounding box with the ground surface.

Third, each valid footprint is tested for membership with existing objects and the observation is added as support to the closest object, if any. If no object is close enough, a new object hypothesis is created.

Fourth, all supporting observations are used (with appropriate weighting based on distance from the camera, direction of motion, etc.) to update the position of each object.

Fifth, the object positions are projected into the next frame based on a domain dependent tracker.

More sophisticated tracking mechanisms are easily integrated into the preferred system. A current area of research seeks to employ additional methods to determine and maintain object identity. For instance, active contour models can be employed in each of the cameras to track object movements. See A. M. Baumberg and D. C. Hogg, An efficient method for contour tracking using active shape models, *Technical Report* 94.11, School of Computer Studies, University of Leeds, April, 1994. See also M. Kass, A. Witkin, and D. Terzopolous, Snakes: Active contour models, *International Journal of Computer Vision*, pages 321–331, 1988. See also F. Leymarie and M. D. Levine, Tracking deformable objects in the plane using an active contour model, *IEEE Transactions on Pattern Analysis and Machine Intelligence*, 15(6):617–634, June 1993. Such methods provide a more refined representation of object shape and dynamics.

One important assumption that is made is that the "static" world is known a priori and the only elements of interest in the video frames are the objects that undergo some type of change, e.g., a player running on a field. In addition, additional constraints are introduced by requiring cameras to be stationary and make the following realistic assumptions about objects of interest:

First, these objects are in motion most of the time.

Second, these objects move on known planar surfaces.

Third, these objects are visible from at least two viewpoints.

This knowledge of the "static" world is captured through the camera calibration process which maps related locations in the two-dimensional video data to a fully three-dimensional representation of the world recorded by the cameras. If an event is seen in one camera, e.g., a wide receiver making a catch, or a dancer executing a jump, the system, using this mapping, can determine other cameras that are also recording the event, and where in the various video frames the event is occurring. Then a viewer, or the system, can choose between these different views of the action, subject to some preference. For example, the frames which provide a frontal view of the wide receiver or the dancer. This "best view" selection is described further below and in section 4.

When their positions and orientations are fixed, cameras can be calibrated before processing the video data using methods such as those described by Tsai and Lenz. See R. Y. Tsai and R. K. Lenz, A new technique for fully autonomous and efficient 3D robotics hand/eye calibration, *IEEE Transactions on Robotics and Automation*, 5(3):345–58, June 1989.

Calibration of moving cameras is a more difficult task and is currently an area of active research, e.g., ego motion. See E. S. Dickmanns and V. Graefe, Dynamic monocular machine vision, *Machine Vision and Applications*, 1:223–240, 1988.

The preferred MPI-Video system of the present invention has the capability to integrate these techniques into analysis and assimilation modules when they become available. To date, evaluation of the preferred MPI-Video system has been done only by use of fixed cameras. The Assimilator maintains the Environment Model discussed above.

3.2.1 Camera Handoff

A key element in the maintenance of multiple camera views is the notion of a Camera Hand-off, here understood to be the event In which a dynamic object passes from one camera coverage zone to another. The Assimilator module also manages this processing task, maintaining a consistent representation of an object's identity and behavior during camera hand-off. This requires information about the object's position, its motion, etc.

Using the voxel information, noted above, which cameras can "see" (or partially "see") an object can be, and is, determined. Namely, a camera completely "sees" an object if all voxels occupied by the object are also seen by the camera. Let $c(v)$ be the camera list, or set, associated with a particular voxel $v$, and $V$ be the set of all voxels in which an object resides. Then, $C_c$ is the complete coverage, i.e. that set of cameras which can see all voxels in which an object resides and $P_c$ is the partial coverage set, i.e. those cameras which can see some part of the object. These are defined as:

$$C_c = \bigcap_{v \in V} c(v) \tag{3}$$

$$P_c = \bigcap_{v \in V} c(v) \tag{4}$$

Thus, it can be determined which cameras "see" a particular object by considering the intersection and/or union of the camera lists associated with the voxels in which the object resides. When an object moves between different zones of coverage, camera handoff is essentially automatic as a result of the a priori information regarding camera location and environment configuration. This is significant as it alleviates the necessity of reclassifying objects when they appear in a different camera view. That is, an object may enter a camera view and appear quite different then it did before, e.g., in this new perspective it may appear quite large.

However, reclassification is not necessary as the system, using its three dimensional model of the world, can determine which object this new camera measurement belongs to and can update the appropriate object accordingly. This capability is important for maintaining a temporally consistent representation of the objects in the environment. Such a temporal representation is necessary if the system is to keep track of object behavior and events unfolding in the environment over time.

3.3 Best View Selection

The View Selector can use a variety of criteria and metrics to determine a "best" view. Here, "best" is understood to be relative to a metric either specified by the user or employed by the system in one of its processing modules.

The best view concept can be illustrated by considering a case where there are N cameras monitoring the environment. Cameras will be denoted by $C_i$ where the index $i \in \{1, \ldots, N\}$ varies over all cameras. At every time step, $t$, each camera produces a video frame, $F_{i,t}$. The term $i_{BV}$, will be used to indicate the best view index. That is, $i_{BV}$ is the index of the camera which produces the best view at time t. Then, the best view is found by selecting the frame from camera $C_{i_{BV}}$ at time t, i.e., the best view is $F_{i_{BV},t}$.

Some possible best view criteria include the least occluded view, the distance of the object to the camera, and object orientation.

In the case of a least occluded view criteria, the system chooses, at time t, that frame from the camera in which an object of interest is least occluded. Here, the best view camera index is defined according to the following criteria, $$i_{BV} = \arg_i (\max (S_i)) \tag{5}$$

The object size metric $S_i$ is given by:

$$S_i = \sum_{(x,y)} p(x, y)/S_{obj} \tag{6}$$

where $p(x, y)=1$ if pixel $(x,y) \in R_i$ and 0 otherwise. $R_i$ being the region of frame $F_{i,t}$ that contains the object of interest. The total size is then normalized by the expected size, $S_{obj}$ of the object, i.e., the number of pixels that the object is expected to occupy in the camera view if no occlusion occurs. Finally, $\arg_i$ returns the index which optimizes this criteria.

In the case of an object distance of camera criteria, the best view is the frame in which an object of interest is closest to the corresponding camera.

$$i_{BV} = arg_i \, (min(D_i(t))) \quad (7)$$

where, $D_i(t)$ is the Euclidean distance between the (x,y,z) location of camera $C_i$ and the world coordinates of the object of interest. The world coordinate representation, mentioned above, is most appropriate for this metric. Note also, that this criteria does not require any computation involving the data in the frames. However, it does depend on three-dimensional data available from the environment model.

For an orientation criteria a variety of possibilities exist. For instance, direction of object motion, that view in which a face is most evident, or the view in which the object is located closest to the center of the frame. This last metric is described by, $$i_{BV} = arg_i \, (min(D_i(t))) \quad (8)$$

Here, $CD_i(t)$ is given by $$CD_i(t) = \sqrt{(x(t) - (xSize/2))^2 + (y, t) - (ySize/2))^2} \quad (9)$$

The values xSize and ySize give the extent of the screen and (x(t), y(t)) are the screen coordinates of the object's two-dimensional centroid in frame $F_{i,t}$.

Combinations of metrics can also be employed. A general representation of best view is formulated as follows:

$$i_{BV} = arg_i \, (G(g_{i,t}(m_j(C_i)|j\epsilon\{1,\ldots,M\}, \epsilon\{1,\ldots,N\}; t\epsilon\{1,\ldots,T\}))) \quad (10)$$

In this equation, each $m_j$ is a metric, e.g., size as defined above, and M such metrics exist, each of which is applied to the data from each camera, hence, the $C_i$ terms in equation (10). Furthermore, each $g_{i,t}$ combines these metrics for $C_i$, e.g. as a weighted linear sum. The use of the time t in this equation supports a best view optimization which uses a temporal selection criteria involving many frames over time, as well as spatial metrics computed on each frame. This is addressed in the following paragraph. Finally, the criteria G chooses between all such combinations and $arg_i$ selects the appropriate index. For instance, G might specify the minimum value.

For example, if three cameras (N=3) are used, two metrics M=2) and a specifying a linear weighted sum (using weights $\omega_1$ and $\omega_2$), G would pick the optimum of $$g_{1,t} = \omega_1 \, m_1 \, (C_i) + \omega m_2 \, (C_1)$$

$$g_{2,t} = \omega_1 \, m_1 \, (C_1) + \omega m_2 \, (C_2)$$

$$g_{3,t} = \omega_1 \, m_1 \, (C_3) + \omega m_2 \, (C_3)$$

$$i_{BV} = arg_i \, G(g_{1,t}, g_{2,t}, g_{3,t})$$

Again, G is a criteria which chooses the optimum from the set of $g_{i,t}$'s. Note that time does not appear explicitly in the right hand side of this equation, indicating that the same best view evaluation is applied at each time step t. Note, in this case, the same g (here, a weighted linear sum) is applied to all cameras, although, this need not be the case.

Two further generalizations are possible. Both are research issues currently (circa 1995) being addressed by the inventors. Firstly, an optimization which accounts for temporal conditions is possible. The best view is a frame from a particular camera. However, smoothness over time may also be important to the viewer or a system processing module. Thus, while a spatial metric such as object size or distance from a camera is important, a smooth sequence of frames with some minimum number of cuts (i.e. camera changes) may also be desired. Hence, best view selection can be a result of optimizing some spatial criteria such that a temporal criteria is also optimum.

A second generalization results if the fact that the $C_i$'s do not have to correspond to actual cameras views is considered. That is, the preferred MPI-Video system has the capability of locating a camera anywhere n the environment. Thus, best view selection can be a function of data from actual cameras as well as from "virtual" cameras. In this case, equation 10 becomes a continuous function in the camera "index" variable. That is, it is no longer necessary to restrict the system to the case of a finite number of cameras from which to chose the best view. Letting $\bar{x}=(x,y,z,\alpha,\beta,f)$ where (x,y,z) is the world coordinate position, or index, of the camera, $\alpha$ is a pan angle, $\beta$ is camera tilt angle and f is a camera parameter which determines zoom in/out. The set of all such vectors $\bar{x}$ forms a 6-dimensional space, $\Omega$. In $\omega$, (x,y,z) varies continuously over all points in $R^3$, $-\pi \leq \alpha$, $\beta \geq \pi$, and $f \geq 0$.

To determine the best view in the environment subject to some criteria, all points in this space are searched over so as to minimize the optimization function. In this case, the best view is that camera positioned at location "$x_{BV}$, where this value of the vector optimizes the constraint G given by:

$$G(g_{\bar{x},t}(m_j(\bar{x})|j\epsilon\{1,\ldots,M\}, t\epsilon\{1,\ldots,T\}, \bar{x}\epsilon\Omega)) \quad (11)$$

The camera index, $\bar{x}$ can vary over all points in the environment and the system must determine, subject to a mathematical formulation of viewing specification, where to position the camera to satisfy a best view criteria. Views meeting this criteria can then be constructed using the techniques outlined in section 4.

For instance, using the same parameters as above, i.e., two metrics $m_i$, the weighted linear summing function g and the criteria function G, $$g_{\bar{x}-\omega 1} \, m_1 \, (\bar{x}) + \omega_2 \, m_2 \, (\bar{x}) \quad (12)$$

Then to determine the best view, find the value of $\bar{x}$ for which $$G(g_{,\bar{x}}), \bar{x}\epsilon\omega \quad (13)$$

is optimal.

Note that, assuming the computational power is available, the best view computation in equations (5), (7) and (8) can all be computed on the fly as video data comes into the system. More complex best view calculations, including those that optimize a temporal measure, may require buffered or stored data to perform best view selection.

Figure 5:
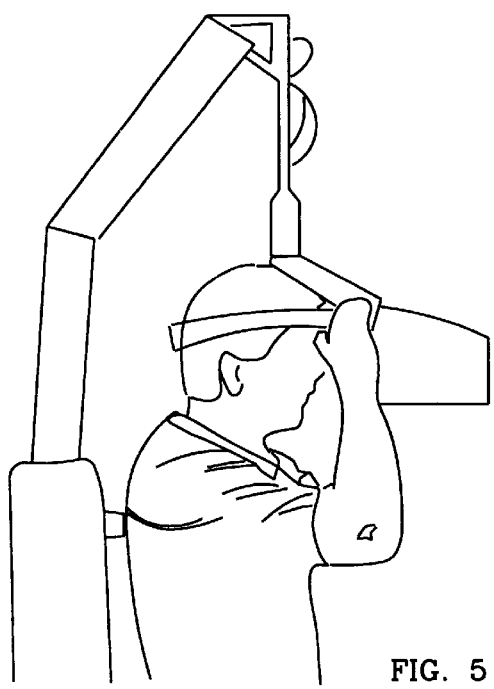
FIG. 5 is a pictorial view showing how, in the immersive video system in accordance with the present invention, a remote viewer is able to walk though, and observe a scene from anywhere using virtual reality control devices such as the boom shown here.
Figure 6A:
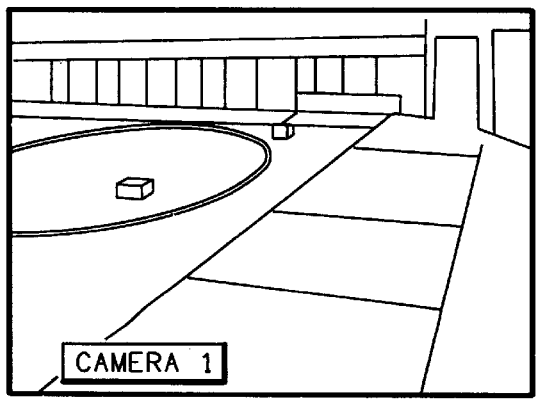
FIG. 6, consisting of FIGS. 6a through 6d, is original video frames showing video views from four cameras simultaneously recording the scene of a campus courtyard at a particular instant of time.
Figure 6B:
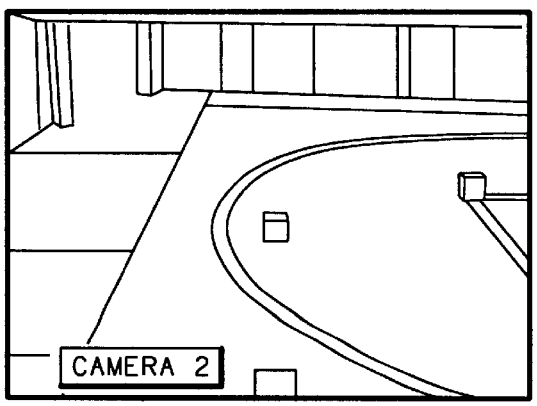
Figure 6C:
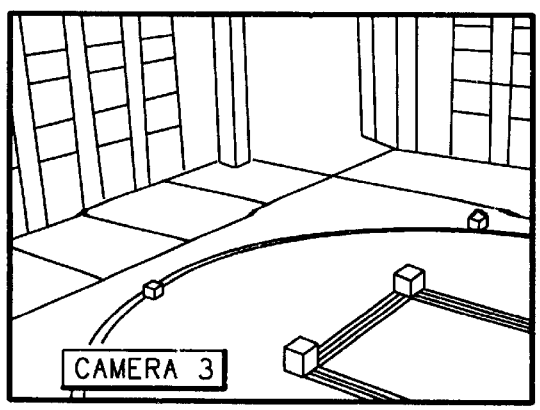
Figure 6D:
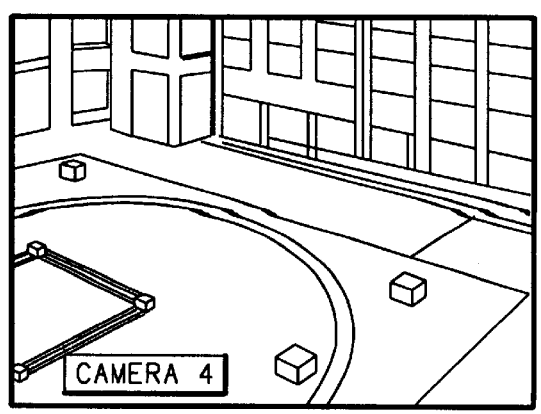

FIG. 5 provides a selected image sequence from four cameras and the determined "best" view. In this example, the "best" view is based upon two criteria, largest size and central location within the image where size takes precedence over location. Here, the function $g_{i,t}$ is just a simple weighted sum, as above, of the size and location metrics. The outlined frames represent chosen images which accommodate the selection criteria. Moreover, the oval tracings are superimposed onto the images to assist the viewer in tracking the desired object. The last row presents the preferred "best" view according to the desired criteria. In order to clarify the object's location, a digital zoom mechanism has been employed to the original image. In images T0 and T1, only from the view of camera 3 is the desired object visible. Although all camera views detect the object in image T2 and T3, the criteria selects the image with the greatest size. Once again in image T4, the object is only visible in camera 4.

3.4 Visualizer and Virtual View Builder

The visualizer and virtual view builder provides processing to create virtual camera views. These are views which are not produced by physical cameras. Rather they are realistic renditions composed from the available camera views and appear as if actually recorded. Such views are essential for immersive applications and are addressed in section 4 below.

3.5 Model and Analysis Interface

Figure 7:
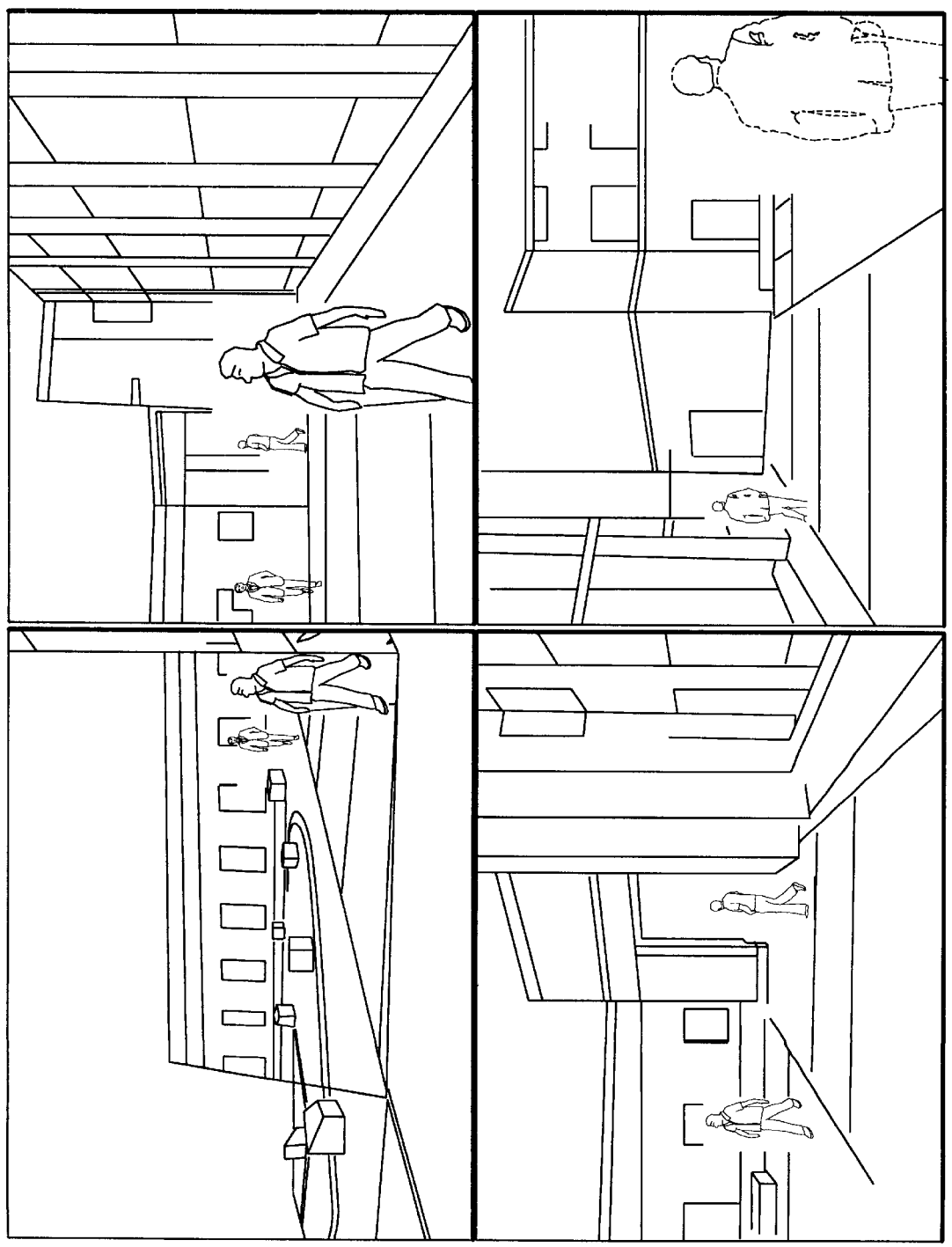
FIG. 7 is four selected virtual camera, or synthetic video, images taken from a 116-frame "walk through" sequence generated by the immersive video system in accordance with the present invention (color differences in the original color video to are lost in monochrome illustration).

FIGS. 6, 7 and 8 show the current Motif-based preferred MPI-Video interface. This interface provides basic visualization of the model, the raw camera streams and the results of video data analysis applied to these streams. In addition, its menus provide control over the data flow as well as some other options. The invertors are presently (circa 995) developing a hyper-media interface, in conjunction with the development of a database system, which will extend the range of control and interaction a user has with the data input to and generated by the MPI-Video system. In the context of virtual scene creation such augmentations may include user selection of viewing position and manipulation (e.g. placement) of virtual model information into the environment.

The model shown in FIGS. 6, 7 and 8 employs an (x, y, z) world coordinate, bounding box object representation. That is, the system tracks object centroid and uses a bounding box to indicate presence of an object at a particular location. A voxel-based representation supports finer resolution of object shape and location. Such a formulation is discussed in section 4

4. Immersive Video

Immersive and interactive telepresence is an idea that has captured the imagination of science fiction writers for a long time. Although not feasible in its entirety, it is conjectured that limited telepresence will play a major role in visual communication media in the foreseeable future. See, for example, N. Negroponte, *Being digital*, Knopf, New York, 1995.

In this section Immersive Video (ImmV)—a spatially-temporally realistic 3D rendition of real-world events—is described. See the inventors's own papers: S. Moezzi, A. Katkere, S. Chatterjee, and R. Jain, Immersive Video, *Technical Report VCL*-95-104, Visual Computing Laboratory, University of California, San Diego, March 1995; and S. Moezzi, A. Katkere, S. Chatterjee, and R. Jain, Visual Reality: Rendition of Live Events from Multi-Perspective Videos, *Technical Report VCL*-95-102, Visual Computing Laboratory, University of California, San Diego, March 1995.

These events are simultaneously captured by video cameras placed at different locations in the environment. ImmV allows an interactive viewer, for example, to watch a broadcast of a football or soccer came from anywhere in the field, even from the position of the quarterback or "walk" through a live session of the U.S. Congress.

Immersive Video involves manipulating, processing and compositing of video data, a research area that has received increasing attention. For example, there is a growing interest in generating a mosaic from a video sequence. See M. Hansen, P. Anandan, K. Dana, G. van der Wal, and P. Burt, Real-time Scene Stabilization and Mosaic Construction, in *ARPA Image Understanding Workshop*, Monterey, Calif., Nov. 13–16 1994. See also H. Sawhney, Motion Video Annotation and Analysis: An Overview, *Proc. 27th Asilomar Conference on Signals*, Systems and Computers, pages 85–89. IEEE, November 1993.

The underlying task is to create larger images from frames obtained from a single-camera (panning) video stream. Video mosaicing has numerous applications including data compression. Another application is video enhancement.

See M. Irani and S. Peleg, Motion analysis for image enhancement: resolution, occlusion, and transparency, *J. of Visual Communication and Image Representation*, 4(4):324–35, December 1993. Yet another application is the generation of panoramic views. See R. Szeliski, Image mosaicing for tele-reality applications, *Proc. of Workshop on Applications of Computer Vision*, pages 44–53, Sarasota, Fla., December 1994. IEEE, IEEE Computer Society Press. See also L. McMillan. Acquiring Immersive Virtual Environments with an Uncalibrated Camera, *Technical Report TR*95-006, Computer Science Department, University of North Carolina, Chapel Hill, April 1995. See also S. Mann and R. W. Picard. Virtual Bellows: Constructing High Quality Stills from Video. *Technical Report TR#259*, Media Lab, MIT, Cambridge, Mass., November 1994. Still further applications included high-definition television, digital libraries etc.

To generate seamless video mosaics, registration and alignment of the frames from a sequence are critical issues. Simple, vet robust techniques have been suggested to alleviate this problem using multi-resolution area-based schemes. See M. Hansen, P. Anandan, K. Dana, and G. van der Wal et al., Real-time scene stabilization and mosaic construction, in *Proc. of Workshop on Applications of Computer Vision*, pages 54–62, Sarasota, Fla., December 1994. IEEE, IEEE Computer Society Stress. For scenes containing dynamic objects, parallax has been used to extract dominant 2D and 3D motions which were then used in registration of the frames and generation of the mosaic. See H. Sawhney, S. Ayer, and M. Gorkani, Model-based 2D and 3D Dominant Motion Estimation for Mosaicing and Video Representation, *Technical report*, IBM Almaden Res. Ctr., 1994.

For multiple moving objects in a scene, motion layers have been introduced where each dynamic object is assumed to move in a plane parallel to the camera. See J. Wang and E. Adelson, Representing moving images with layers, *IEEE Transactions on Image Processing*, 3(4):625–38, September 1994. This permits segmentation of the video into different components each containing a dynamic object, which can then be interpreted and/or re-synthesized as a video stream.

However, for immersive telepresence there is a need to generate 3D mosaics—a "hyperMosaic"—that can also handle multiple dynamic objects. Maintaining spatial-temporal coherence and consistency is integral to generation of such a HyperMosaic. In order to obtain 3D description, multiple perspectives that provide simultaneous coverage must therefore be used and their associated visual information integrated. Another necessary feature would be to provide a viewpoint that may be selected. The immersive video system and method of the present invention caters to these needs.

Immersive video requires sophisticated vision processing and modeling described in Section 3.1. While Virtual Reality systems use graphical models and texture mapping to create realistic replicas of both static and dynamic components, in immersive video, distinctively, the data used is from actual video streams. This also aids in the rendition off exact ambiance, i.e. purely two dimensional image changes are also captured. For example, in ImmV, a viewer is able to move around a football stadium and watch the spectators from anywhere in the field and see them waving, moving, etc., in live video. For faithful reconstruction of realism, ImmV requires addressing issues such as synchronization between cameras, maintenance of consistency in both spatial and temporal signals, distributed processing and efficient data structures.

4.1 Mosaicing: Creating "Visual Realism"

Given the comprehensive model of the environment and accurate external and internal camera calibration information, compositing new vistas is accomplished by mosaicing pixels from the appropriate video streams. Algorithm 1 shown in FIG. 1 outlines the steps involved. Algorithm 1 is the vista compositing algorithm. At each time instant, multiple vistas are computed using the current dynamic model and video streams from multiple perspective. For stereo, vistas are created from left and right cameras.

A basic element of this algorithmic process is a set of transformations between the model (or world) coordinate system W: $\{(x_\omega, y_\omega, z_\omega)\}$, the coordinate system of the cameras C: $\{(x_c, y_c, z_c)\}$ and the vista coordinate system V: $\{(x_v, y_v, z_v)\}$. For each pixel, $(x_v, y_v, d_v(x_v, y_v))$, on the vista the corresponding point, $(x_\omega, y_\omega, z_\omega)$, is found in the world coordinate system using its depth value.

$$[x_\omega\ y_\omega\ z_\omega\ 1]^T = M_v \cdot [x_v\ y_v\ z_v\ 1]^T \quad (14)$$

where $M_v$ is the 4×4 homogeneous transformation matrix representing transformation between V and the world W [6].

This point is then projected onto each of the camera image planes c.

$$[x_c\ y_c\ z_c\ 1]^T = M_c^{-1} \cdot [x_\omega y_\omega z_\omega 1]^T \quad (15)$$

where $M_c$ is the 4×4 homogeneous transformation matrix representing transformation between c and the world.

Figure 9A:
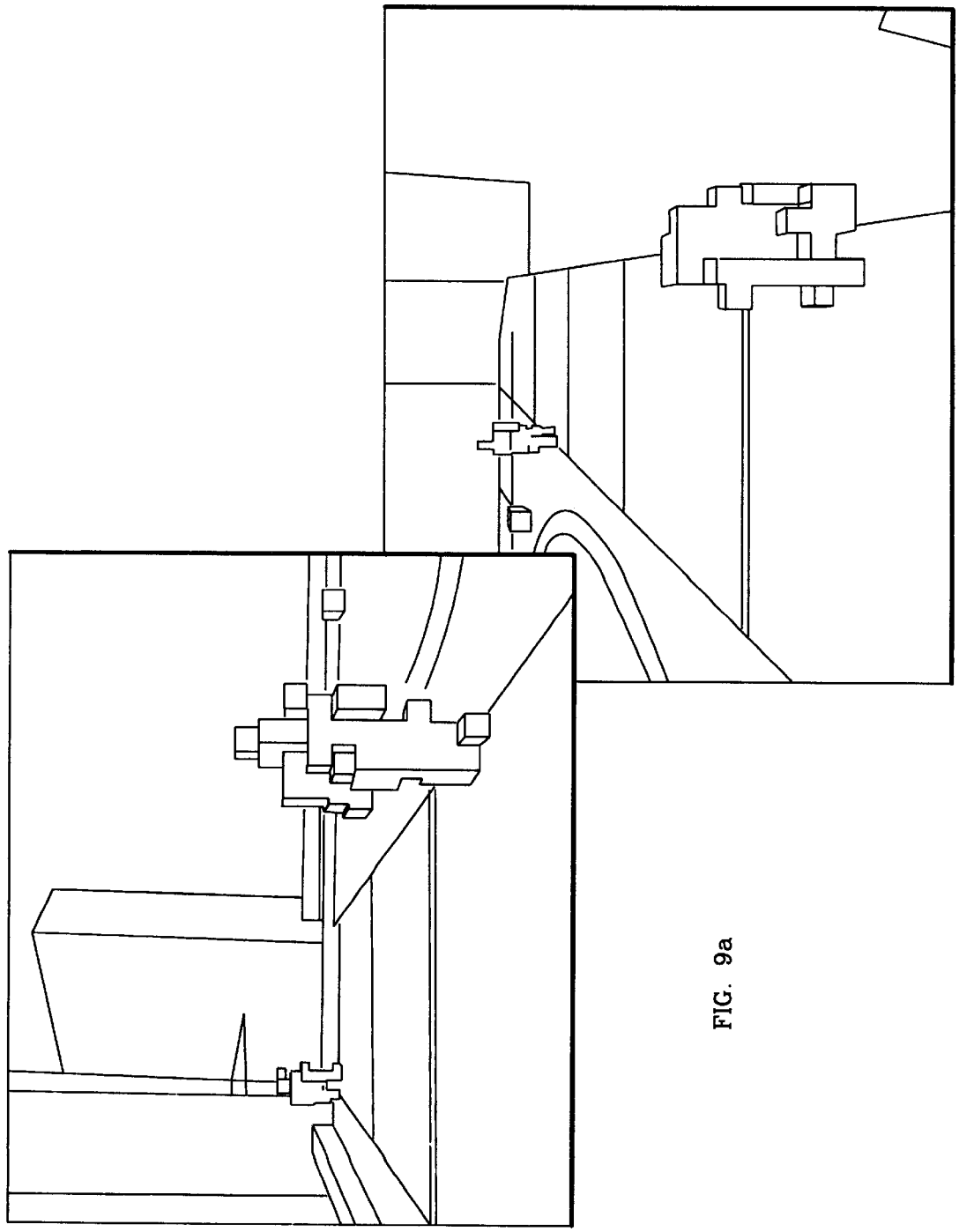
FIG. 9a is a graphical rendition of the 3D environment model generated for the same time instant shown in FIG. 6b, the volume of voxels in the model intentionally being at a scale sufficiently coarse so that the 3D environmental model of two humans appearing in the scene may be recognized without being so fine that it cannot be recognized that it is only a 3D model, and not an image, that is depicted.
Figure 9B:
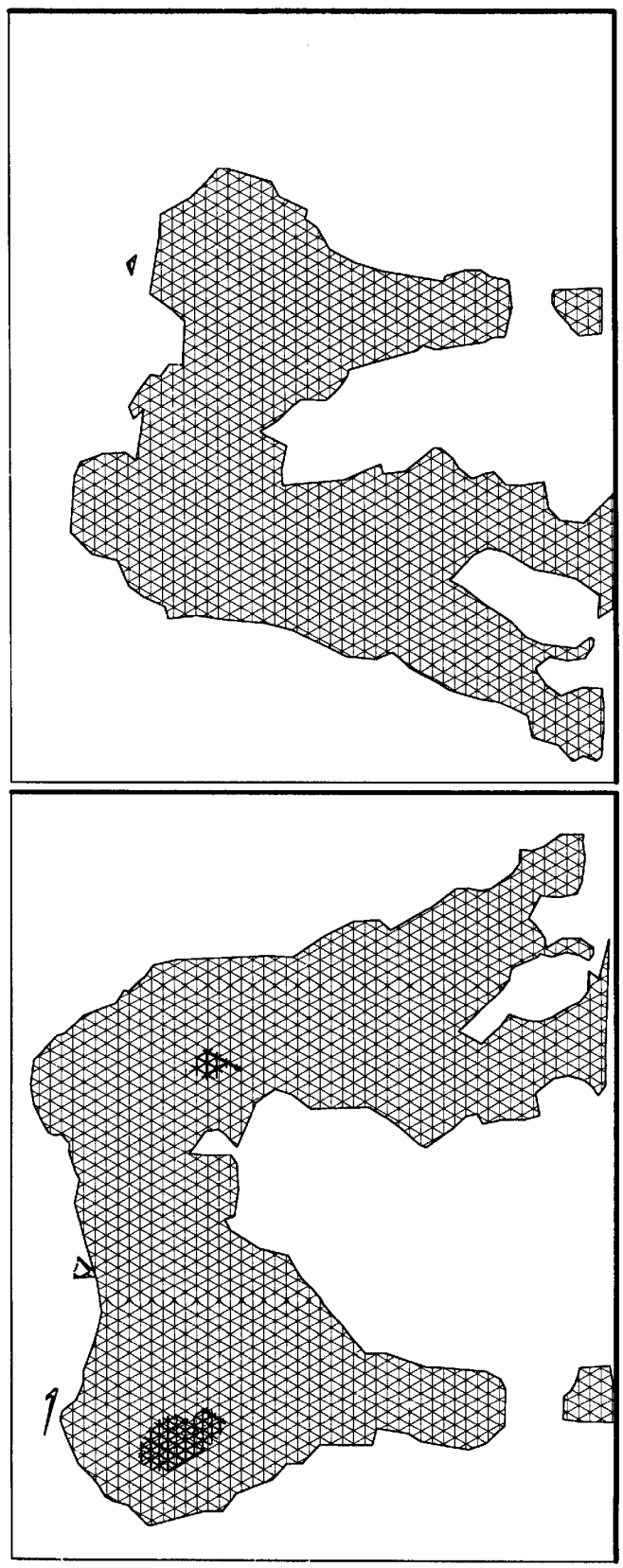
FIG. 9b is a graphical rendition of the full 3D environment model generated by the environmental model builder of the immersive video system of the present invention for an indoor karate demonstration as was previously shown in FIG. 4, the two human participants being clothed in karate clothing with a kick in progress, the scale and the resolution of the model being clearly observable.

These points $(x_c, y_c, z_c)\ \forall c$, are tested for occlusion from that view by comparing zc with the depth value of the corresponding pixel. At this point, several candidates that could be used for the pixel $(x_v, y_v)$ for the vista are available. Each candidate view cv is evaluated using the following two criteria:

First, the angle A subtended by line a of FIG. 9 with the object point $(x_\omega, y_{107}, z_\omega)$, computed using the cosine formula:

$$A = \arccos(\sqrt{(b^2 + c^2 - a^2)}2/(2bc)) \quad (16)$$

See, for example, R. Courant and D. Hilbert, *Methods of Mathematical Physics*, volume 1. New York: Interscience Publishers, first english edition, 1953.

Second, the distance of the object point $(x_\omega, y_\omega, z_\omega)$ from camera window coordinate $(x_c, y_c)$, which is the depth value $d_c(x_c, y_c)$.

The evaluation criterion $e_{cv}$ for each candidate view cv is:

$$e_{cv} = f(A, B^* d_c(x_c, y_c)), \text{ where B is a small number} \quad (17)$$

4.2 Immersive Video Prototype and Results

The Immersive Video prototype is built on top of the MPI-Video system. See the predecessor related patent application. See also S. Chatterjee, R. Jain, A. Katkere, P. Kelly, D. Kuramura, and S. Moezzi, *Modeling and Interactivity in MPI-Video*, Technical Report VCL-94–104, Visual Computing Laboratory, UCSD, December 1994; and A. Katkere, S. Moezzi, and R. Jain, Global Multi-Perspective Perception for Autonomous Mobile Robots, *Technical Report VCL-95–101*, Visual Computing Laboratory, UCSD, 1995.

People in the scene are detected and modeled as cylinders in the current implementation. In exemplary experiments, a one minute long scene was digitized, at 6 frames/sec, from a half hour recording of four video cameras overlooking a typical campus scene. The digitized scene covers three pedestrians, a vehicle, and two bicyclists moving between coverage zones. FIG. 1 shows the relative placements of all four cameras. Frames from four cameras (for the same arbitrary time instant, 00:21:08:02) are shown in FIG. 6. The scene contains three walkers. Note that though the zones of coverage have significant overlaps, they are not identical, thus, effectively increasing the overall zone being covered.

Figure 8A:
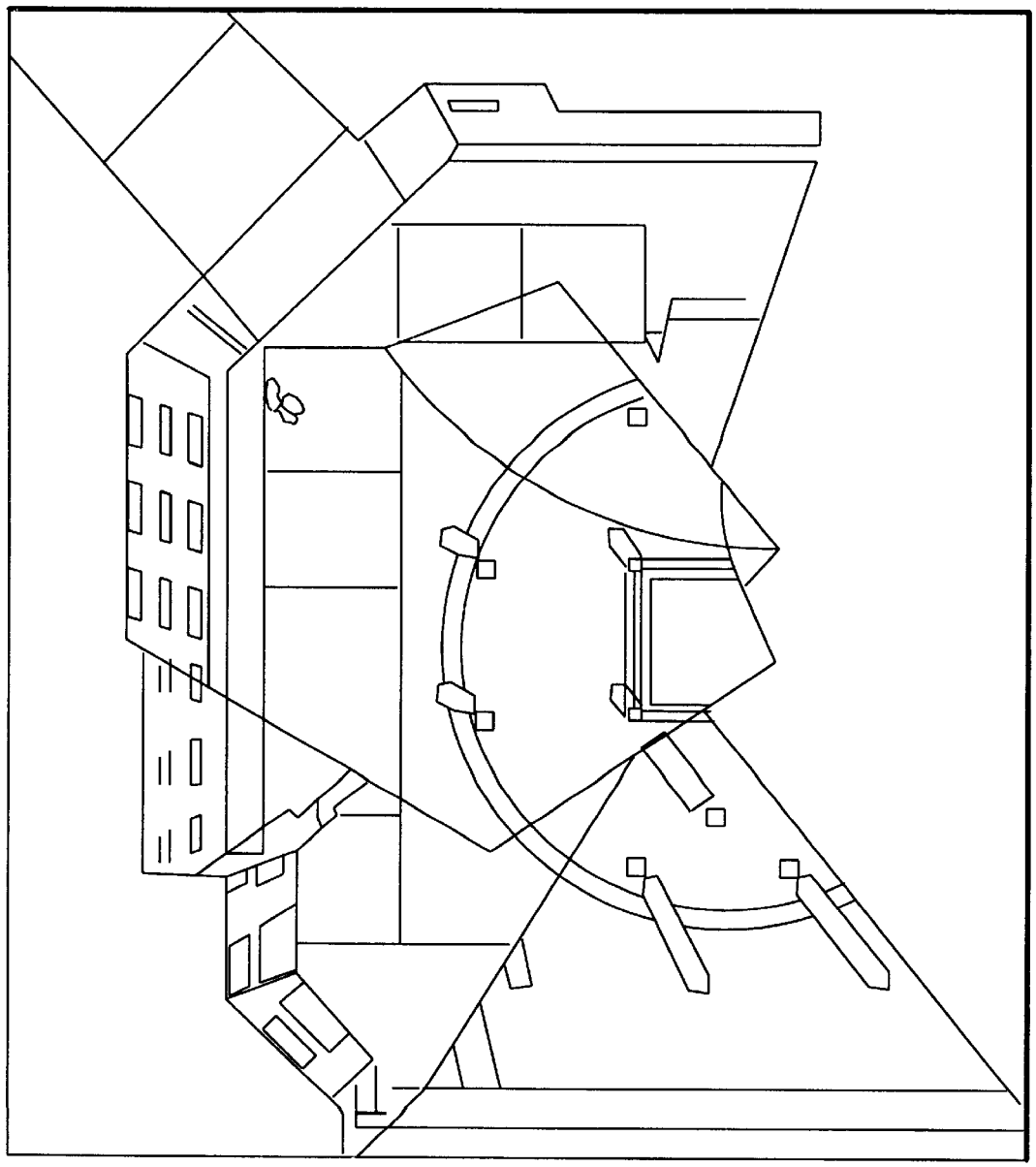
FIG. 8, consisting of FIGS. 8a through FIG. 8c, are synthetic video images generated from original video by the immersive video system in accordance with the present invention, the synthetic images respectively showing a "bird's eye view", a ground level view, and a panoramic view of the same courtyard previously seen in FIG. 6 at the same instant of time.
Figure 8B:
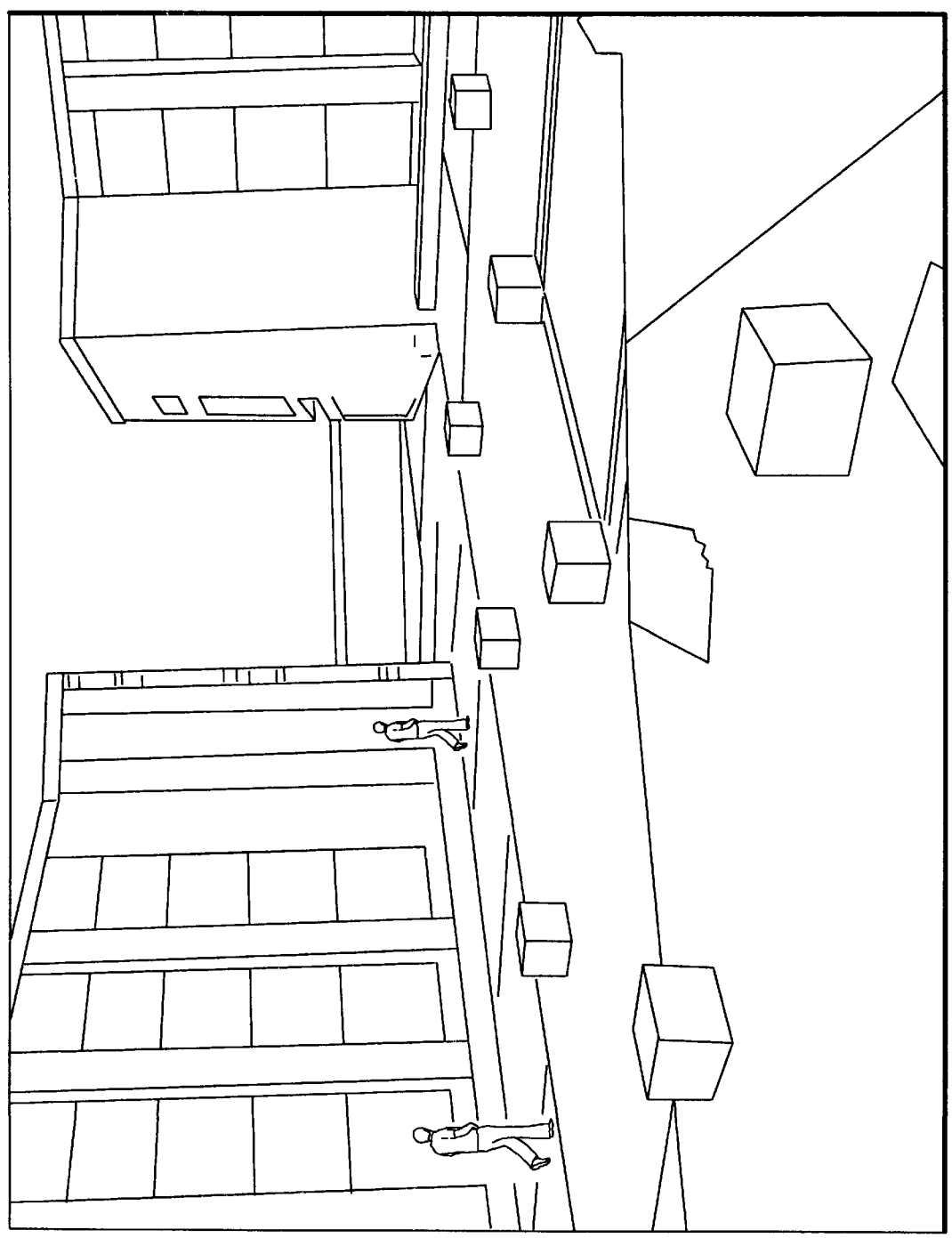
Figure 8C:
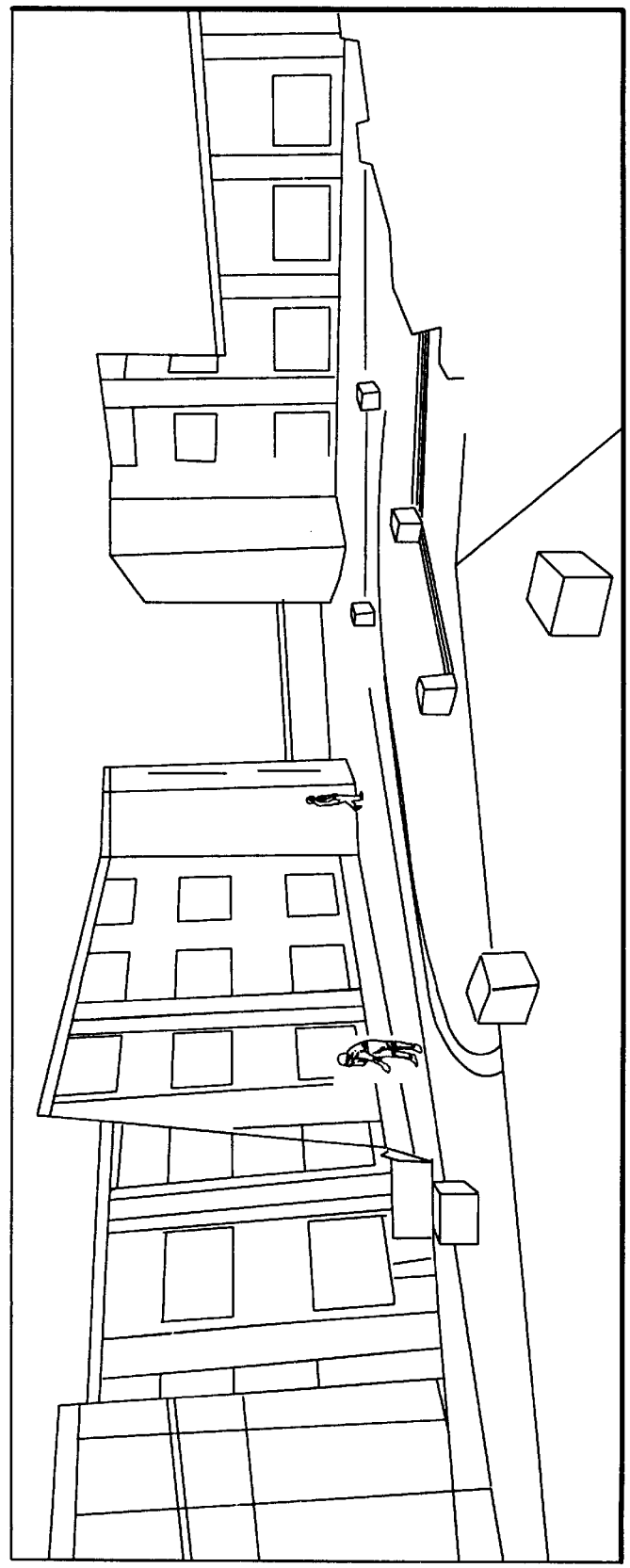

Some of the vistas generated by the prototype immersive video system of the present invention are shown in FIGS. 8a through 8c. White portions represent areas not covered by any camera. Note how each of the perspectives shown is completely different from any of the four original camera views.

FIG. 8b illustrates how photo-realistic video images are generated by the system for a given viewpoint, in this case a ground level view overlooking the scene entrance. This view was generated by the prototype immersive video system using the comprehensive 3D model built by the MPI-Video modeling system and employing Algorithm 1 for the corresponding video frames shown in FIG. 7. Note that this perspective is entirely different from the original views. A panoramic view of the same scene also produced and shown in FIG. 8c. In this figure, the compositing effect is more discernible. A bird's eye view of the walkway for the same time instant is shown in FIG. 8a. Again, white portions represent areas not covered by any camera. Note the alignment of the circular arc. Images from all four cameras contributed towards the construction of these last two views.

FIG. 7 also illustrates immersive abilities of the immersive video technology of the present invention by presenting selected frames from a 116-frame sequence generated for a walk through the entire courtyard. The walk through sequence illustrates how an event can be viewed from any perspective, while taking into account true object bearings and occlusions.

4.3 Discussion on the Representations

In this section 4, the concept for Immersive Video for rendition of live video from multiple perspectives has been described, and key aspects of the prototype system are described and shown. Although the system is at an early stage, it has been illustrated that immersive video can be achieved using today's technology and that photo-realistic video from arbitrary perspectives can be generated given appropriate camera coverage.

One of the limitations of the immersive video system, highlighted in closeups of people is simplistic modeling of dynamic objects (as bounding cylinders). While this simplification permitted development of a complete and fairly functional prototype, such quirks should be, can be, and will be removed to achieve a greater degree of immersion. Towards this end, objects should be modeled more accurately. Two ways of achieving this are contemplated: detecting objects using predicted contours (Kalman snakes) and integrating these contours across perspectives, and using voxel-based integration. See D. Terzopolous and R. Szeliski, Tracking with Kalman snakes, in A. Blake and A. Yuille, editors, *Active Vision*, pages 3–20, MIT Press, Cambridge, Mass., 1992. See also D. Koller, J. Weber, and J. Malik, Robust Multiple Car Tracking with Occlusion Reasoning, *Proc. 3rd European Conference on Computer Vision*, pages 189–96, Stockholm, Sweden, May 1994. Springer-Verlag.

In the next section, how better object models can be built using voxels, and how this will improve the building of virtual vistas, is briefly described.

4.4 Voxel-Based Object Models

Voxels (or Spatial Occupancy Enumeration Cells)—which are cells on a three-dimensional grid representing spatial occupancy—provide one way of building accurate and tight object models. See J. D. Foley, A. van Dam, S. K. Feiner, and J. F. Hughes, *Computer Graphics: Principles and Practices*, Addison-Wesley Publishing Company, Inc., second edition, 1990.

Using techniques to determine occupancy of the voxels, the immersive video system of the present invention builds an accurate three dimensional model of the environment. An a priori static model (which occupies majority of filled space) is used to determine default occupancy of the voxels. To build the dynamic model, the occupancy of only those voxels whose state could have changed from the previous time instant is continuously determined. Using higher level knowledge, and information from prior processing, this computation may be, and preferably is, restricted to expected locations of dynamic objects.

The set of points that denote motion in an image can be computed using Algorithm 2 shown in FIG. 12. Algorithm 2 is the voxel-construction-and-visualization-for-moving-objects algorithm.

This set subtends a portion of three dimensional space where motion might have occurred. FIG. 4 and the diagrammatic portion of FIG. 11 illustrate the viewing frustrums that define this space. Treating voxels as a accumulative array to hold positive and negative evidence of occupancy, the positive evidence of occupancy for this subtended space can be increased. Similarly, the space not subtended by motion points contribute to the negative evidence. Assuming synchronized video streams, this information Is accumulated over multiple perspectives (as shown in FIGS. 4 and the diagrammatic portion of 11). A suitably selected threshold will separate voxels that receive positive support from multiple perspectives. Such voxels, with a high probability, represent dynamic objects. Algorithm 2 of FIG. 12 shows the exact steps involved in this process.

The voxels that are generated by integrating motion information across the four frames of FIG. 6 are shown in FIG. 9a. The physical dimension of each voxel is 8 $dm^3$ or $2\times2\times2$ $dm^3$. Comparing this with the cylindrical approximations of the MPI-Video modeling system, it is evident that more realistic virtual vistas can be created with voxels. Close contour approximations like Kalman snakes can also be used to achieve similar improvements.

4.4.1 Discussion on Computational and Storage Efficiency of Voxels

Voxels have been traditionally vilified for their extreme computing and storage requirements. To even completely fill a relatively small area like the courtyard used in the prototype system, some 14.4 million 1 $dm^3$ voxels are needed. With the recent and ongoing advances in storage and computing, this discussion may be moot. High speed, multiprocessor desk-top machines with enormous amounts of RAM and secondary storage have arrived (e.g., high-end desk top computers from SGI). However for efficiency considerations and elegance, it is herein discussed how storage and computing requirements can greatly be reduced using certain assumptions and optimization.

One basic assumption is that motion is restricted to a small subset of the total three dimensional space and the static portion of the world is known a priori. Hence a combination of efficient geometry-based representation, like the Inventor format, can be used. See J. Wernecke, *The Inventor Mentor: Programming Object-Oriented 3D Graphics with Open T M Inventor*; Release 2. Addison-Wesley Publishing Company, 1994. Given that a three dimensional structure can be derived out of such a format, it is then necessary just model the dynamic portions using voxels.

Next, seven assumptions are made about the dynamic objects:

First, the dynamic objects are assumed to be limited in their vertical extent. E.g., in the prototype immersive video system, all dynamic objects are in the range of 10–20 $dm^3$ in height.

Second, bounds are put on where the objects may be at the current time instant based on prior state, tracking information, assumptions about surfaces of motion etc.

The former assumption reduces the number of voxels by limiting the vertical dimension. Using the latter assumption, voxels are dynamically allocated to certain limited regions in the environment, and it is assumed that the remaining space retains the characteristics of the a priori static model. With this assumption, the number of voxels become a function of the number of expected dynamic objects instead of being a function of the total modeled space. While making these assumptions, and using two representations, slightly complicates spatial reasoning, the complexity in terms of storage and computation is greatly reduced.

In addition, to reduce the computational complexity of Algorithm 2, it is preferred to build look-up tables a priori to store the projection of each voxel on each camera. Since the relationship between each camera and the world is accurately known, this is a valid optimization.

5. Immersive Video/MPI-Video Prototype Implementation

This section provides some details on the MPI-Video prototype system used in the creation of the "virtual views" discussed in section 4.

Figure 17:
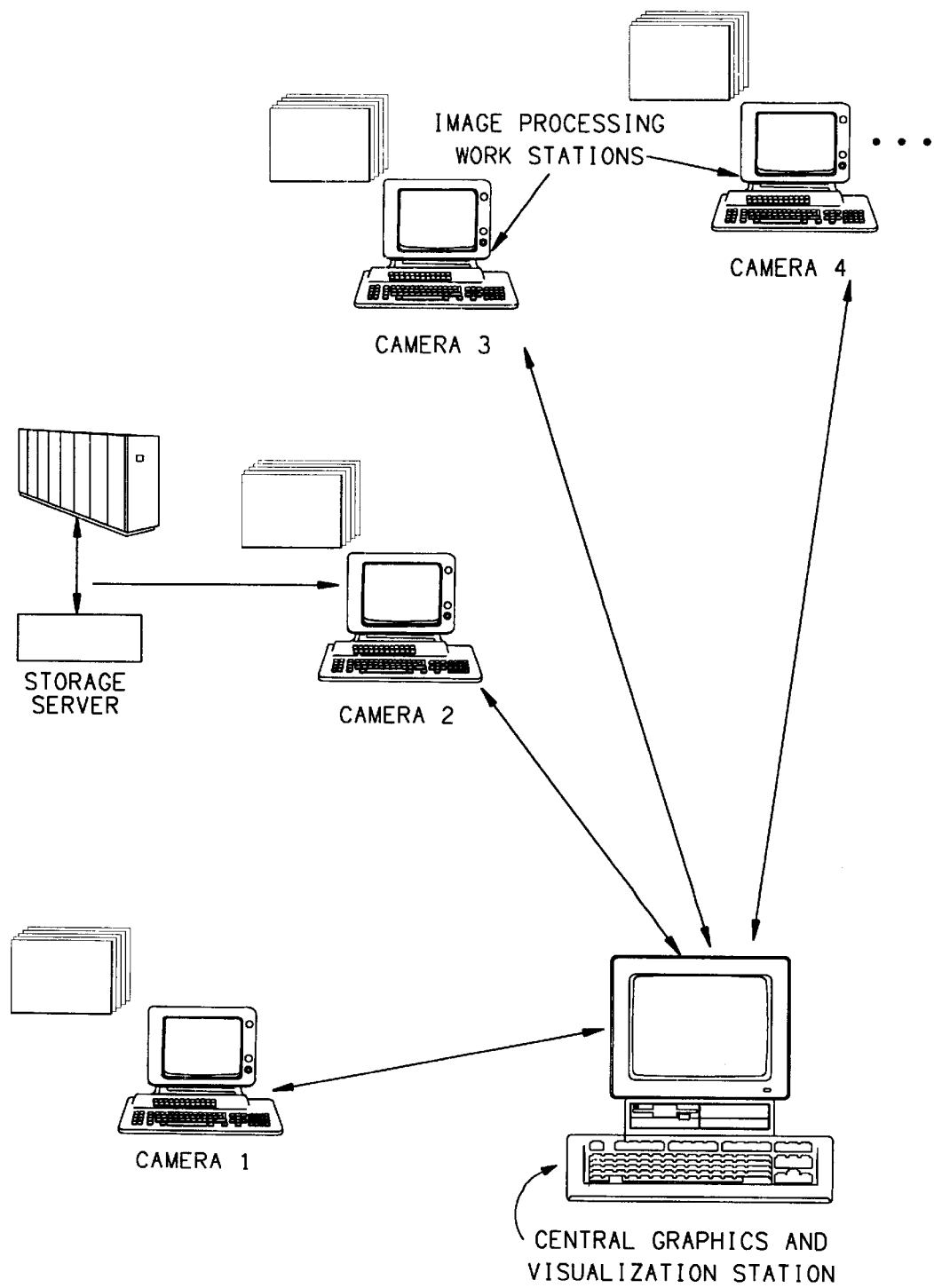
FIG. 17 is a block diagram of the preferred hardware system for realizing immersive video in accordance with the present invention.

FIG. 17 shows the hardware configuration of the prototype immersive video system incorporating MPI video. The preferred setup consists of several independent heterogeneous computers. Ideally, one work station is used to process data from a single camera, preferably a Model 10 or 20 work station available from Sun. However, using a socket-based protocol multiple video processing modules can run on a reduced number of work stations (down to a single work station). In addition, a central (master) graphics work station (a SGI $Indigo^2$, Indy or Challenge) controls these video processing work stations (slaves) and maintains the Environment Model (and associated temporal database). The central master and the remote slaves communicate at a high symbolic level and minimal image information is exchanged. For instance, as will be discussed further below, object bounding box information is sent from the slaves to the master. Thus, actual image data need not be ex-changed, resulting in a very low required network bandwidth for master-slave communication. The work stations in the prototype system are connected on a 120 Mbps Ethernet switch which guarantees full-speed point-to-point connection.

The master-slave information exchange protocol is as follows:

First, the master initializes graphics, the database and the Environment Model (EM), and waits on a pre-specified port.

Second, based on its knowledge of the network, machine throughput etc. a separate process starts the slave processes on selected remote machines.

Third, each slave contacts the master (using pre-specified machine-port combination) and a initialization hand-shaking protocol ensues.

Fourth, the master acknowledges each slave and sends it initialization information, e.g., where the images are actually stored (for the laboratory case), the starting frame and frame interval, camera-specific image-processing information like thresholds, masks etc.

Fifth, each slave initializes itself based on the information sent by the master.

Sixth, once the initialization is completed, the master processes individual cameras as described in the next steps.

Seventh, whenever a game from a specific camera needs to be processed the master sends a request to that particular slave with information about processing the frame viz. focus of attention windows frame specific thresholds and other parameters, current and expected locations and identifications of moving objects etc. and continues its processing (modeling and user interaction). (The focus of attention is essentially a region of interest in the image specifying where the visual processing algorithms should concentrate their action.) In synchronous mode, requests to all slaves are sent simultaneously and the integration is done after all slaves have responded. In asynchronous mode, this will not necessarily go in unison.

Eighth, when a reply is received, the frame information is used to update the Environment Model (EM). The following subsections present more detail on the individual components of the MPI-Video architecture. Virtual view synthesis is discussed in greater detail below.

5. Conclusions

Immersive Video so far presented has used multi-perspective video and a priori maps to construct three-dimensional models that can be used in interaction and immersion for diverse virtual world applications. One of these application is real-time virtual video, or virtual television, or telepresence—next discussed in the following section 6. Various ways of presenting virtual video information have been discussed. Selection of the best view, creation of visually realistic virtual views, and interactive querying of the model have also been discussed. The actual implementation of an immersive video system presented show that construction of video-based immersive environments is feasible and viable. The goal of the initial prototype immersive video system was not only to build a complete working system, but to also build a test-bed for the continuing development of more complicated and refined algorithms and techniques yet to be developed and tested. Towards this end, simple analysis and modeling techniques were used. Future work includes making these more sophisticated so that truly immersive environments can be constructed and used.

6. Immersive Telepresence

Immersive telepresence, or visual reality, is an immersive, interactive and realistic real-time rendition of real-world events captured by multiple video cameras placed at different locations in the environment. It is the real-time rendition of virtual video; "virtual television" instead of just "virtual video".

Unlike virtual reality, which is synthesized using graphical primitives, visual reality provides total immersion in live events. For example, a viewer can elect to watch a live broadcast of a football or soccer game from anywhere in the field. As with immersive video, immersive telepresence is based on and incorporates Multiple Perspective Interactive Video (MPI-Video) infrastructure for processing video data from multiple perspectives. In this section the particular adaptations of immersive video/MPI video for the implementation of immersive telepresence, or just plain "telepresence", are discussed. It is particularly shown and discussed as to how immersive telepresence may become an integral part of future television.

Figure 14:
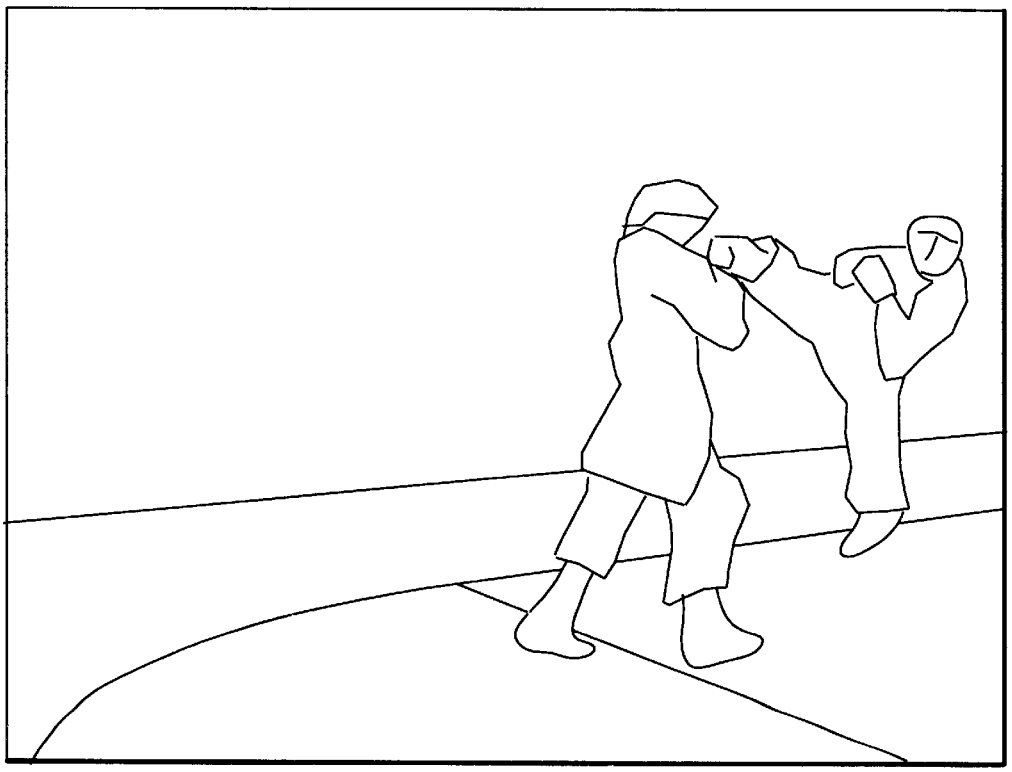
FIG. 14, consisting of FIGS. 14 and 14a, respectively show left eye image and right eye image synthetic video frames of the indoor karate exercise previously seen in FIG. 13.
Figure 14A:
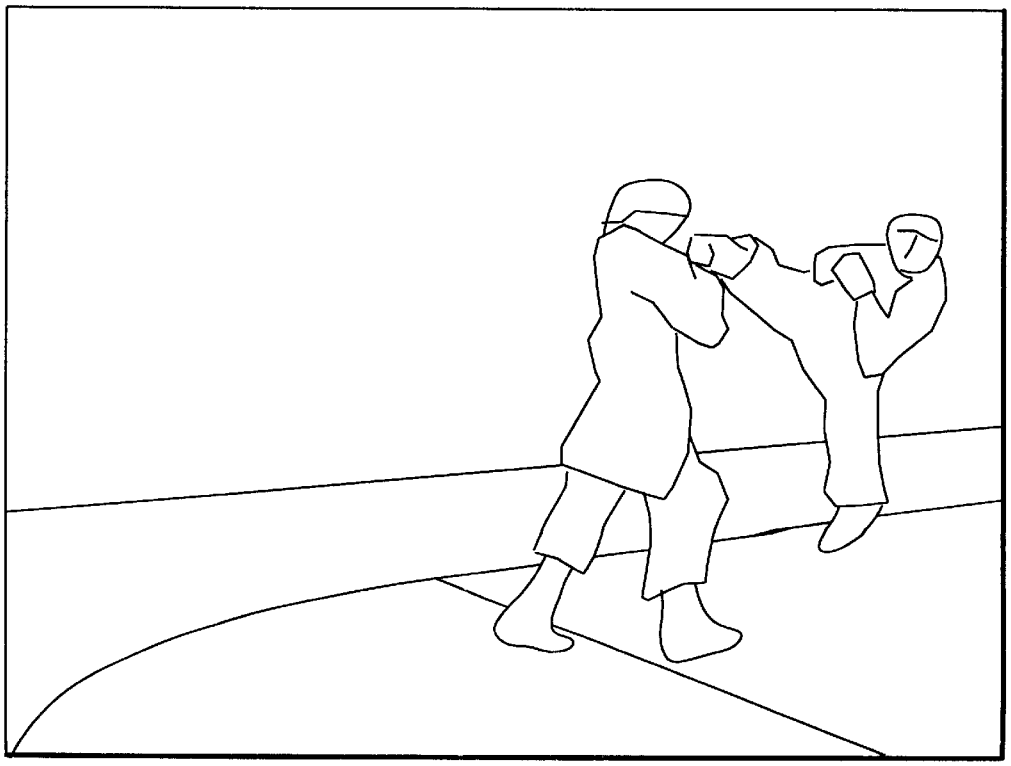
Figure 15A:
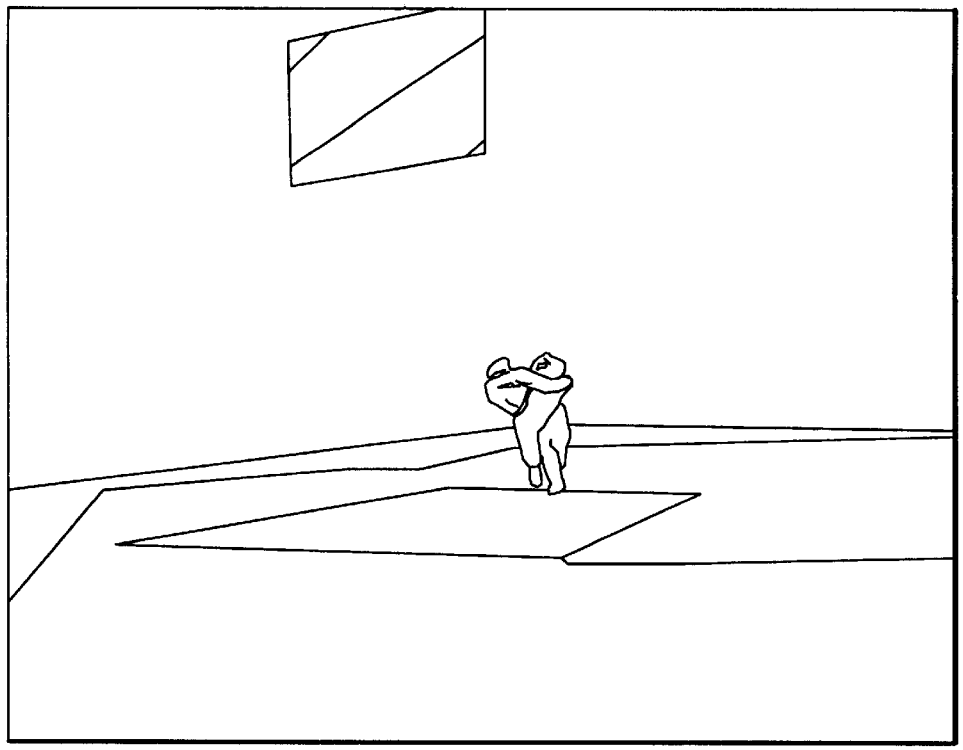
FIG. 15, consisting of FIGS. 15a and 15b, are views respectively similar to FIGS. 14 and 14a again respectively showing a left eye image and a right eye image synthetic video frames of the indoor karate exercise previously seen in FIG. 13.
Figure 15B:
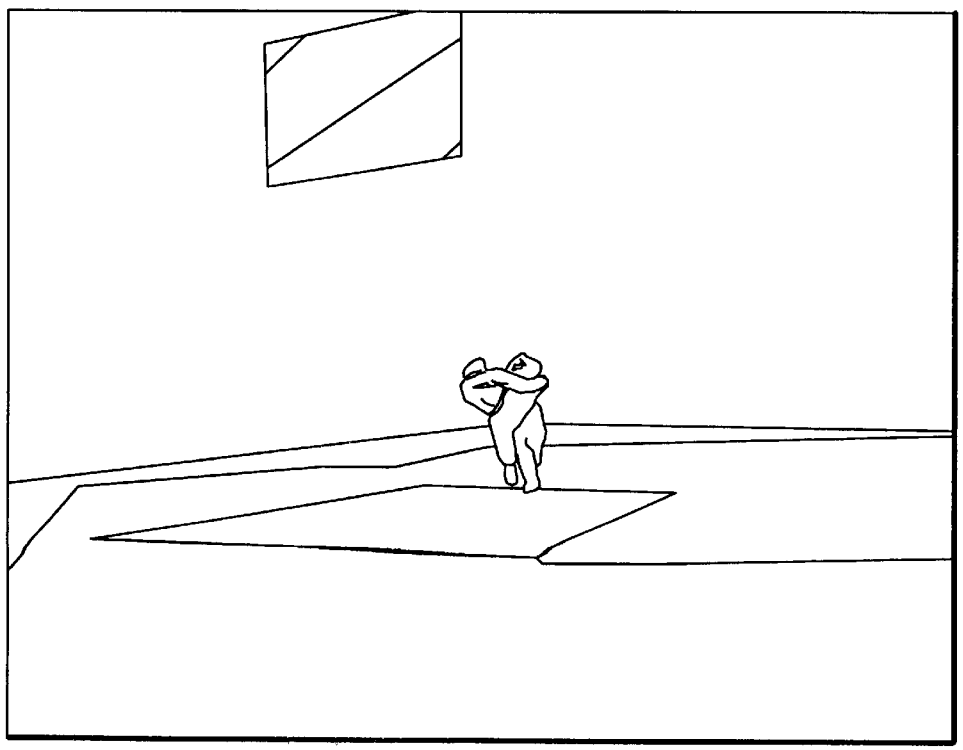

Alas, the drawings of this specification, being both (i) static, and (ii) two-dimensional, necessarily give only partial renditions of both (i) dynamic video and (ii) stereoscopy. Exemplary stereoscopic views produced by the immersive video system of the present invention respectively for the left and the right eyes are shown in FIGS. 14a, 14b and also 15a, 15b. In actual use both images are presented so as to be gated to an associated eye by such well-known virtual reality equipments as the "CrystalEyes" 3D Liquid Crustal Shutter (LCS) technology eyewear available from Stereographics Corporation.

It also impossible to convey in the drawings when something is happening in real time. In some cases the multiple video feeds from a scene that was processed in real time to present telepresence to a user/view were also recorded and were then later processed as immersive video. If the processing is the same then, quite obyiously, the presentations are also the same. Accordingly, some of the following discussion of exemplary results of immersive telepresence will refer to the same figures as did the discussion of immersive video!

The distinctions of note between immersive telepresence and immersive video are these. First, more computer processing time is clearly available in non-real time immersive video than in immersive telepresence. This may not be, however, of any great significance. More importantly, with immersive video the scene model may be revised, so as to improve the video renderings on an iterative basis and/or to account for scene occurrences that are unanticipated and not within the modeled space (e.g., the parachutist falling in elevation into the scene of a football game, which motion is totally unlike the anticipated motion of the football players and is not at or near ground level). The scene models used for immersive telepresence have been developed, and validated, for virtual video.

To be processed into immersive telepresence, it is not required that a scene should be "canned", or rote. It is, however, required that the structure of the scene (note that the scene has "structure", and is not a "windy jungle") should be, to a certain extent, pre-processed into a scene model. Therefore, not only does the scene model of a "football game" cover all football games, or the scene model of a "prizefight" cover all prizefights, but a scene model of a "news conference" may be pretty good at capturing the human actors therein, or a scene model of a "terrain scene including freeways from multiple helicopters" may be pretty good at capturing and displaying buildings, vehicles and pedestrians". The former two models are, of course, usable by sports broadcast organizations in the televising of scheduled events. However the last two models are usable by broadcast news organizations in the televising of events that may be unscheduled.

Competition by software developers in the development, and licensing, of scene models may arise. A television broadcaster able to obtain multiple television feeds would select and use the telepresence model giving best performance. Ultimately scene models will grow in sophistication, integration, and comprehensiveness, becoming able to do better in presentation, with fewer video feeds, faster.

6.1 The Use of Immersive Telepresence

It is conjectured that telepresence will play a major role in visual communication media. See N. Negroponte, *Being digital*. Knopf, New York, 1995. Telepresence is generally understood in the context of Virtual reality (VR) with displays of real, remote scenes. This specification and this section instead describe immersive telepresence, being the real-time interactive and realistic rendition of real-world events, i.e., television where the viewer cannot control (does not interact with) what is happening in a real world scene, but can interact with how the scene is viewed.

Jaron Lanier defines Virtual Reality as an immersive, interactive simulation of realistic or imaginary environments. See J. Lanier. Virtual reality: the promise of the future. *Interactive Learning International*, 8(4): 275–9, October–December 1992. The new concept called visual reality is an immersive, interactive and realistic rendition of real-world events simultaneously captured by video cameras placed at different locations in the environment. In contrast with virtual reality, or VR, where one can interact with and view a virtual world, visual reality, or VisR, permits a viewer/user one, for example, to watch a live broadcast of a football or soccer game from anywhere in the field, even from the position of the quarterback! Visual reality uses the Multiple Perspective Interactive Video (MPI-Video) infrastructure. See S. Chatterjee, R. Jain, A. Katkere, P. Kelly, D. Kuramura, and S. Moezzi, Modeling and interactivity in MPI-video, *Technical Report VCL*-94–104, Visual Computing Lab, UCSD, December 1994.

MPI-Video is a move away from conventional video-based systems which permit users only a limited amount of control and insight into the data. Traditional systems provide a sparse set of actions such as fast-forward, rewind and play of stored information. No provision for automatic analysis and management of the raw video data is available.

Visual Reality involves manipulating, processing and compositing of video data, a research area that has received increasing attention. For example, there is a growing interest in generating a mosaic from a video sequence. See M. Hansen, P. Anandan, K. Dana, G. van der Wal, and P. Burt, Real-time scene stabilization and mosaic construction, in *ARPA Image Understanding Workshop*, Monterey, Calif., Nov. 13–16 1994. See also H. Sawhney, Motion video annotation and analysis: An overview, in *Proc. 27th Asilomar Conference on Signals, Systems and Computers*, pages 85–89. IEEE, November 1993.

The underlying task in video mosaicing is to create larger images from frames obtained as a video stream. Video mosaicing has numerous applications including data compression, video enhancement. See M. Irani and S. Peleg, Motion analysis for image enhancement: resolution, occlusion, and transparency, in *J. of Visual Communication and Image Representation*, 4(4):324–35, December 1993. See also R. Szeliski, Image mosaicing for tele-reality applications, in *Proc. of Workshop on Applications of Computer Vision*, pages 44–53, Sarasota, Fla., December 1994. See also the IEEE, IEEE Comput. Soc. Press. high-definition television, digital libraries etc.

To generate video mosaics, registration and alignment of the frames from a sequence are critical issues. Simple, yet robust techniques have been suggested to alleviate this problem using multi-resolution area-based schemes. See M. Hansen, P. Anandan, K. Dana, and G. van der Wal et al., Real-time scene stabilization and mosaic construction, in *Proc. of Workshop on Applications of Computer Vision*, pages 54–62, Sarasota, Fla., December 1994. IEEE, IEEE Comput. Soc. Press. For scenes containing dynamic objects, parallax has been used to extract dominant 2-D and 3-D motions, which were then used in registration of the frames and generation of the video mosaic. See H. Sawhney, S. Ayer, and M. Gorkani, Model-based 2D and 3D dominant motion estimation for mosaicing and video representation, Technical Report, *IBM Almaden Res. Ctr.*, 1994.

For multiple moving objects in a scene, motion layers have been introduced where each dynamic object is assumed to move in a plane parallel to the camera. See J. Wang and E. Adelson. Representing moving images with layers. *IEEE Transactions on Image Processing*, 3(4):625–38, September 1994. This permits segmentation of the video into different components each containing a dynamic object, which components can then be interpreted and/or re-synthesized as a video stream.

However, for immersive telepresence there is a need to generate a comprehensive 3-D mosaic that can handle multiple dynamic objects as well. The name affixed to this process is "hyper-mosaicing". In order to obtain a 3-D description, multiple perspectives that provide simultaneous coverage must be used, and their associated visual information must be integrated. Another necessary feature is provide a selected viewpoint. Visual reality satisfies all these requirements.

These issues, and a description of a prototype visual reality, are contained in the following sections. Section 6.2 recapitulates the concepts of MPI-Video as is especially applied to VisR. Section 6.3 provides implementation details and present results for the Sam campus walkway covered by multiple video cameras—only this time as television in real time as opposed to non-real-time video. Future directions for VisR are outlined in section 6.4.

6.2 Visual Reality using Multi-Perspective Videos

Visual Reality requires sophisticated vision processing, as well as modeling and visualization. Some of these are readily available under MPI-Video. See S. Chatterjee, R. Jain, A. Katkere, P. Kelly, D. Kuramura, and S. Moezzi. Modeling and interactivity in MPI-video. *Technical Report VCL-*9–104, Visual Computing Labs, UCSD, December 1994. MPI-Video is a framework for management and interactive access to multiple streams of video data capturing different perspectives of related events. It involves automatic or semi-automatic extraction of content from the data streams, modeling of the scene observed by these video streams, management of raw, derived and associated data. These video data streams can reflect different views of events such as movements of people and vehicles. In addition, MPI-Video also facilitates access to raw and derived data through a sophisticated hypermedia and query interface. Thus a user, or an automated system, can query about objects and events in the scene, follow a specified object as it moves between zones of camera coverage and select from multiple views. A schematic showing multiple camera coverage typical in a MPI-Video analysis was shown in FIG. 1.

For a true immersive experience, a viewer should be able to view the events from anywhere. To achieve this, vistas composed from appropriate video streams must be made available. Generating these vistas requires a comprehensive three-dimensional model that represents events captured from these multiple perspective videos. Given multiple 'static' views, it is possible theoretically to extract this 3-D model using low-level vision algorithms e.g., shape from X methods.

However, it is widely accepted that current methods make certain assumptions that cannot be met and that are, in general, non-robust. For environments that are mostly static, a priori information, e.g. a CSG/CAD model of the scene, can be used in conjunction with camera information to bypass the extraction of the static portions and to reduce the complexity of processing the dynamic portions. This is analogous to extracting the optical flow in only the portions of the scene where brightness changes are expected due to motion (flow discontinuities). This is exploited in the present implementation of Visual Reality (VisR) to create realistic models.

While in virtual reality (VR) texture mapping is used to create realistic replicas of both static and dynamic components, in visual reality (VisR), distinctively, actual video streams are used. Ideally, exact ambiance will always be reflected in the rendition, i.e., purely two dimensional images changes are also captured. For example, in VisR a viewer is able to move around a football stadium and watch the spectators from anywhere in the field and see them waving, moving, etc.

6.3 Approach and Results

The current prototype immersive telepresence system is used in conjunction with multiple actual video feeds of a real-world scene to compose vistas of this scene. Experimental results obtained for a campus scene show how an interactive viewer can 'walk through' this dynamic, live environment in as it exists in real time (e.g., as seen through television).

6.3.1 Building a Comprehensive, Dynamic 3-D Model

Any comprehensive three-dimensional model consists of static and dynamic components. For the static model a priori information e.g., a CAD model, about the environment is used. The model views are then be registered with the cameras. Accurate camera calibration plays a significant role in this.

For the dynamic model, it is necessary to (i) detect the objects in the images from different views, (ii) position them in 3-D using calibration information, (iii) associate them across multiple perspectives, and (iv) obtain their 3-D shape characteristics. These issues hereinafter next described are also accorded explanation in the technical report by S. Chatterjee, R. Jain, A. Katkere, P. Kelly, D. Kuramura, and S. Moezzi titled Modeling and interactivity in MPI-video, *Technical Report VCL*-94–104, Visual Computing Lab, UCSD, December 1994. See also A. Katkere, S. Moezzi, and R. Jain, Global multi-perspective perception for autonomous mobile robots, Technical Report VCL-95–101, Visual Computing Laboratory, UCSD, 1995. Finally, these issues and solutions thereto are also presented in the related predecessor patent application.

It is widely accepted that if a 3-D model of the scene is available, then many of the low-level processing tasks can be simplified. See Y. Roth and R. Jain, Simulation and expectation in sensor-based systems, *International Journal of Pattern Recognition and Artificial Intelligence,* 7(1): 145–73, February 1993. For example, associating images taken at different times or from different views becomes easier if one has some knowledge about the 3-D scene points and the camera calibration parameters (both internal and external). In VisR this is exploited—as it was in immersive video—to simplify vision tasks, e.g., segmentation etc. (model-based vision).

In the approach of the present invention cameras are assumed to be calibrated a priori. Using pre-computed camera coverage tables 2-D observations are mapped into 3-D model space and 3-D expectations into 2D image space. Note the bi-directional operation.

For the prototype VisR system, a complete, geometric 3-D model of a campus scene was built using architectural map data.

At a basic level, the VisR system must and does extract information from all the video streams, reconciling extracted information with the 3-D model. As such, a scene representation was chosen which facilitates maintenance of object's location and shape information.

In the preferred VisR, or telepresence, system, object information is stored as a combination of voxel representation, grid-map representation and object-location representation. Note the somewhat lavish use of information. The systems of the present invention are generally compute limited, and are generally not limited in storage. Consider also that more and faster storage may be primarily a matter of expending more money, but there is a limit to how fast the computers can compute no matter how much money is expended. Accordingly, it is generally better to maintain an information-rich texture from which the computer(s) can quickly recognize and maintain scene objects than to use a more parsimonious data representation at the expense of greater computational requirements.

For each view, the prototype VisR, or telepresence, system is able to compute the 3-D position of each dynamic object detected by a motion segmentation module in real time. A priori information about the scene and camera calibration parameters, coupled with the assumption that all dynamic objects move on planar surfaces permits object detection and localization. Note the similarity in constraints to object motion(s), and the use of a priori information, to immersive video. Using projective geometry, necessary positional information is extracted from each view. The extracted information is then assimilated and stored in a 2D grid representing the viewing area.

6.3.1.1 Dynamic Objects

While more sophisticated detection, recognition and tracking algorithms are still susceptible of development and application, the initial prototype VisR, or immersive telepresence, system uses simple yet robust motion detection and tracking. Connected components labelling is used on the difference images to detect moving objects. This also initializes/updates a tracker which exchanges information with a global tracker that maintains state information of all the moving objects.

Even though instantaneous 3-D shape information is not currently processed due to lack of computation power, it is an option under development. See A. Baumberg and D. Hogg. An efficient method for contour tracking using active shape models, in *Proc. Workshop on Motion of Non-rigid and Articulated Objects,* pages 194–9, Austin, Tex., November 1994, IEEE, Comput. Soc. Press. Video processing is simplified by "focus of attention rectangles" and pre-computed static mask images delineating portions of a camera view which cannot possibly have any interesting motion. The computation of the former is done using current locations of the object hypotheses in each view and projected locations in the next view. The latter is created by painting out areas of each view not on the planar surface (walls, for example).

3.2 Vista Compositing

Given the comprehensive model the environment and accurate external and internal camera calibration information, compositing new vistas at the view-port is simply a number of transformations between the model (or world) coordinate system $(x_\omega, y_\omega, z_\omega)$, the coordinate system of the cameras $(x_c, y_c, z_c)$ and the view-port coordinate system $(x_v, y_v, z_v)$. Each pixel (on the composited display) is projected on the world coordinate system. The world point is then projected onto each of the camera image planes and tested for occlusion from that view. Given all such un-occluded points (and their intensity values), the following selection criteria is used. First, the pixel value for the point which subtends the smallest angle with respect to the vista and is closest to the viewing position is used in the rendition. This is then repeated for every time instant (or every frame) assuming stationary view-port. To generate a "fly-by" sequence this is repeated for every position of the view-port in the world coordinate. Note that this also makes the task of handling sudden zonal illumination changes ("spotlight effects") easier. Algorithm 1 shown in FIG. 11 outlines the steps involved. Note that the generation of panoramic views from any view-port is a by product with a suitable selection of camera parameters (angle of view, depth of field etc.).

6.3 Visual Reality Prototype and Results

The prototype application of the immersive telepresence system of the present invention involved the same campus scene (actually, a courtyard) as was used for the immersive video. The scene was covered by four cameras at different locations. FIG. 1 shows the model schematic (of the environment) along with the camera positions. Note that though the zones of camera coverage have significant overlaps, they are not identical, thus, effectively increasing the overall zone being covered.

To illustrate the compositing effect, cameras with different physical characteristics were used. To study the dynamic objects, people were allowed to saunter through the scene. Although in the current version, no articulated motion analysis is incorporated, work is underway to integrate such and other higher-order behaviors. See S. Niyogi and E. Adelson. Analyzing gait with spatio-temporal surfaces, in *Proc. of Workshop on Motion of Non-Rigid and Articulated Objects*, pages 64–9, Austin, Tex., November 1994, IEEE, Comput. Soc. Press.

As previously discussed, FIG. 6 shows corresponding frames from four views of the courtyard with three people walking. The model view of the scene is overlaid on each image. FIG. 7 shows some "snapshots" from a 116-frame sequence generated for a "walk through" the entire courtyard. People in the scene are detected and modeled as cylinders in our current implementation as shown in FIG. 9a. The "walk" sequence illustrates how an event can be viewed from anywhere, while taking into account true object bearings and pertinent shadows. Also as previously discussed, FIG. 8c shows a panoramic view of the scene, and FIG. 8a a bird's eye from the top of the scene. Each view is without correspondence to any view within any of the video streams.

6.4 Conclusions and Future Work

The prototype VisR system serves to render live video from multiple perspectives. This provides a true immersive telepresence with simple processing modules. The incorporation of more sophisticated vision modules, e.g., detecting objects using predicted contours (Kalman snakes), distributed processing of the video streams, etc., is expected in the future.

In the prototype system each of the cameras is assumed to be fixed with respect to the static environment. An incorporation of camera panning and zooming into the model is expected to be useful in representing sporting events. To date no problems with camera jitter, frame dropouts etc. have been encountered in the prototype system. However, if the frame digitalizations are synchronized, then any such occurrences as these can be handled quite efficiently.

Given the nature of events transpiring in the scene, and the simplified processing transpiring, digitalization in the prototype system was set at 6 frames/second. This can be easily made adaptive for each individual camera.

The next generation of television is anticipated to contain features of VisR, although a great deal of work remains in either reducing or meeting some of the stringent computational and memory demands. See N. Negroponte, *Being digital*, Knopf, New York, 1995.

8. Immersive Video/Television At the Present Time, or How to Use Five Hundred Television Channels Beneficially The diverse sophisticated video presentations discussed in his specification are so discussed in the necessarily formative terminology of the present time, when not enough people have seen these effects of these video presentations so as to give them the popular names that they will, no doubt, ultimately assume. Moreover, the showing within this specification of examples of these video presentations is limited to drawings that are both (i) static and (ii) one dimensional (and, as will be explained, are of scenes intentionally rendered sufficiently crudely so that certain effects can be observed). According to the limits of description and of illustration, it is perhaps difficult for the reader to know what is reality and what is "hype", and what can be done right now (circa 1995) versus what is likely coming in the future world of video and television. The inventors endeavor to be candid, and blunt, while acknowledging that they cannot perfectly foresee the future.

Immersive video may be divided into real-time applications, i.e., immersive television, and all other, non-real-time, applications where there is, mercifully, more time to process video of a scene.

Both applications are presently at developed to a usable, and arguably a practically usable, state. Each application is, however, perceived to have a separate development and migration path, roughly similarly as video and television entertainments constitute a separate market from computer games and interactive computerized tutors at the present time.

3.1 Monitoring Live Events in Real Time or Near Real Time

With high speed video digitalizers, an immersive video system based on a single engineering work station class computer can, at the present time, process and monitor (being two separate things) the video of live events in real time or near real time.

Such a system can, for example, perform the function of a "television sports director"—at least so far as a "video sports director" focused on limited criteria—reasonably well. The immersive video "sports director" would, for example, be an aid to the human sports director, who world control the live television primary feed of a televised sporting event such as a football game. The immersive video "sports director" might be tasked, for example, to "follow the football". This view could go out constantly upon a separate television channel.

Upon incipient use of an immersive video system so applied, however, the view would normally only be accessed upon selected occasions such as, for example, an "instant replay". The synthesized virtual view is immediately ready, without any such delay as normally presently occurs while humans figure out what camera or cameras really did show the best view(s) of a football play, upon the occasion of an instant replay. For example, the synthesized view generally presenting the "football" at center screen can be ordered. If a particular defensive back made a tackle, then his movements throughout the play may be of interest. In that case a sideline view, or helmet view, of this defensive back can be ordered.

With multiple computers, multiple video views can be simultaneously synthesized, each transmission upon a separate television channel. Certain channels would be devoted to views of certain players, etc.

As the performance of computer hardware and communication links increase, it may ultimately be possible to have television views on demand.

Another presently-realizable real-time application is security, as at, for example, airports. An immersive video system can be directed to synthesize and deliver up "heads-up facial view" images of people in a crowd, one after the next and continuously as and when camera(s) angle(s) permit the capture/synthesis of a quality image. Alternatively, the immersive system, can image, re-image and synthetically image anything that its classification stage suspects to be a "firearm". Finally, just as the environment model of a football game expects the players to move but the field to remain fixed, the environment model of a secured area can expect the human actors therein to move but the moveable physical property (inventory) to remain fixed or relatively fixed, and not to merge inside the human images as might be the case if the property was being concealed for purposes of theft.

It will be understood that the essence of an immersive video system is image synthesis and presentation, and not image classification. However, by "forming up" images from desired optimal vantage points, and by operating under an environment model, the immersive video system has good ability (as it should, at its high cost) to permit existing computer image classification programs to successfully recognize deviations—objects in the scene or events in the scene. Although human judgment as to what is being represented, and "seen", by the system may ultimately be required, the system, as a machine, is tireless and continuously regards the world that it views with an "attentiveness" not realizable by humans.

It should further be considered that the three-dimensional database, or world model, within an immersive video system can be the input to three-, as opposed to two-, dimensional classification programs. Human faces (heads) in particular might be matched against stored data representing existing, candidate, human heads in three dimensions. Even when humans regard "mug shots", they prefer both frontal and side views. Machine classification of human facial images, as just one example, is expected to be much improved if, instead of just one video view at an essentially random view angle, video of an entire observed head is available -for comparison.

The ultimate use of real-time and near-real-time immersive video may in Fact be in machine perception as opposed to human entertainment. The challenge of satisfying the military requirement of an autonomous vehicle that navigates in the environment, let alone the environment of a battlefield, is a very great one. The wondrous "visual world view" presented to our brains by our eyes is actually quite limited in acuity, sensitivity, spectral sensitivity, scale, detection of temporal phenomena, etc., etc. However, a human does a much better job of making sense of the environment than does a computer that may actually "see" better because the human's understanding, or "environmental model", of the real-world environment is much better than that of the computer. Command and control computers should perhaps compensate for the crudity of their environmental models by assimilating more video data inputs derived from more spatial sites. Interestingly, humans, as supported by present-day military computer systems, already recognize the great utility of sharing tactical information on a theater of warfare basis. In particular, the Naval Tactical Data System (NTDS)—now almost forty years old—permits sharing of the intelligence data developed from many separate sensor platforms (ships, planes, submarines, etc.).

It may be essential that computers that operate autonomously or semi-autonomously during warfare should be allowed to likewise share and assimilate sensor information, particularly including video data, from multiple spatially separated platforms. In other words, although one robot tank seeing a battlefield from just one vantage point (even with binocular vision) may become totally lost, three or four such tanks together sharing information might be able to collectively "make sense" of what is going on. The immersive video system of the present invention is clearly involved with world-, or environment-, level integration of video information taken from spatially separated video sources (cameras), and it would be a mistake to think that the only function of an immersive video system is for the entertainment or education of humans.

3.1 Processing of Video in Non-Real-Time

Meanwhile to developments in immersive television, the processing of video information—which is not required to transpire in real time—and the communication of video information—which may be by disc or like transportable storage media instead of over land cable or radio frequency links—may proceed in another direction. Anything event or scene that people wish to view with great exactitude, or to interact with realistically (which are not the same thing), can be very extensively "worked up" with considerable computer processing. A complete 3D database of fine detail can be developed, over time and by computer processing, from historical multiple video feeds of anything from a football game to a stage play or, similarly to the more exotic scenes common in "surround vision" theaters, travel locales and action sequences. When recorded, a scene from the 3D database can be "played back" at normal, real-time, speeds and in accordance with the particular desires of a particular end viewer/user by use of a computer, normally a personal computer, of much less power than the computer(s) that created the 3D database. Every man or woman will thus be accorded an aid to his or her imagination, and can, as did the fictional Walter Mitty, enter into any scene and into any event. For example, one immediate use of immersive video is in the analysis of athlete behaviors. An athlete, athlete in training, or aspiring athlete performs a sports motion such as, for example, a golf swing that is videotaped from multiple, typically three, camera perspectives. A 3D video model of the swing, which may only be a matter of ten or so seconds, is constructed at leisure, perhaps over some minutes in a personal computer. A student golfer and/or his/her instructor can subsequently play back the swing from any perspective that best suits observation of its salient characteristics, or those or its attributes that are undergoing corrective revision. If two such 3D models of the same golfer are made, one can be compared against the other for deviations, which may possibly be presented as colored areas or the like on the video screen. If a model or an expert golfer, or a composite of expert golfers, is made, then the swing of the student golfer can be compared in three dimensions to the swing(s) of the expert golfer(s).

Another use of machine-aided comparison, and content-based retrieval, of video, or video-type, images is in medicine. New generations of Magnetic Resonance Imaging (MRI) sensors are already poised to deliver physiological information in stereoscopic representation, for example as a 3D model of the patient's brain facilitating the planning of neurosurgery. However,, immediate medical applications of immersive video in accordance with the present invention are much more mundane. A primary care physician might, instead of just recording patient height and weight and relying on his or her memory from one patient visit to the next, might simply videotape the standing patient's unclothed body from multiple perspectives at periodic intervals, an inexpensive procedure conducted in but a few seconds. Three-dimensional patient views constructed from each session could subsequently be compared to note changes in weight, general appearance, etc.

In the long term, the three-dimensional imaging of video information (which video information need not, however, have been derived from video cameras) as is performed by the immersive video system of the present invention will likely be useful for machine recognition of pathologies. For somewhat the same reasons that it is difficult for the computerized battlefield tank discussed above to find its way around on the battlefield from only a two-dimensional view thereof, a computer is inaccurate in interpreting, for example, x-ray mammograms, because it looks at only a two-dimensional image with deficient understanding of how the light and shadow depicted thereon translates to pathology of the breast. It is now so much that a tumor might be small, but that a small object shown at low contrast and high visual signal-to-noise is difficult to recognize in two dimensions. It is generally easier to recognize, and to classify, a medical image in three dimensions because most of our bodies and their ailments—excepting the skin and the retina—are substantially three-dimensional.

Another use of the same 3D human images realized with immersive video system of the present intentional would be in video representations of the prospective results of reconstructive or cosmetic (plastic) surgery, or of exercise regimens. The surgeon or trainer would modify the body image, likely by manipulation of the 3D image database as opposed to 2D views thereof, much in the manner that any computerized video image is presently edited. The patient/client would be presented with the edited view(s) as being the possible or probable results of surgery, or of exercise.

In accordance with these and other possible variations and adaptations of the present invention, the scope of the invention should be determined in accordance with the following claims, only, and not solely in accordance with that embodiment within which the invention has been taught.

What is claim is:

1. A method of telepresence, being a video representation of being at real-world scene that is other than the instant scene of the viewer, the method comprising:

capturing video of a real-world scene from each of a multiplicity of different spatial perspectives on the scene;

predetermining a fixed framework of the scene as to the boundaries of the scene and selected fixed points of reference within the scene, the fixed framework and fixed reference points potentially but not necessarily coinciding with landmark objects in the scene if, indeed, any such landmark objects even exist;

creating from the captured video in consideration of the predetermined fixed framework a full three-dimensional model of the scene, the three-dimensional model being distinguished in that three-dimension occurrences in the scene are incorporated into the model regardless of that they should not have been pre-identified to the model;

producing from the three-dimensional model a video representation on the scene that is in accordance with the desired perspective on the scene of a viewer of the scene, thus immersive telepresence because the viewer can view the scene as if immersed therein, and as if present at the scene, all in accordance with his/her desires;

wherein the representation is called immersive telepresence because it appears to the viewer that, since the scene is presented as the viewer desires, the viewer is immersed in the scene;

wherein the viewer-desired perspective on the scene, and the video representation in accordance with this viewer-desired perspective, need not be in accordance with any of the captured video.

2. The method of immersive telepresence according to claim 1 wherein the video representation is stereoscopic;

wherein stereoscopy is, normally and conventionally, a three-dimensional effect where each of the viewer's two eyes sees a slightly different view on the scene, making the viewer's brain to comprehend that the viewed scene is three-dimensional even should the viewer not move his/her head or eyes in spatial position.

3. A method of immersive telepresence, being a video representation of being at real-world scene that is other than the instant scene of the viewer, the method comprising:

capturing video of a real-world scene from each of a multiplicity of different spatial perspectives on the scene;

creating from the captured video a full three-dimensional model of the scene;

producing from the three-dimensional model a video representation on the scene that is in accordance with the desired perspective on the scene of a viewer of the scene, thus immersive telepresence because the viewer can view the scene as if immersed therein, and as if present at the scene, all in accordance with his/her desires;

wherein the representation is called immersive telepresence because it appears to the viewer that, since the scene is presented as the viewer desires, the viewer is immersed in the scene;

wherein the viewer-desired perspective on the scene, and the video representation in accordance with this viewer-desired perspective, need not be in accordance with any of the captured video;

wherein the video representation is in accordance with the position and direction of the viewer's eyes and head, and exhibits motional parallax;

wherein motional parallax is, normally and conventionally, a three-dimensional effect where different views on the scene are produced as the viewer moves position even should the viewer have but one eye, making the viewer's brain to comprehend that the viewed scene is three-dimensional.

4. A method of telepresence, being a video representation of being at real-world scene that is other than the instant scene of the viewer, the method comprising:

capturing video of a real-world scene from a multiplicity of different spatial perspectives on the scene;

creating from the captured video a full three-dimensional model of the scene;

producing from the three-dimensional model a video representation on the scene responsively to a predetermined criterion selected from among criteria including an object in the scene and an event in the scene, thus interactive telepresence because the presentation to the viewer is interactive in response to the criterion;

wherein the video presentation of the scene in accordance with the criterion need not be in accordance with any of the captured video.

5. The method of viewer-interactive telepresence according to claim 4 wherein the video representation is in response to a criterion selected by the viewer, thus viewer-interactive telepresence.

6. The method of viewer-interactive telepresence according to claim 5 wherein the presentation is in response to the position and direction of the viewer's eyes and head, and exhibits motional parallax.

7. The method of viewer-interactive telepresence according to claim 5 wherein the presentation exhibits stereoscopy.

8. An immersive video system for presenting video images of a real-world scene in accordance with a predetermined criterion, the system comprising:

a knowledge database containing information about the spatial framework of the real-world scene:

multiple video sources each at a different spatial location for producing multiple two-dimensional video images of a real-world scene each at a different spatial perspective;

a viewer interface at which a prospective viewer of the scene may specify a criterion relative to which criterion the viewer wishes to view the scene;

a computer, receiving the multiple two-dimensional video images of the scene from the multiple video cameras and the viewer-specified criterion from the viewer interface, the computer for calculating in accordance with the spatial framework of the knowledge database as a video data analyzer for detecting and for tracking objects of potential interest and their locations in the scene, an environmental model builder for combining multiple individual video images of the scene to build a three-dimensional dynamic model of the environment of the scene within which three-dimensional dynamic environmental model potential objects of interest in the scene are recorded along with their instant spatial locations, and a viewer criterion interpreter for correlating the viewer-specified criterion with the objects of interest in the scene, and with the spatial locations of these objects, as recorded in the dynamic environmental model in order to produce parameters of perspective on the scene, and a visualizer for generating, from the three-dimensional dynamic environmental model in accordance with the parameters of perspective, a particular two-dimensional video image of the scene; and a video display, receiving the particular two-dimensional video image of the scene from the computer, for displaying this particular two-dimensional video image of the real-world scene to the viewer as that particular view of the scene which is in satisfaction of the viewer-specified criterion.

9. An immersive video system for presenting video images of a real-world scene in accordance with a predetermined criterion, the system comprising:

multiple video sources each at a different spatial location for producing multiple two-dimensional video images of a real-world scene each at a different spatial perspective;

a knowledge database containing information about the real-world scene regarding at least two of the geometry of the real-world scene, potential shapes of objects in the real-world scene, dynamic behaviors of objects in the real-world scene, and a camera calibration model;

a viewer interface at which a prospective viewer of the scene may specify a criterion relative to which criterion the viewer wishes to view the scene;

a computer, receiving the multiple two-dimensional video images of the scene from the multiple video cameras and the viewer-specified criterion from the viewer interface, the computer operating in consideration of the knowledge database and including a video data analyzer for detecting and for tracking objects of potential interest and their locations in the scene, an environmental model builder for combining multiple individual video images of the scene to build a three-dimensional dynamic model of the environment of the scene within which three-dimensional dynamic environmental model potential objects of interest in the scene are recorded along with their instant spatial locations, and a viewer criterion interpreter for correlating the viewer-specified criterion with the objects of interest in the scene, and with the spatial locations of these objects, as recorded in the dynamic environmental model in order to produce parameters of perspective on the scene, and a visualizer for generating, from the three-dimensional dynamic environmental model in accordance with the parameters of perspective, a particular two-dimensional video image of the scene; and a video display, receiving the particular two-dimensional video image of the scene from the computer, for displaying this particular two-dimensional video image of the real-world scene to the viewer as that particular view of the scene which is in satisfaction of the viewer-specified criterion.

10. The immersive video system according to claim 9 wherein the knowledge database contains data regarding each of the geometry of the real-world scene, potential shapes of objects in the real-world scene, dynamic behaviors of objects in the real-world scene, and a camera calibration model.

11. The immersive video system according to claim 9 wherein the camera calibration model of the knowledge database includes at least one of an internal camera calibration model, and an external camera calibration model.

12. An improvement to the method of video mosaicing, which video mosaicing method uses video frames from a video stream of a single video camera panning a scene, or, equivalently, the video frames from each of multiple video cameras each of which images only a part of the scene, in order to produce a larger video scene image than any single video frame from any single video camera, the improved method being directed to generating a spatial-temporally coherent and consistent three-dimensional video mosaic from multiple individual video streams arising from each of multiple video cameras each of which is imaging at least a part of the scene from a perspective that is at least in part different from other ones of the multiple video cameras, the improved method being called video hypermosaicing, the video hypermosaicing method being applied to scenes where at a least a portion of the scene from the perspective of at least one camera is static, which limitation is only to say that absolutely everything in every part of the scene as is imaged to each of the multiple video cameras cannot be simultaneously in dynamic motion, the video hypermosaicing comprising:

accumulating and storing as a priori information the static portion of the scene as a CSG/CAD model of the scene; and processing, in consideration of the CSG/CAD model of the scene, dynamic portions of the scene, only, from the multiple video steams of the multiple video cameras so as to develop a spatial-temporally coherent and consistent three-dimensional video mosaic of the scene;

wherein the processing of static portions of the scene is bypassed;

wherein bypassing of processing the static portions of the scene reduces the complexity of processing the scene.

13. The video hypermosaicing according to claim 12 wherein the accumulating and storing is of the geometry of the real-world scene, potential shapes of objects in the real-world scene, dynamic behaviors of objects in the real-world scene, an internal camera calibration model and parameters, and an external camera calibration model and parameters, as the priori information regarding the static portion of the scene, and as the CSc/CAD model of the scene.

14. The video hypermosaicing according to claim 13 wherein the processing comprises:

building and maintaining a comprehensive three-dimensional video model of the scene by steps including calibrating the multiple cameras in three-dimensional space by use of the internal and external camera calibration models and parameters, extracting all dynamic objects in the multiple video streams of the scene, localizing each extracted dynamical object in the three-dimensional model, updating positions of existing objects and creating new objects in the model as required, and mosaicing pixels from the multiple video streams by steps.

15. A method of composing arbitrary new video vistas on a scene from multiple video streams of the scene derived from different spatial perspectives on the scene, the method called video hypermosaicing because it transcends the generation of a two-dimensional video mosaic by video mosaicing and instead generates a spatial-temporally coherent and consistent three-dimensional video mosaic from multiple individual video streams arising from each of multiple video cameras each of which is imaging at least a part of the scene from a perspective that is at least in part different from other ones of the multiple video cameras, the video hypermosaicing composing method comprising:

receiving multiple video streams on a scene each of which streams comprises multiple pixels in a vista coordinate system V: $\{(x_v, y_v, z_v)\}$;

finding for each pixel $(x_v, y_v, d_v(x_v, y_v))$ on the vista the corresponding pixel point $(x_\omega, y_\omega, z_\omega)$ in a model, or world, coordinate system W: $\{(x_\omega, y_\omega, z_\omega)\}$ by using the depth value of the pixel, to wit $[x_\omega \ y_\omega \ z_\omega \ 1]^T = M_v \cdot [x_v \ y_v \ z_v \ 1]^T$;

projecting the found corresponding pixel point onto each of a plurality of camera image planes c of a camera coordinate system C: $\{(x_c, y_c, z_c)\}$ by $[x_c \ y_c \ z_c \ 1]^T = M_c^{-1} \cdot [x_\omega \ y_\omega \ z_\omega \ 1]^T$ where $M_c$ is the 4×4 homogeneous transformation matrix representing transformation between c and the world coordinate system, in order to produce camera coordinate pixel points $(x_c, y_c, z_c) \ \forall c$;

testing said camera coordinate pixel points $(x_c, y_c, z_c) \ \forall c$ for occlusion from view by comparing $z_c$ with the depth value for the found corresponding pixel point so as to produce several candidates that could be used for the pixel $(x_c, y_c)$ for the vista;

evaluating each candidate view cv by a criteria, to wit, first computing an angle A subtended by a line between a candidate camera and a vista position with the object point $(x_\omega, y_\omega, z_\omega)$ by use of the cosine formula $A = \arccos \sqrt{(b^2+c^2-a^2)/(2bc)}$, and then computing the distance of the object point $(x_\omega, y_\omega, z_\omega)$ from camera window coordinate $(x_c, y_c)$, which is the depth value $d_c(x_c, y_c)$;

evaluating each candidate view by an evaluation criterion $e_{cv} = f(A, B^*d_c(x_c, y_c))$, where B is a small number; and repeating the receiving, the finding, the projecting, the testing and the evaluating for an instance of time of each video frame assuming a stationary viewpoint.

16. The hypermosaicing composing method according to claim 15 extended to produce a fly-by sequence of view in the world coordinate system, the extended method comprising:

repeating the receiving, the finding, the projecting, the testing and the evaluating for every point of a view port in the world coordinate system.

17. A method of presenting a particular stereoscopic two-dimensional video image of a real-world three dimensional scene to a viewer in accordance with a criterion supplied by the viewer, the method comprising:

imaging in multiple video cameras each at a different spatial location multiple two-dimensional video images of a real-world scene each at a different spatial perspective;

combining in a computer the multiple two-dimensional images the scene into a three-dimensional model of the scene;

receiving in a the computer from a prospective viewer of the scene a viewer-specified criterion relative to which criterion the viewer wishes to view the scene;

synthesizing, in a computer from the three-dimensional model in accordance with the received viewer criterion, a stereoscopic two-dimensional image that is without exact correspondence to any of the images of the real-world scene that are imaged by any of the multiple video cameras; and displaying in a video display the particular stereoscopic two-dimensional image of the real-world scene to the viewer.

18. The method according to claim 17 wherein the receiving is of the viewer-specified criterion of a particular spatial perspective, relative to which particular spatial perspective the viewer washes to view the scene; and wherein the synthesizing in the computer from the three-dimensional model is of a particular two-dimensional image of the scene in accordance with the particular spatial perspective criterion received from the viewer; and wherein the displaying in the video display is of the particular stereoscopic two-dimensional image of the scene that is in accordance with the particular spatial perspective received from the viewer.

19. The method according to claim 17 performed in real time as television presented to a viewer interactively in accordance with the viewer-specified criterion.

20. A method of presenting a particular stereoscopic two-dimensional video image of a real-world three dimensional scene to a viewer in accordance with a criterion supplied by the viewer, the method comprising:

imaging in multiple video cameras each at a different spatial location multiple two-dimensional video images of a real-world scene each at a different spatial perspective;

combining in a computer the multiple two-dimensional images of the scene into a three-dimensional model of the scene so as generate a three-dimensional model of the scene in which model objects in the scene are identified;

receiving in a the computer from a prospective viewer of the scene a viewer-specified criterion of a selected object in the scene that the viewer wishes to particularly view;

synthesizing, in a computer from the three-dimensional model in accordance with the received viewer criterion, a particular stereoscopic two-dimensional image of the selected object in the scene; and displaying to the viewer in the video display the particular stereoscopic image of the scene showing the viewer-selected object.

21. The method according to claim 20 wherein the viewer-selected object in the scene is dynamic, and unmoving, in the scene.

22. The method according to claim 20 wherein the viewer-selected object in the scene is dynamic, and moving, in the scene.

23. The method according to claim 20 wherein selection of the object relative to which the viewer wishes to particularly view in the scene transpires by viewer positioning of a device of a type that is suitably used with an artificial reality system to sense viewer position and viewer movement and viewer direction of focus;

sensing with the device the viewer position and movement and direction of focus;

unambiguously interpreting in three dimensions an association between, on the one hand, the object position and, on the other hand, the viewer position and movement and direction of focus, so as to specify the object relative to which the viewer wishes to particularly view in the scene;

wherein the association transpires, as the three-dimensional model of the scene supports, in three and not just in two dimensions.

24. A method of presenting a particular stereoscopic two-dimensional video image of a real-world three dimensional scene to a viewer in accordance with a criterion supplied by the viewer, the method comprising:

imaging in multiple video cameras each at a different spatial location multiple two-dimensional video images of a real-world scene each at a different spatial perspective;

combining in a computer the multiple two-dimensional images of the scene into a three-dimensional model of the scene so as generate a three-dimensional model of the scene in which model events in the scene are identified;

receiving in a the computer from a prospective viewer of the scene a viewer-specified criterion of a selected event in the scene that the viewer wishes to particularly view;

synthesizing, in a computer from the three-dimensional model in accordance with the received viewer criterion, a particular stereoscopic two-dimensional image of the selected event in the scene; and displaying to the viewer in the video display the particular stereoscopic image of the scene showing the viewer-selected event.

25. The method according to claim 24 wherein selection of the object relative to which the viewer wishes to particularly view in the scene transpires by viewer positioning of a device of a type that is suitably used with an artificial reality system to sense viewer position and viewer movement and viewer direction of focus;

sensing with the device the viewer position and movement and direction of focus;

unambiguously interpreting in three dimensions an association between, on the one hand, the object position and, on the other hand, the viewer position and movement and direction of focus, so as to specify the object relative to which the viewer wishes to particularly view in the scene;

wherein the association transpires, as the three-dimensional model of the scene supports, in three and not just in two dimensions.

26. A method of synthesizing a stereoscopic virtual video image from real video images obtained by a multiple real video cameras, the method comprising:

storing in a video image database the real two-dimensional video images of a scene from each of a multiplicity of real video cameras;

creating in a computer from the multiplicity of stored two-dimensional video images a three-dimensional video database containing a three-dimensional video image of the scene, the three-dimensional video database being characterized in that the three-dimensional location of objects in the scene is within the database; and synthesizing a two-dimensional stereoscopic virtual video image of the scene from the three-dimensional video database;

wherein the synthesizing is facilitated because the three-dimensional spatial positions of all objects depicted in the stereoscopic virtual video image are known because of their positions within the three-dimensional video database, it being a mathematical transform to present a two-dimensional stereoscopic video image when the three-dimensional positions of objects depicted in the image are known.

27. The method according to claim 26 wherein the synthesizing from the three-dimensional video database is of a two-dimensional stereoscopic virtual video image of the scene having two, a left stereo and a right stereo, image components each of which image components that is without correspondence to any real two-dimensional video image of a scene;

wherein the synthesizing is of a 100% synthetic two-dimensional stereoscopic virtual video image, meaning that although the objects within the image are of the scene as it ms seen by real video cameras, no camera sees the scene as either the left or the right stereo components, wherein it may be fairly said that the two-dimensional stereoscopic virtual video image results not from stereoscopically imaging, or videotaping, the scene but rather from synthesizing a stereoscopic view of the scene.

28. The method according to claim 26 that, between the creaking and the synthesizing, further comprises:
selecting a spatial perspective, which spatial perspective is not that of any of the multiplicity of real video cameras, on the scene as the scene is imaged within the three-dimensional video model;
wherein the generating of the two-dimensional stereoscopic virtual video image is so as to show the scene from the selected spatial perspective.

29. The method according to claim 28 wherein the selected spatial perspective is static, and fixed, during the video of the scene.

30. The method according to claim 28 wherein the selected spatial perspective is dynamic, and variable, during the video of the scene.

31. The method according to claim 28 wherein the selected spatial perspective is so dynamic and variable dependent upon occurrences in the scene.

32. The method according to claim 26 that, between the creating and the generating, further comprises:
locating a selected object in the scene as is imaged within the three-dimensional video model;
wherein the generating of the two-dimensional stereoscopic virtual video image is so as to best show the selected object.

33. The method according to claim 26 that, between the creating and the generating, further comprises:
dynamically tracking the scene as is imaged within the three-dimensional video model in order to recognize any occurrence of a predetermined event in the scene;
wherein the generating of the two-dimensional stereoscopic virtual video image is so as to best show the predetermined event.

34. The method according to claim 26 wherein the generating is of a selected two-dimensional stereoscopic virtual video image, on demand.

35. The method according to claim 26 wherein the generating of the selected two-dimensional stereoscopic virtual video image is in real time on demand, thus interactive virtual television.

36. A computerized method for presenting video images including a real-world scene, the method comprising:
constructing a three-dimensional environmental model containing both static and dynamic elements of the real world scene;
producing multiple video streams showing two-dimensional images on the real-world scene from differing spatial positions;
identifying static and dynamic portions of each of the multiple video streams;
first warping at least some of corresponding portions of the multiple video streams onto the three-dimensional environmental model as reconstructed three-dimensional objects, wherein at least some image portions that are represented two-dimensionally in a single video stream assume a three-dimensional representation; and
to synthesizing a two-dimensional video image that is without equivalence to any of the two-dimensional images that are within the multiple video streams from the three-dimensional environmental model containing the three-dimensional objects.

37. The method according to claim 36 wherein the first warping is of at least some dynamic elements.

38. The method according to claim 37 wherein the first warping is also of at least some static scene elements.

39. The method according to claim 36 further comprising:
second warping at least some of corresponding portions of the multiple video streams onto the three-dimensional environmental model as two-dimensional representations, wherein at least some image portions that are represented two-dimensionally in a single video stream are still represented two-dimensionally even when warped onto an environmental model that is itself three-dimensional; and
wherein the synthesizing of the two-dimensional video image is from the two-dimensional representations, as well as the reconstructed three-dimensional objects, that were both warped onto the three-dimensional environmental model.

40. The method according to claim 36 wherein the identifying of the static and dynamic portions of each of the multiple video streams transpires by tracking changes in scene element representations in the multiple video streams over time.

41. The method according to claim 36 wherein the environmental model determines whether any scene portion or scene element is to be warped onto itself as either a two-dimensional representation or as a reconstructed three-dimensional object.

42. The method according to claim 41 wherein the synthesizing in accordance with a viewer specified criterion is dynamic in accordance with such criterion, and, although the criterion does not change, the scene selection responsive thereto is of a varying, and not a same and consistent, view on the scene from time to time.

43. The method according to claim 36 wherein the synthesizing is in accordance with a viewer specified criterion.

44. The method according to claim 43 wherein the dynamic synthesizing is in accordance with a viewer specified criterion of any of
an object in the scene, and
an event in the scene.

45. The method according to claim 43 wherein the dynamic synthesizing is of a stereoscopic image.

46. A computer system, receiving multiple video images of views on a real world scene, for synthesizing a video image of the scene which synthesized image is no identical to any of the multiple received video images, the system comprising:
an information base containing a geometry of the real-world scene, shapes and dynamic behaviors expected from moving objects in the scene, plus internal and external camera calibration models on the scene;
a video data analyzer means for detecting and for tracking objects of potential interest in the scene, and locations of these objects;
a three-dimensional environmental model builder means for recording the detected and tracked objects at their proper locations in a three-dimensional model of the scene, the recording being in consideration of the information base;
a viewer interface means responsive to a viewer of the scene to receive a viewer selection of a desired view on the scene, which desired view need not be identical to any views that are within any of the multiple received video images; and
a visualizer means for generating from the three-dimensional model of the scene in accordance with the received desired view a video image on the scene that so shows the scene from the desired view.

* * * * *